(12) United States Patent
Nagae

(10) Patent No.: US 11,218,444 B2
(45) Date of Patent: Jan. 4, 2022

(54) COMMUNICATION ROUTE SELECTION BASED ON ACCESS REQUEST

(71) Applicant: Konica Minolta Inc., Tokyo (JP)

(72) Inventor: Shunsuke Nagae, Amagasaki (JP)

(73) Assignee: KONICA MINOLTA, INC., Tokyo (JP)

( * ) Notice: Subject to any disclaimer, the term of this patent is extended or adjusted under 35 U.S.C. 154(b) by 342 days.

(21) Appl. No.: 16/369,180

(22) Filed: Mar. 29, 2019

(65) Prior Publication Data
US 2019/0312844 A1 Oct. 10, 2019

(30) Foreign Application Priority Data

Apr. 4, 2018 (JP) .............................. JP2018-072773

(51) Int. Cl.
*H04L 29/06* (2006.01)
*H04L 12/66* (2006.01)
*H04L 12/46* (2006.01)

(52) U.S. Cl.
CPC ...... *H04L 63/0236* (2013.01); *H04L 12/4633* (2013.01); *H04L 12/66* (2013.01); *H04L 65/1003* (2013.01)

(58) Field of Classification Search
CPC . H04L 63/0236; H04L 12/4633; H04L 12/66; H04L 65/1003
USPC ......................................................... 726/11
See application file for complete search history.

(56) References Cited

U.S. PATENT DOCUMENTS

| 7,512,240 | B2* | 3/2009 | Lain ...................... H04L 9/0836 380/264 |
| 8,931,073 | B2* | 1/2015 | Huang ..................... H04L 45/04 726/11 |
| 9,020,225 | B2* | 4/2015 | Sato ........................ G16H 30/40 382/128 |
| 9,264,563 | B2* | 2/2016 | Anezaki ................. G06F 1/3209 |
| 9,959,402 | B2* | 5/2018 | Torigoshi .............. H04L 63/101 |
| 10,474,402 | B2* | 11/2019 | Kouno ..................... G06F 3/122 |
| 10,534,570 | B2* | 1/2020 | Nakahara .............. H04L 63/029 |
| 10,880,683 | B2* | 12/2020 | Wang ..................... H04W 4/023 |

(Continued)

FOREIGN PATENT DOCUMENTS

| JP | 2013073578 A | 4/2013 |
| JP | 2015115831 A | 6/2015 |

*Primary Examiner* — David P Zarka
(74) *Attorney, Agent, or Firm* — Cantor Colburn LLP

(57) ABSTRACT

A communication system includes: a plurality of devices that are provided inside a firewall; at least one gateway that is provided inside the firewall, and relays communication between the plurality of devices and at least one cloud server provided outside the firewall; and a platform server that is provided outside the firewall, receives at least one access request with respect to at least one communication target device in the plurality of devices, and transmits a message to a gateway corresponding to the at least one communication target device designated in the at least one access request, through a communication route for message transmission selected from a plurality of types of communication routes, wherein each of the plurality of types of communication routes is a route passing through the firewall, and the platform server selects the communication route for message transmission relevant to the at least one communication target device.

31 Claims, 35 Drawing Sheets

(56) References Cited

U.S. PATENT DOCUMENTS

2016/0077775 A1* 3/2016 Komaki ................ G06F 3/1287
　　　　　　　　　　　　　　　　　　　　358/1.15
2017/0005829 A1* 1/2017 Kouno ................ H04L 63/0209

* cited by examiner

| DEVICE ID | ACCESS TYPE |
|---|---|
| DEVICE_0001 | FIRMWARE UPDATE |
| DEVICE_0002 | ... |
| DEVICE_0003 | ... |
| ... | ... |
| DEVICE_0098 | ... |
| DEVICE_0099 | ... |
| DEVICE_0100 | ... |

| ACCESS TYPE | PERIOD T2 |
| --- | --- |
| FIRMWARE UPDATE INSTRUCTION FOR SECURITY VULNERABILITY | 10 MINUTES |
| FIRMWARE UPDATE INSTRUCTION FOR NON-SECURITY VULNERABILITY | 6 HOURS |
| ... | ... |
| LOG UPLOAD | 24 HOURS |
| ... | ... |

| DEVICE ID | ... | NEW TYPE/OLD TYPE |
|---|---|---|
| DEVICE_0001 | ... | OLD TYPE |
| DEVICE_0002 | ... | OLD TYPE |
| DEVICE_0003 | ... | NEW TYPE |
| ... | ... | ... |
| DEVICE_0098 | ... | NEW TYPE |
| DEVICE_0099 | ... | NEW TYPE |
| DEVICE_0100 | ... | NEW TYPE |

FIG. 33

| DEVICE ID | XMPP SERVER ADDRESS | NEW TYPE / OLD TYPE | |
|---|---|---|---|
| DEVICE_0001 | ... | Address_A | NEW TYPE |
| DEVICE_0002 | ... | Address_A | NEW TYPE |
| DEVICE_0003 | ... | Address_A | NEW TYPE |
| ... | ... | ... | ... |
| DEVICE_0999 | ... | Address_A | NEW TYPE |
| DEVICE_01000 | ... | Address_A | NEW TYPE |
| DEVICE_1001 | ... | Address_B | NEW TYPE |
| DEVICE_1002 | ... | Address_C | NEW TYPE |
| DEVICE_1003 | ... | Address_X | OLD TYPE |

- USE TIME CHARGE SERVER 50 (DEVICE_0001 – DEVICE_01000)
- USE DATA AMOUNT CHARGE SERVER 60 (DEVICE_1001, DEVICE_1002)
- USE FIXED OPERATION SERVER 150 (DEVICE_1003)

<PRIOR ART>

<PRIOR ART>

COMMUNICATION ROUTE SELECTION BASED ON ACCESS REQUEST

CROSS-REFERENCE TO RELATED APPLICATION

The present invention claims priority under 35 U.S.C. § 119 to Japanese patent Application No. 2018-072773, filed on Apr. 4, 2018, is incorporated herein by reference in its entirety.

BACKGROUND

Technological Field

The present invention relates to a communication system performing communication between an installation outside a LAN and an installation inside a LAN, and a technology relevant thereto.

Description of the Related Art

There is a technology for linking a server outside a LAN (a cloud server or the like) and a device inside the LAN (an image former or the like).

For example, there is a technology for performing print output with respect to an electronic document stored in a server on a cloud (the cloud server) by using an image former on a local side (in the LAN) (refer to JP 2013-73578 A).

In JP 2013-73578 A, a document output system (a communication system) including an image former (a device), a gateway, and a cloud server, is described. In such a system, an electronic document stored in the cloud server, is transmitted to the image former through the gateway or the like, and the electronic document is subjected to print output in the image former 10. Furthermore, the gateway and the image former (the device) are provided inside a LAN, and the cloud server is provided outside the LAN.

However, in the system described above, in general, a firewall is provided between the image former (the device) inside the LAN and the cloud server outside the LAN.

An access from the image former inside the LAN (inside the firewall) to the cloud server outside the LAN (outside the firewall), is allowed through the firewall.

However, a reverse access, specifically, a direct access from the cloud server outside the LAN (outside the firewall) to the image former inside the LAN (inside the firewall), is blocked by the firewall. That is, it is not possible to directly access the image former from the cloud server.

In response, a technology is considered in which a message session (a communication session) (as an exception of a firewall) is established between a management server outside a LAN and a gateway inside the LAN (a communication relay), and an image former (a device) 10 inside the LAN is accessed from the cloud server outside the LAN, through a management platform server 80, an XMPP server (a connection server) 50 (50x), and a gateway 30 (refer to FIG. 34 and FIG. 35).

FIG. 34 and FIG. 35 are diagrams illustrating such a technology. Each gateway 30 (30x or the like) establishes a message session (511) with respect to the XMPP server 50x (also referred to as a message transfer server or a connection request transfer server) that is designated in advance, at the time of being activated (refer to a thick line of FIG. 34). After that, an operation as illustrated in FIG. 35, is executed, at the time of generating an access request to a specific device 10x from a cloud server 90. Specifically, first, the platform server 80 receives the access request from the cloud server 90, and the platform server 80 transmits a tunnel connection request to the gateway 30x through the XMPP server 50x. Specifically, the tunnel connection request (a message) is transmitted to the gateway 30x from the XMPP server 50x, by using the message session (for example, 511) between the XMPP server 50x and a certain gateway 30 (for example, 30x). In a case where the tunnel connection request is received, the gateway 30x establishes tunnel communication with respect to the cloud server 90 (refer to a sandy hatched region (an elongated rectangular part) of FIG. 35), on the basis of the tunnel connection request. Then, the device (the image former) 10x is accessed from the cloud server 90 (through the gateway 30x), by using the tunnel communication (tunnel connection).

Furthermore, in JP 2015-115831 A, a similar technology is described.

However, in the technology described above, the message session (the communication session) is established in advance between the gateway 30 and the XMPP server 50x, and thus, the XMPP server 50x is constantly operated. In order to realize such a constantly operating situation, for example, the XMPP server 50x is fixedly operated (for example, operated by being purchased or by being loaned in a fixed amount charge structure (a monthly fixed fee, an annually fixed fee, or the like)).

However, in a case of constantly operating the XMPP server 50x, an operational cost of the XMPP server 50x increases. In particular, in a case where the number of XMPP servers 50x increases, the operational cost of the XMPP server 50x extremely increases.

SUMMARY

Therefore, an object of the present invention is to provide a communication system capable of reducing an operational cost, and a technology relevant thereto.

To achieve the abovementioned object, according to an aspect of the present invention, a communication system reflecting one aspect of the present invention comprises: a plurality of devices that are provided inside a firewall; at least one gateway that is provided inside the firewall, and relays communication between the plurality of devices and at least one cloud server provided outside the firewall; and a platform server that is provided outside the firewall, receives at least one access request with respect to at least one communication target device in the plurality of devices, from the at least one cloud server, and transmits a message to a gateway corresponding to the at least one communication target device designated in the at least one access request, through a communication route for message transmission selected from a plurality of types of communication routes, wherein each of the plurality of types of communication routes is a route passing through the firewall, through any one of a plurality of types of servers that are operated in unfixed amount charge structures different from each other, are provided outside the firewall, and have a magnitude relationship of charge amounts, capable of being changed according to a communication mode, and the platform server selects the communication route for message transmission relevant to the at least one communication target device from the plurality of types of communication routes, on the basis of communication mode information of the at least one access request.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 3 is a diagram illustrating a schematic configuration of a gateway, a platform server, or the like;

FIG. 6 is a diagram illustrating a device list;

FIG. 15 is a diagram illustrating a data table in which a relationship between an access request type and a standby period is defined;

FIG. 22 is a diagram illustrating a state in which the tunnel connection request is transmitted through a second route (a route through the data amount charge server) or the like;

FIG. 24 is a diagram illustrating a state in which the tunnel connection request is transmitted through the first route or the like;

FIG. 25 is a diagram illustrating the device list;

FIG. 28 is a diagram illustrating a state in which the tunnel connection request is transmitted through the second route or the like;

FIG. 33 is a diagram illustrating the device list or the like;

DETAILED DESCRIPTION OF EMBODIMENTS

Hereinafter, one or more embodiments of the present invention will be described with reference to the drawings. However, the scope of the invention is not limited to the disclosed embodiments.

1. First Embodiment

<1-1. Configuration Outline of System>

Figure 1:
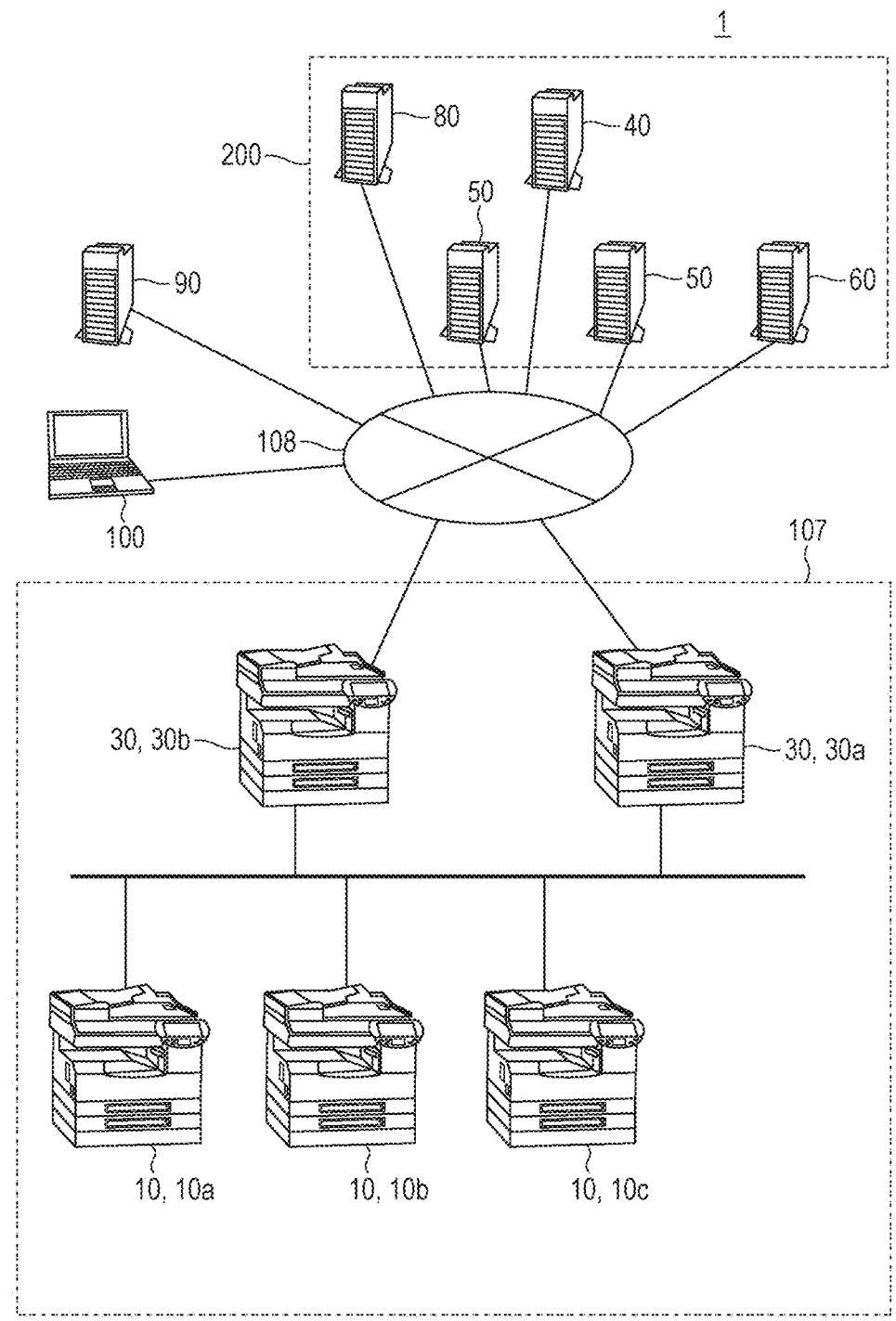
FIG. 1 is a diagram illustrating a schematic configuration of a communication system.

FIG. 1 is a diagram illustrating a schematic configuration of a communication system 1 according to an embodiment of the present invention. As illustrated in FIG. 1, the communication system 1 includes at least one (here, a plurality of) device 10 (10*a*, 10*b*, 10*c*, . . . ), at least one (here plurality of) gateway 30 (30*a* and 30*b*), at least one (here, a single) cloud server computer (hereinafter, also simply referred to as a cloud server) 90, at least one (here, a single) client computer (hereinafter, also simply referred to as a client) 100, and a management server group 200.

The management server group 200 includes a management platform server (hereinafter, also simply referred to as a platform server) 80, a plurality of connection request transfer servers (50 and 60), and a service activation server 40.

In addition, here, at least one (here, a plurality of) time charge server 50, and at least one (here, a single) data amount charge server (also referred to as an MQTT server) 60 are provided as the connection request transfer server (also referred to as a message transfer server). Furthermore, here, the time charge server 50 is also referred to as an XMPP server since the time charge server 50 transmits a message by using an extensible messaging and presence protocol (XMPP), and the data amount charge server 60 is also referred to as an MQTT server since the data amount charge server 60 transmits a message by using a protocol of message queue telemetry transport (MQTT). Furthermore, the time charge server 50 and the data amount charge server 60 may respectively transmit the message by using other protocols. In addition, as described below, the service activation server 40 is a server (an activation server) that executes processing or the like of activating the time charge server 50 (more specifically, XMPP service) in a non-operation state (a non-activation state), according to an activation request from the platform server 80.

Constituent 10, 30, 40, 50, 60, 80, 90, 100, and 200 are connected to each other through a network 108, and are capable of executing network communication. However, as described below, a part of communication is blocked by a firewall. Furthermore, the network 108 includes a local area network (LAN), a wide area network (WAN), the internet, or the like. In addition, a connection mode with respect to the network 108, may be wired connection or wireless connection.

The plurality of devices 10 and the plurality of gateways 30 are provided inside a certain LAN 107 (in other words, inside the firewall) constructed in a company or the like. On the other hand, the management server group 200, the cloud server 90, and the client 100 are provided outside the LAN 107 (in other words, outside the firewall). Furthermore, the client 100 may be provided inside the LAN 107 (inside the firewall).

Here, a multi-functional peripheral (also abbreviated as an MFP) is exemplified as the device 10. The MFP is also referred to as an image former, a communicator, or the like.

In addition, here, the gateway 30 is constructed in an MFP different from the MFP as the device 10. Specifically, the gateway 30 is realized by executing software (a program) built in the MFP as hardware.

On the other hand, various servers 40, 50, 60, 80, and 90 and the client 100 are respectively constructed by using a blade computer, a so-called personal computer, or the like.

In such a communication system 1, for example, a print command delivered to the cloud server 90 from the client 100, is transmitted to the device 10 from the cloud server 90 through the gateway 30, by using tunnel connection established between the cloud server 90 and the gateway 30, and print output is performed in the device (the MFP) 10. Alternatively, update data of firmware, delivered to the cloud server 90 from the client 100, is transmitted to the device 10 from the cloud server 90 through the gateway 30, by using the tunnel connection established between the cloud server 90 and the gateway 30, and update processing of the firmware is performed in the device (the MFP) 10.

The plurality of gateways 30 have a function of relaying communication between the plurality of devices 10 and the cloud server 90, and each of the gateways 30 is also referred to as a communication relay.

The management server group 200 is a server group managing the communication between the cloud server 90 and the plurality of gateways 30, or the like. The management server group 200 receives an access request with respect to one or a plurality of specific devices (communication target devices) in the plurality of devices 10, from the cloud server 90, and transmits a tunnel connection request with respect to the cloud server 90 to any one of the plurality of gateways 30 (specifically, a gateway associated with the communication target device), according to the access request.

<1-2. Configuration Outline of MFP>

Figure 2:
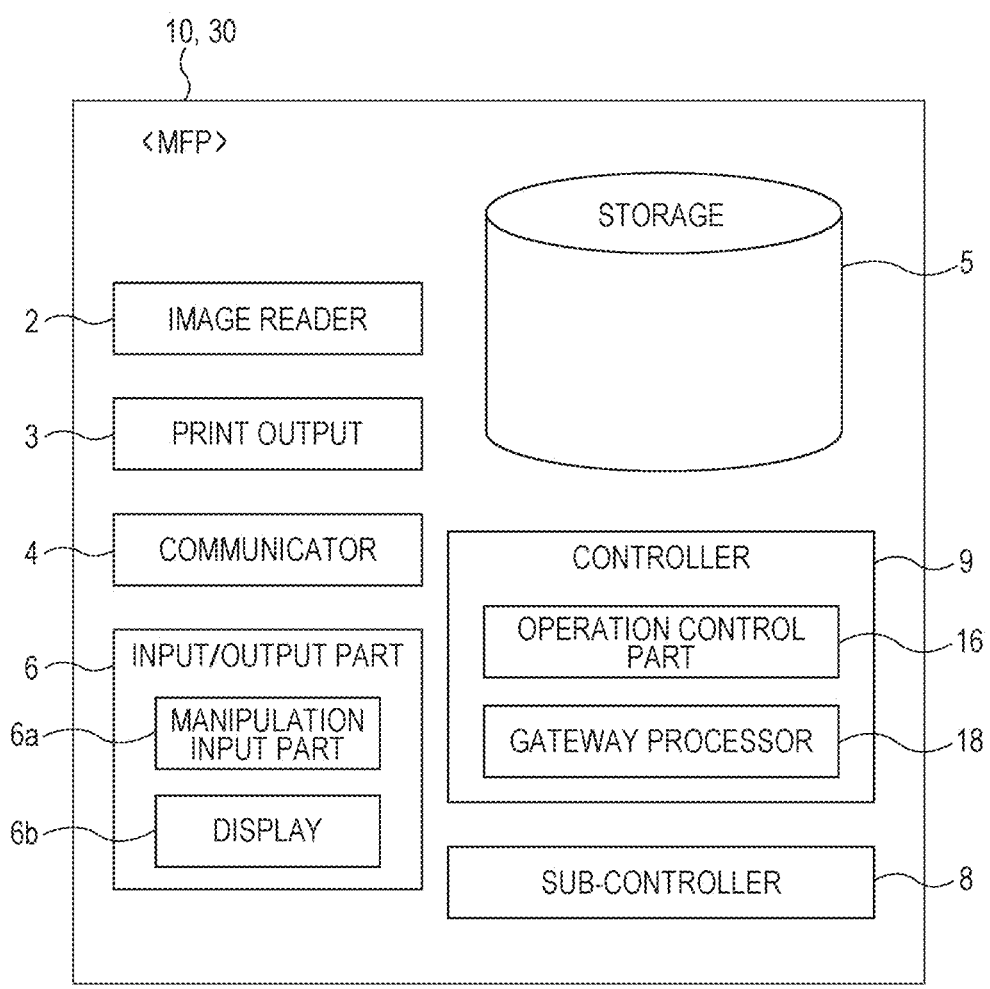
FIG. 2 is a schematic view illustrating the configuration of an MFP.

FIG. 2 is a schematic view illustrating the configuration of the MFP. The MFP is a periphery (also referred to as a multi-functional device) having a scanner function, a printer function, a copy function, a data communication function, and the like.

The MFP is an image former capable of performing print output processing (print processing), image read processing (scan processing), and the like. In this embodiment, a plurality of MFPs is provided in the LAN 107. In addition, some MFPs in the plurality of MFPs are also operated as the gateway 30.

As illustrated in FIG. 2, the MFP includes an image reader 2, a print output 3, a communicator 4, a storage 5, an input/output part 6, a controller 9, and the like, and various functions are realized by complexly operating each constituent.

The image reader 2 is a processor that optically reads a manuscript placed in a predetermined position of the MFP, and generates image data of the manuscript (also referred to as a manuscript image).

The print output 3 is an output that performs print output with respect to an image onto various media such as paper, on the basis of image data relevant to a target image.

The communicator 4 is a processor that is capable of performing facsimile communication through a public line or the like. Further, the communicator 4 is capable of performing network communication through a network 108. In the network communication, various protocols such as a transmission control protocol/internet protocol (TCP/IP) and a file transfer protocol (FTP), are used, and the MFP is capable of exchanging various data items with respect to desired destination (the servers 50, 60, 90, and the like), by using the network communication.

Specifically, the communicator 4 of the MFP operated as the gateway 30, is capable of performing communication with respect to the connection request transfer server (in particular, of receiving data from the connection request transfer server (the tunnel connection request or the like)), by using a message session (described below) established between the gateway 30 and the connection request transfer server (50 or 60). In addition, the communicator 4 of the MFP operated as the device 10, is capable of performing communication with respect to the cloud server 90 through the gateway 30 (in particular, of receiving data from the cloud server 90), by using tunnel connection (described below) established between the gateway 30 and the cloud server 90. Furthermore, the communicator 4 includes a transmitter transmitting data or the like to other installations, and a receiver receiving data or the like from the other installations.

The storage 5 includes a storage such as a hard disk drive (HDD) and a non-volatile memory.

The input/output part 6 includes an manipulation input part 6a receiving input with respect to the MFP, and a display 6b performing display output with respect to various information items. Furthermore, the input/output part 6 is also referred to as a manipulator.

The controller 9 is a controller comprehensively controlling the MFP, and includes a CPU and various semiconductor memories (a RAM, a ROM, and the like).

The controller 9 realizes various processor (an operation control part 16 controlling image formation or the like, a gateway processor 18 described below, and the like) by executing a predetermined software program (also simply referred to as a program) stored in the ROM (for example, EEPROM (Registered Trademark) or the like) in the CPU.

For example, the controller 9 of the MFP operated as the gateway 30, realizes the gateway processor 18 (a communication control part 31 (refer to FIG. 3) or the like). In addition, the controller 9 of the MFP operated as only the device 10 may include the same processor, and may not include a processor for functioning as the gateway 30. Furthermore, the program, for example, may be recorded in various portable recording media (a USB memory or the like), and may be installed in the MFP through the recording medium. Alternatively, the program may be installed in the MFP by being downloaded through the network 108 or the like.

<1-3. Configuration Outline of Each Constituent>

Figure 3:
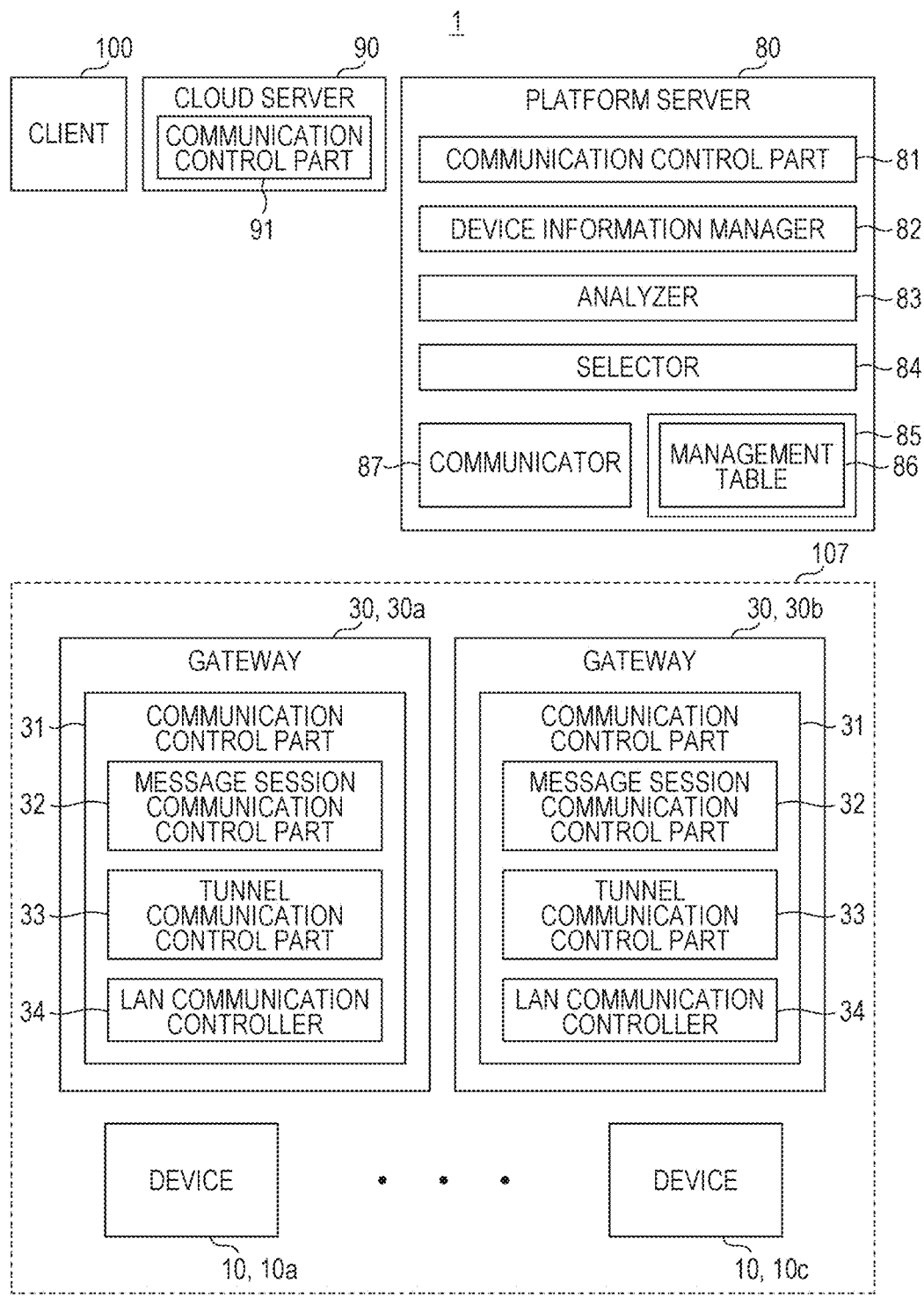

FIG. 3 is a diagram illustrating a schematic configuration of each of the constituents 30, 80, 90, and the like. Each of the constituents will be described with reference to FIG. 3.

<Cloud Server 90>

The cloud server 90 is a server that transmits the access request with respect to at least one communication target device to the platform server 80.

The cloud server 90 includes a communication control part 81. The communication control part 81 executes communication between the platform server 80 and the gateway 30. In particular, the communication control part 81 of the cloud server 90 outside the firewall, executes communication with respect to each of the gateways 30 inside the firewall, by using tunnel communication (described below).

<Platform Server 80>

The platform server 80 is one server configuring the management server group 200, and is also referred to as a management server or the like. The platform server 80 is a server that is capable of receiving the access request from the cloud server 90.

The platform server 80 includes various processors such as the communication control part 81, a device information manager 82, an analyzer 83, and a selector 84.

Such various processors are realized by executing a predetermined software program (also simply referred to as a program) stored in the storage (the HDD or the like) in the CPU of the platform server 80. Furthermore, the program, for example, may be recorded in various portable recording media (a DVD-ROM or the like), and may be installed in the platform server 80 through the recording medium. Alternatively, the program may be installed in the platform server 80 by being downloaded through the network 108 or the like.

The communication control part 81 controls various communication operations, in cooperation with a communicator 87 (communication hardware). For example, the communication control part 81 executes the communication with respect to the cloud server 90, and receives the access request from the cloud server 90. In addition, the communication control part 81 executes the communication with respect to each of the gateways 30 (the transmission of the tunnel connection request, or the like), by using the message session (described below) established between the connection request transfer server (50 or 60) and the gateway 30. Furthermore, the communicator 87 includes a transmitter transmitting data or the like with respect to other installations, and a receiver receiving data or the like from the other installations.

The device information manager 82 is a processor managing information of the plurality of gateways 30 (management gateway information) that is a management target of the platform server 80, management device information received from each of the plurality of gateways 30 (information of a device that is a management target of each of the gateways 30), and the like. The information (the management gateway information and the management device information) are described in a management table 86 that is stored in the storage (a hard disk drive (HDD) or the like) 85 of the platform server 80. In the management table 86, the management gateway information (identification information of each of the gateways 30 (for example, an IP address) or the like), and the management device information indicating a relationship between each of the gateways 30 and a device under each of the gateways 30 (a management target device), and the like are described.

The analyzer 83 is a processor that analyzes the contents of the access request received from the cloud server 90, and determines a communication target gateway corresponding to each of the communication target devices (a device designated as a destination (a communication target), in each of the access requests) 10. The analyzer 83 is a processor that determines the gateway 30 capable of relaying communication with respect to the destination device 10, on the basis of the management table 86. The analyzer 83 is also expressed as a relay determiner that determines the gateway 30 (the communication relay) to be used.

The selector 84 is a processor that selects (determines) a communication route for a connection request (described below) relevant to each of the communication target devices (also referred to as the destination device) 10 from a plurality of types of communication routes, on the basis of communication mode information of the access request, according to the access request from the cloud server 90.

In addition, the communication control part 81, the communicator 87, and the like, transmit the tunnel connection request for establishing the tunnel connection with respect to the cloud server 90 (a cloud server of a transmission source of the access request (also referred to as a transmission source cloud server)). The tunnel connection request is transmitted to the gateway 30 (the communication relay) determined by the analyzer (the relay determiner) 83, through a communication route for a tunnel connection request (also simply referred to as a communication route for a connection request) selected (determined) from the plurality of types of communication routes by the selector 84. Furthermore, the "communication route for a connection request" is also referred to as a "communication route for message transmission", a "communication route through a firewall", or the like.

Furthermore, in a case where the tunnel connection request is received, the gateway 30 (the communication relay) establishes the tunnel connection with respect to the cloud server 90, according to the tunnel connection request. Then, the gateway 30 relays the communication between the cloud server 90 and the destination device 10, by using the tunnel connection.

<Gateway 30>

Each of the gateways 30 includes various processors such as the communication control part 31. Such various processors are realized by executing a predetermined program in the controller 9 of the gateway 30 (the MFP).

The communication control part 31 is a processor that controls communication with respect to the other installations. The communication control part 31 includes a message session communication control part 32, a tunnel communication control part 33, and a LAN communication control part 34.

The LAN communication control part 34 is a processor that executes communication with respect to various installations (the device 10 and the like) inside the LAN.

On the other hand, the message session communication control part 32 and the tunnel communication control part 33 are respectively a processor that executes communication with respect to various installations outside the LAN.

The message session communication control part 32 is a processor that executes the communication with respect to the connection request transfer server (50 or 60), by using a message session (XMPP connection, MQTT connection, or the like). The message session communication control part 32 establishes the message session with respect to the connection request transfer server (50 or 60), and executes the communication with respect to the connection request transfer server.

The tunnel communication control part 33 is a processor that executes the communication with respect to the cloud server 90, by using the tunnel communication (described below). The tunnel communication control part 33 establishes the tunnel communication with respect to the cloud server 90, and relays the communication between the cloud server 90 and the specific device 10. The tunnel communication control part 33 is also referred to as a paired cloud server communicator (or a cloud server communicator).

As described below, data (a message or the like) can be transmitted to an installation (the gateway 30) inside a firewall FW from an installation (the connection request transfer server (50 or 60)) outside the firewall FW (refer to FIG. 4 or the like), by using the message session. In addition, data (firmware update data or the like) can be transmitted to the installation (the gateway 30 and the device 10) inside the firewall FW from the installation (the cloud server 90) outside the firewall FW, by using the tunnel connection.

<1-4. Operation According to Comparative Example>

Figure 34:
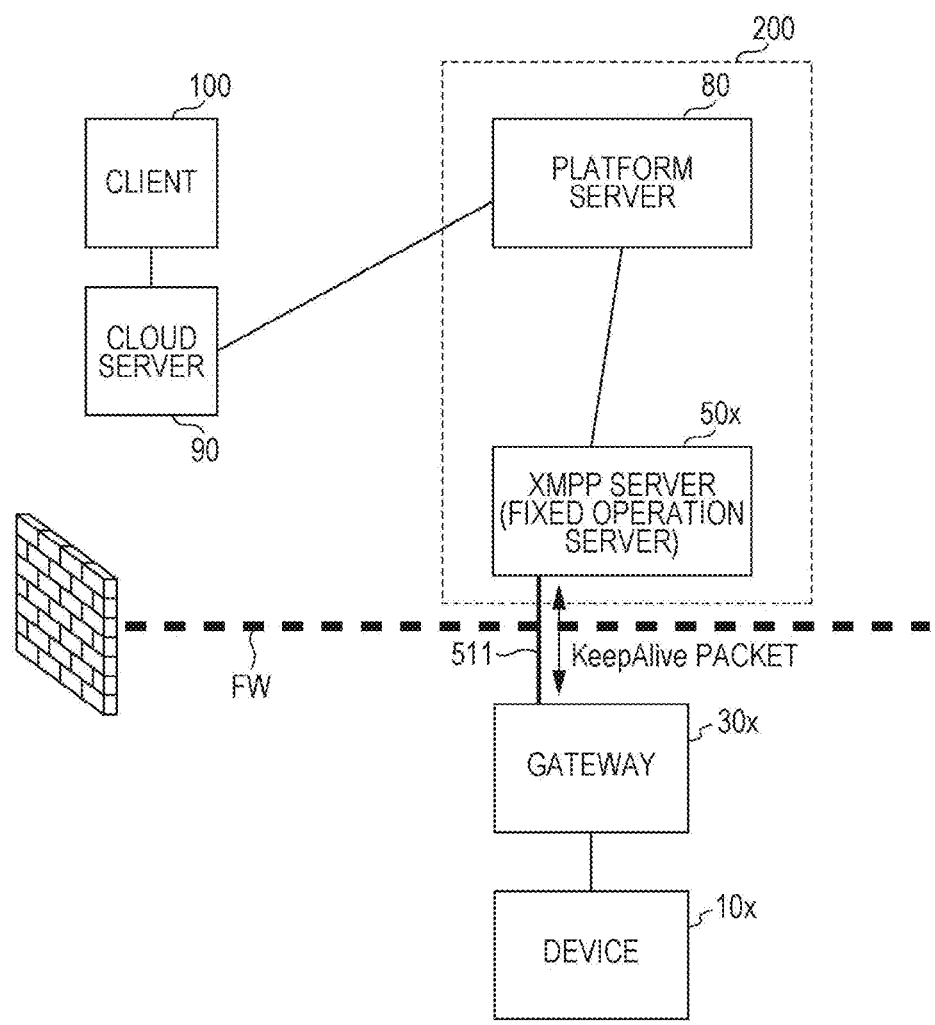
FIG. 34 is a diagram illustrating a communication system according to a comparative example.
Figure 35:
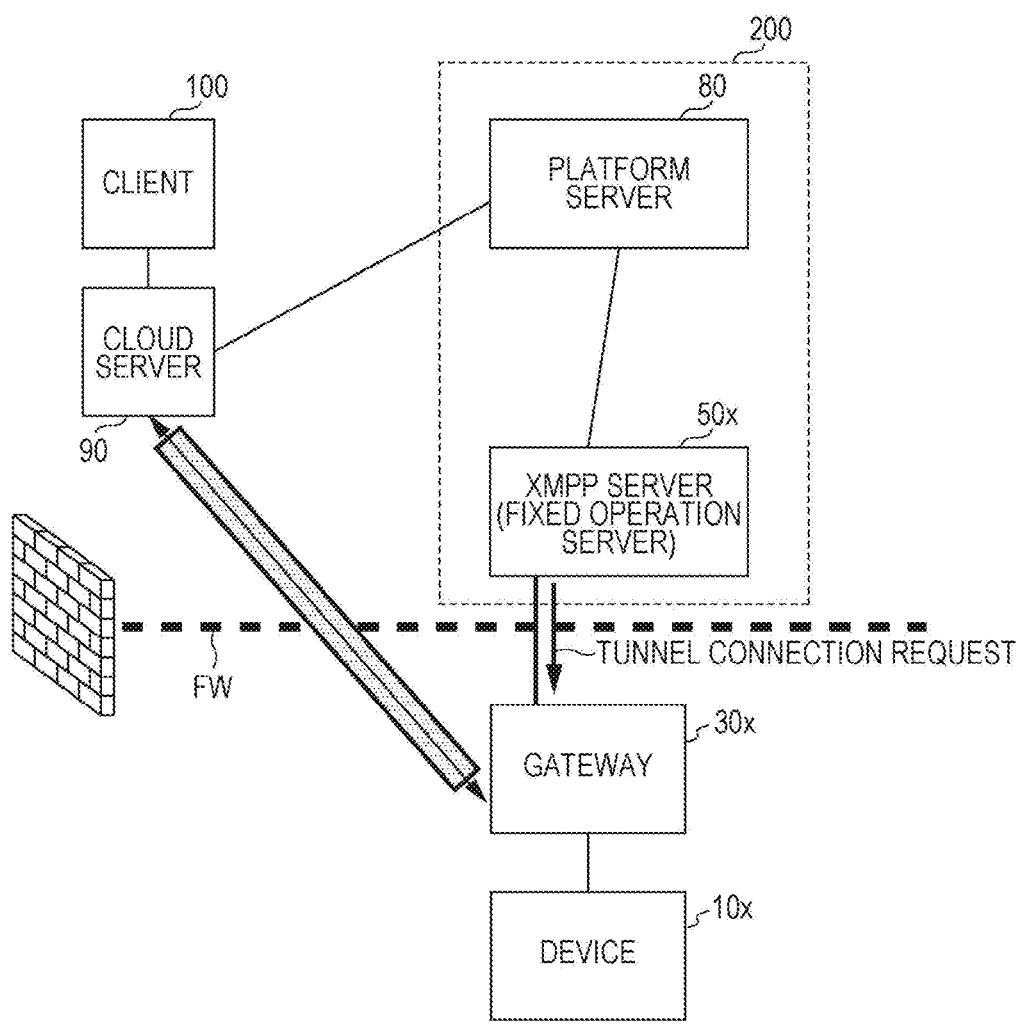
FIG. 35 is a diagram illustrating the communication system according to the comparative example.

Here, an operation according to a comparative example will be described with reference to FIG. 34 and FIG. 35. In the operation according to the comparative example, the message session (the XMPP connection) (as an exception of the firewall) is established between the management server group 200 (in particular, an XMPP server 50x) outside the firewall and the gateway 30 inside the firewall, and from the cloud server 90 outside the firewall, and the device 10 inside the firewall can be accessed through the management server group 200 and the gateway 30. The management server group 200 includes the platform server 80 and the XMPP server (here, a fixed operation server (a server in which an operational cost is fixedly generated)) 50x.

As described above (refer to FIG. 34), the gateway 30 establishes in advance a communication session (specifically, a message session) (511) with respect to the XMPP server (the fixed operation server) 50x designated in advance, at the time of being activated. After that, the tunnel connection request is transmitted to the gateway 30x from the platform server 80, through the XMPP server 50x, by using the message session (a constant connection communication session) (511) between the XMPP server 50x and the gateway 30 (30x), at the time of generating the access request to the specific device 10 from the cloud server 90. The gateway 30x establishes the tunnel communication with respect to the cloud server 90, on the basis of the tunnel connection request (refer to FIG. 35). Then, the device (the image former) 10 is accessed from the cloud server 90 (through the gateway 30), by using the tunnel communication.

More specifically, first, each of the gateways 30 transmits a connection request of the message session (an establishment request) to the XMPP server 50x designated in advance, at the time of being activated. Accordingly, the XMPP server 50x approves the establishment request, and thus, the message session (511) is established between each of the gateways 30 and the XMPP server 50x (refer to FIG. 34). In other words, the message session is established according to the access to the XMPP server 50x outside the firewall from the gateway 30 inside the firewall. A message session using an "extensible messaging and presence protocol: XMPP", is exemplified as the message session (the communication session). In addition, each of the gateways 30 transmits information of a device (the management target device) under the management of each of the gateways 30, or the like, to the platform server 80. In addition, the platform server 80 stores registration information (the management table 86) including the information of the management target device of the each of the gateways 30, in the storage 85 of the platform server 80 (FIG. 3).

Then, the device (the image former) 10 is accessed from the cloud server 90, by using the message session between the XMPP server 50x and the gateway 30.

Specifically, in a case where the cloud server 90 intends to perform an access (communication) with respect to the specific device 10x, first, an access request for the specific device 10x, is transmitted to the platform server 80 from the cloud server 90.

The platform server 80 specifies the gateway 30 corresponding to the specific device 10 (a specific gateway 30x under which the specific device 10x exists, or the like), on the basis of management information (the management table 86). In other words, the gateway 30 to be accessed is specified on the basis of the management table 86. Furthermore, it is not limited thereto, but for example, the gateway 30 to be accessed may be designated in advance by a user or the like, along with the specific device 10 to be accessed, or the like. Then, the gateway 30 to be accessed may be specified on the basis of the designation.

In addition, the platform server 80 transmits the tunnel connection request to the specified gateway 30, through the XMPP server 50x.

For example, first, in a case where the access request with respect to the specific device 10x, is transmitted to the platform server 80 from the cloud server 90, the platform server 80 specifies the gateway (30x) corresponding to the specific device 10x, on the basis of the management information (the management table 86).

Next, when the message session 511 is established between the XMPP server 50x and the specific gateway 30x (corresponding to the specific device 10x), the platform server 80 transmits the tunnel connection request to the specified gateway 30x, through the message session 511. The "tunnel connection request" is the connection request (the establishment request) for establishing the tunnel connection (tunnel communication connection) with respect to the cloud server 90. Thus, when the message session 511 is established between the XMPP server 50x and the specific gateway 30x, the tunnel connection request is transmitted by using the message session 511 between the XMPP server 50x and the gateway 30x.

The gateway 30 receiving the tunnel connection request, transmits an establishment request of a hypertext transfer protocol (HTTP) session (more specifically, a hypertext transfer protocol secure (HTTPS) session) to the cloud server 90, in response to the tunnel connection request. Then, the cloud server 90 approves the establishment request, and thus, the tunnel connection (the tunnel communication) according to the HTTP session, is established between the gateway 30 and the cloud server 90. In other words, the tunnel connection (the tunnel communication) is established according to the access to the cloud server 90 outside the firewall from the gateway 30 inside the firewall. Then, the cloud server 90 is capable of transmitting various data items to the device 10 (for example, 10d) through the gateway 30, by using the tunnel communication according to the HTTP session. The establishment request of the HTTP (HTTPS) session, is also referred to as the establishment request of the tunnel connection. Furthermore, in FIG. 35, the "tunnel communication" is schematically illustrated by an elongated rectangle with sandy hatching.

<1-5. Operation According to First Embodiment>

In the operation according to the comparative example described above, for example, the XMPP server 50x is constantly operated such that the message session (the communication session) is established in advance between the gateway 30 and the XMPP server 50x. In addition, for example, the XMPP server 50x is fixedly operated (specifically, operated by being purchased or by being loaned in a fixed amount charge structure) such that the constant operation of the XMPP server 50x is realized. Furthermore, the XMPP server 50x is also referred to as a fixed operation server since the XMPP server 50x is the server in which the operational cost is fixedly generated.

However, in a case where the XMPP server 50x is constantly operated, the operational cost of the XMPP server 50x increases. In particular, in a case where the number of XMPP servers 50x increases, the operational cost of the XMPP server 50x extremely increases.

Here, in the entire operating period of the XMPP server 50x (specifically, the fixed operation server), there is a period in which transmission and reception of data (the tunnel connection request or the like) is not actually performed. In particular, the frequency of the transmission and reception of the tunnel connection request is comparatively low, and a ratio of a period in which actual transmission and reception is performed, to the entire operating period of the fixed operation server (in short, an operation rate of the fixed operation server) is comparatively low. In short, a period for waiting for an execution instruction of the tunnel connection request (an idle period), is long, and a use efficiency of the fixed operation server is low.

Therefore, in this embodiment, a server in which an operational cost is variable (also referred to as a variable operation server or an unfixed operation server) (specifically, a server that is operated by being loaned in an "unfixed amount charge structure") is used as the communication server of the tunnel connection request (the "connection request transfer server" (the message transfer server)) of the management server group 200, instead of the fixed operation server (the server in which the operational cost is fixedly generated) (the XMPP server 50x) as described above. Accordingly, it is possible to reduce the operational cost. Here, the "unfixed amount charge structure" is a charge structure other than the fixed amount charge, and includes a volume-rate charge structure according to the used amount (the used data amount, the used hour, or the like).

In addition, a plurality of types (here, two types) of unfixed amount charge servers are selectively used as the server that is operated in the "unfixed amount charge structure" (also referred to as an unfixed amount charge server). Specifically, two types of volume-rate type charge servers of the "time charge server" 50 (a server in which a charge is performed according to a utilization time (a server to which a time charge is applied)) and the "data amount charge server" 60 (a server in which a charge is performed according to a communication data amount (a server to which a data amount charge is applied)), are selectively used. More specifically, one type of unfixed amount charge server is selected from the time charge server (also referred to as a time charge type server) 50 and the data amount charge server (also referred to as a data amount charge type server) 60, on the basis of the communication mode information of the access request from the cloud server 90 (the number of communication target devices designated in the access request, or the like). Accordingly, it is possible to use a server according to the contents of the access request (a less expensive server), in two types of servers.

The plurality of types of servers 50 and 60 are a plurality of types of servers that are operated in the unfixed amount charge structures (a volume-rate charge (a variable charge)) of types different from each other. In addition, a magnitude relationship of charge amounts of the plurality of types of servers 50 and 60, can be changed (adversely changed) according to a communication mode (a communication frequency, a communication density, or the like) of communication (the tunnel connection request or the like). For example, in a case where a message (the tunnel connection request) is transmitted only at an extremely low frequency (in a case where a few messages are sporadically transmitted), the charge amount of the data amount charge server 60 is less expensive than the charge amount of the time charge server 50. On the contrary, in a case where a message is transmitted at an extremely high frequency (in a case where an extremely large number of messages are intensively transmitted), the charge amount of the time charge server 50 is less expensive than that of the data amount charge server 60.

Here, the fee of one data amount charge server 60 is calculated as follows. For example, a case is assumed in which an amount of "0.000001 USD" per one message (minimum transmission data unit) (5 KB (kilobytes)) is charged, and one tunnel connection request is within one message (5 KB). In this case, an amount obtained by multiplying the number of tunnel connection requests and "0.000001 USD" together, is calculated as the fee of the data amount charge server. When 1,000,000 devices are designated as the communication target device in the access request, the transmission of 1,000,000 tunnel connection requests is requested, and thus, "1" USD (=1,000,000×"0.000001" USD) is calculated as the fee of the data amount charge server. In addition, when only one device is designated as the communication target device in the access request, the transmission of one tunnel connection request is requested, and thus, "0.000001" USD (=1×"0.000001" USD) is calculated as the fee of the data amount charge server. Furthermore, the data amount charge server 60 is constantly activated (regardless of the presence or absence of the message transmission), but a charge based on an activation period (and a "time" for data transmission) of the data amount charge server 60 is not performed. In the use of the data amount charge server 60, the charge is performed according to only the data amount of the transmission data.

On the other hand, the fee of one time charge server 50 is calculated as follows. For example, a case is assumed in which in the time charge server having a certain level of processing capacity, an amount of "0.133 (USD)" per 1 hour ("0.00003694 (USD)" per 1 second) is charged, and the server is capable of processing 100 messages (100 tunnel connection requests) per 1 second. In a case where 1,000,000 devices are designated as the communication target device in the access request, an operation time of 10,000 seconds (approximately 3 hours) is required for transmitting 1,000,000 tunnel connection requests relevant to 1,000,000 devices (1,000,000 (devices)/100 (devices/second)=10,000 seconds=2.7778 hours), and thus, "0.3694" USD (=1,000,000×0.00003694=2.7778×0.133 USD) is calculated as the fee of the time charge server. In addition, an operation time of shorter or equal to 1 second (1/100 seconds) is required for transmitting one tunnel connection request relevant to one device, and thus, an amount of "0.00003694 (USD)" obtained by multiplying 1 second of minimum charge unit and 1 second unit value ("0.00003694 (USD)" per 1 second) together, is calculated as the fee of the time charge server.

Therefore, when only one device is designated as the communication target device in the access request (in other words, when the communication frequency is lower than a predetermined degree), the fee of the data amount charge server 60 ("0.000001" USD) is an amount less (less expensive) than the fee of the time charge server 50 ("0.00003694" USD").

On the other hand, when 1,000,000 devices are designated as the communication target device in the access request (in other words, when the communication frequency is higher than a predetermined degree), on the contrary, the fee of the time charge server 50 ("0.399" USD) is an amount less (less expensive) than the fee of the data amount charge server 60 ("1" USD).

Figure 12:
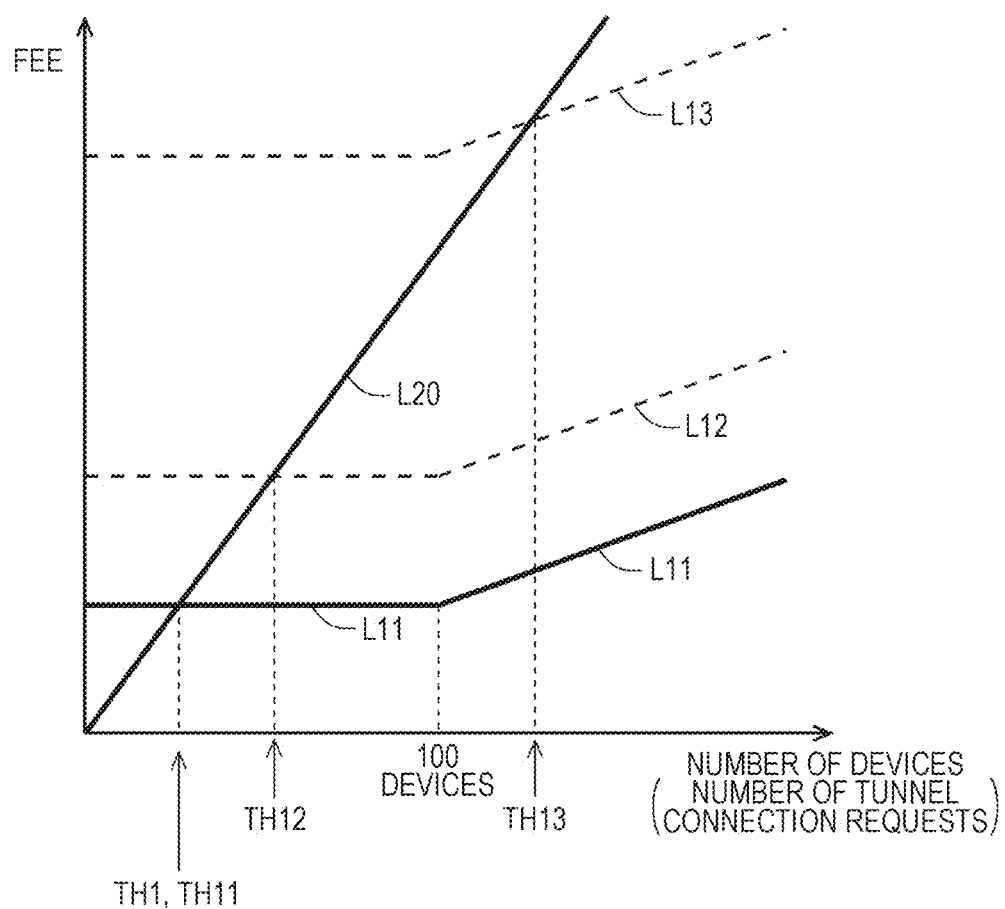
FIG. 12 is a diagram illustrating a graph of fees of two types of unfixed amount charge structures.

FIG. 12 is a diagram illustrating a graph of the fees of the two types of unfixed amount charge structures. A curve L11 represents the fee of the time charge server 50, and a curve L20 represents the fee of the data amount charge server 60. As known from a comparison between both of the curves L11 and L20, when the number N of communication target devices designated in the access request (in other words, the number of tunnel connection requests) is less than a predetermined number TH1 (TH11), the fee of the data amount charge server 60 (refer to L20) is less expensive than the fee of the time charge server 50 (refer to L11). On the other hand, when the number N of communication target devices is greater than the predetermined number TH1 (TH11), the fee of the time charge server 50 (refer to L11) is less expensive than the fee of the data amount charge server 60 (refer to L20).

After that, transmission processing is started with respect to at least one communication target gateway corresponding to at least one communication target device through the "communication route for a connection request" (the communication route for message transmission) selected from a plurality of types (here, two types) of communication routes, as a communication route for transferring the tunnel connection request. Here, the communication route for a connection request is a communication route for transmitting the tunnel connection request to the gateway over (through) the firewall (also referred to as a communication route through a firewall). Each communication route for a connection request is a route passing through the firewall, through any one of the plurality of types of servers (50, 60, or the like) described above, and is a route through servers of types different from each other in the plurality of types of servers. For example, the communication route for a connection request includes a first route passing through the firewall from the platform server 80 side, through the "time charge server 50" in the plurality of types of servers, and a second route passing through the firewall from the platform server 80 side, through the "data amount charge server 60" in the plurality of types of servers.

Furthermore, in a fee calculation example described above, a time required for activating the time charge server 50 (a required activation time) is not considered in the calculation of the fee of the time charge server 50, but the required activation time may be considered. In a case where the required activation time is considered, a predetermined number (threshold value) TH1 is transitioned to a value TH12 (or TH13) greater than the value TH11, or the like. Curves L12 and L13 represent the fee of the time charge server 50 in which the required activation time is also considered. The curve L12 represents the fee of the time charge server 50 corresponding to the required activation time that is comparatively short, and the curve L13 represents the fee of the time charge server 50 corresponding to the required activation time that is comparatively long.

Figure 19:
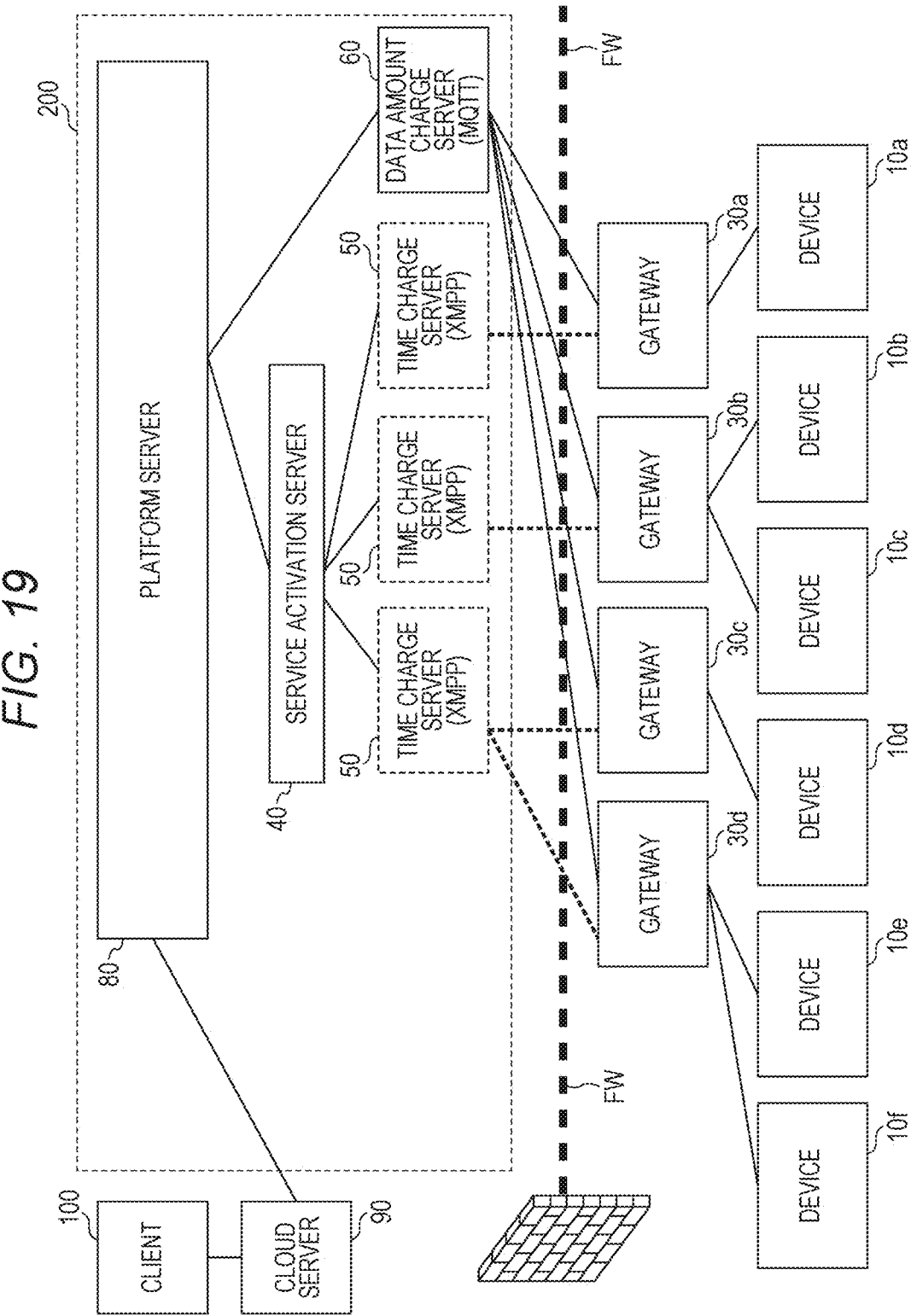
FIG. 19 is a diagram illustrating the communication system provided with a plurality of time charge servers.

In addition, here, a mode in which one connection request transfer server is selected as the "time charge server", has been mainly exemplified, but the present invention is not limited thereto. For example, the plurality of connection request transfer servers (in FIG. 19, a plurality of time charge servers 50) may be selected as the "time charge server". In FIG. 19, a state is illustrated in which the plurality of time charge servers are provided in the communication system, and the plurality of time charge servers are selected as the plurality of connection request transfer servers.

Specifically, the total fee in a case where all of the connection request transfer servers to transfer the tunnel connection request relevant to at least one communication target device designated in the access request, are the time charge server 50 (the plurality of time charge servers), is compared with the total fee in a case where all of the connection request transfer servers are the data amount charge server 60. Then, in both of the total fees, the connection request transfer server of a type corresponding to the less expensive fee (the least expensive fee) (for example, the "time charge server" (specifically, the plurality of time charge servers 50)) may be selected.

In this embodiment, a server capable of transmitting the tunnel connection request to the gateway (more specifically, through the firewall), by using the XMPP protocol (also referred to as an XMPP server), is exemplified as the time charge server 50. In a case where there is no data to be transmitted, the time charge server 50 is in a state of not being activated (also referred to as the non-activation state or the non-operation state). After that, in a case where the platform server 80 selects the first route (a route through the time charge server 50) as the communication route for a connection request, the platform server 80 activates the time charge server 50 in the non-operation state (the non-activation state). Here, the platform server 80 transmits the activation request of the time charge server 50 to the service activation server 40, and the service activation server 40 receiving the activation request, activates the time charge server 50. Furthermore, it is not limited thereto, the platform server 80 may directly activate the time charge server 50.

Furthermore, when the XMPP connection is established, (in a case where there is no load balancer as described in a sixth embodiment (a load dispersion server) 70 (described below)), the following operations are performed. First, in a state where the XMPP connection (the message session) with respect to the time charge server 50 has not been established yet (an unconnected state), the gateway 30 transmits the XMPP connection request to the time charge server 50 corresponding to the gateway 30, at a predetermined time interval (for example, at 1 minute interval). In a case where the time charge server 50 is in the non-operation state, the time charge server 50 is not capable of receiving the XMPP connection request, and thus, the connection between the gateway 30 and the time charge server 50, is not established. On the other hand, in a case where the time charge server 50 is in the operation state, the time charge server 50 receives the XMPP connection request, and the XMPP connection between the gateway 30 and the time charge server 50, is established.

In addition, a server capable of transmitting the tunnel connection request to the gateway through the firewall, by using the MQTT protocol (also referred to as the MQTT server), is exemplified as the data amount charge server 60. Even in a case where there is no data to be transmitted, the data amount charge server 60 is in a state of being activated (also referred to as an activation state and an operation state). In the operation state, the message session (constant connection) according to the MQTT protocol, is established between the data amount charge server 60 and each of the gateways 30. However, substantial data transmission has not been performed yet, and a substantial charge is not performed, by only establishing the message session. In addition, when the tunnel connection request is transmitted to the gateway 30 through the data amount charge server 60, by using the message session, the fee is charged according to the data amount of the tunnel connection request.

Furthermore, here, in the time charge server 50 and the data amount charge server 60, the tunnel connection request is transmitted by using protocols different from each other. Specifically, the XMPP protocol is used in the time charge server 50, and the MQTT protocol is used in the data amount charge server 60. However, it is not limited thereto, the tunnel connection request may be transmitted by using the same protocol in the time charge server 50 and the data amount charge server 60 (for example, by using the XMPP protocol in both of the servers 50 and 60).

<1-6. Detailed Operation>

Figure 4:
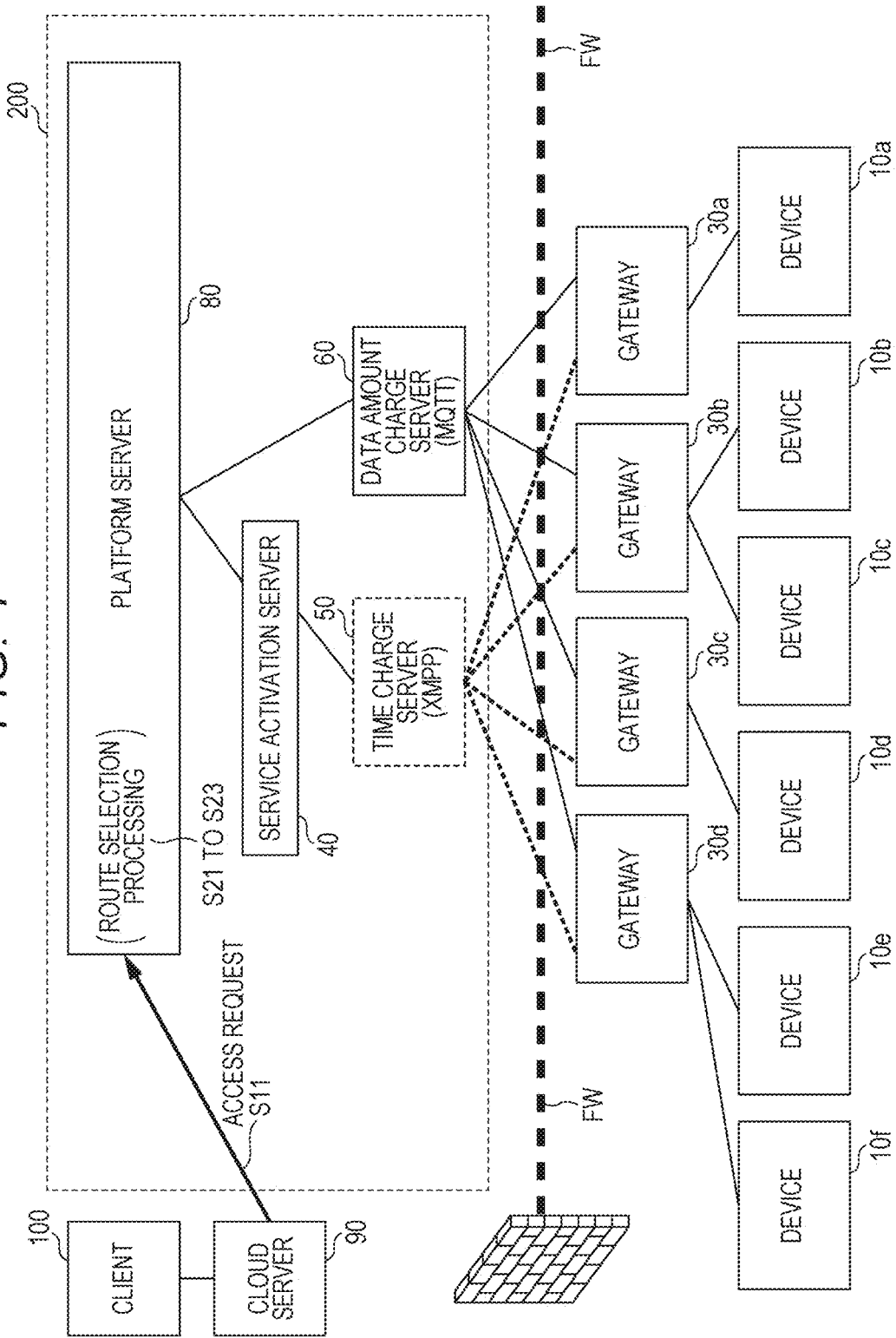
FIG. 4 is a diagram illustrating an initial state of the communication system.
Figure 5:
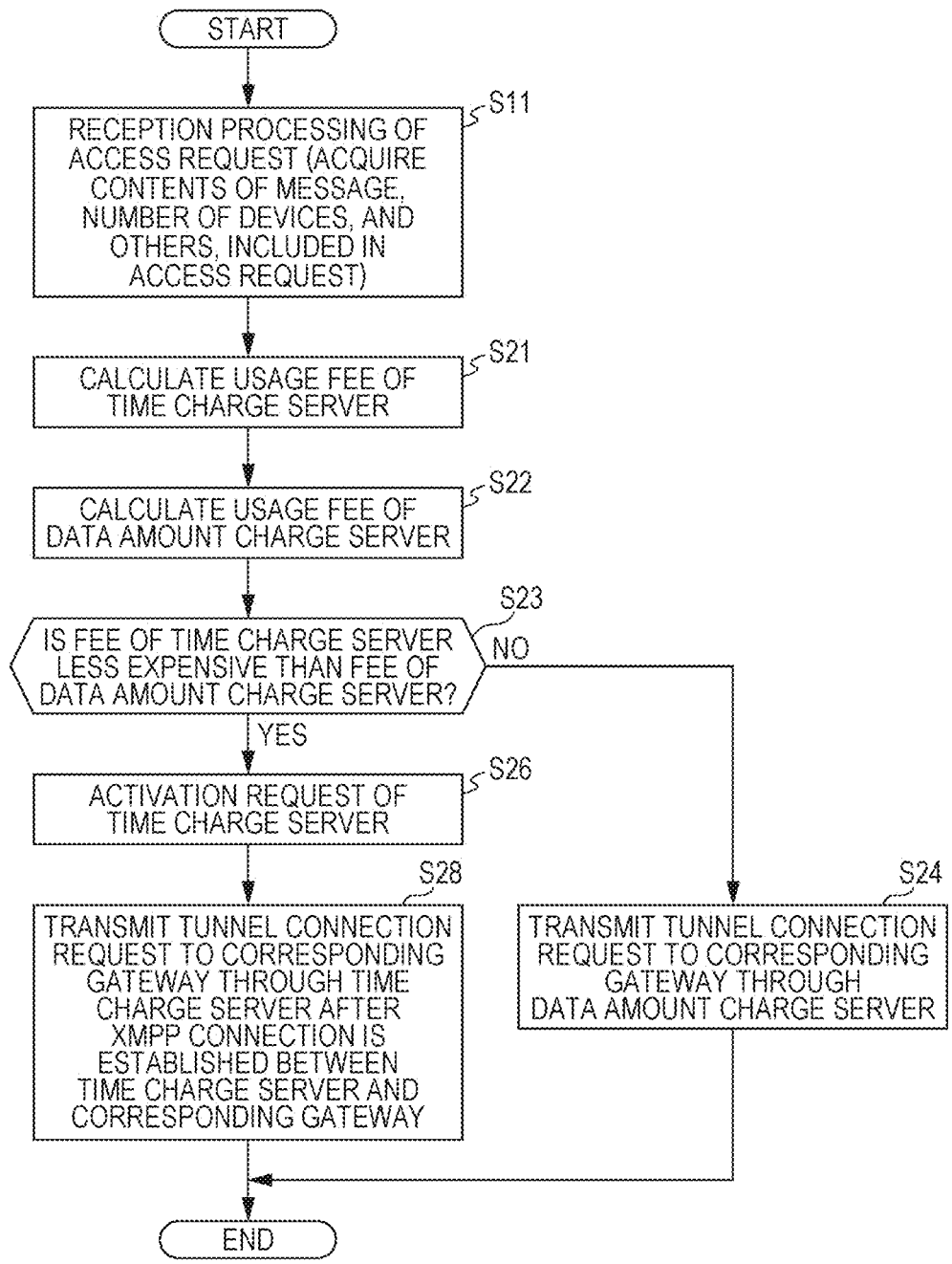
FIG. 5 is a flowchart illustrating the operation of a platform server of a first embodiment.

FIG. 4 is a diagram illustrating an initial state of the communication system 1. In addition, FIG. 5 is a flowchart illustrating the operation of the platform server 80 of a first embodiment. An operation of the first embodiment will be described in more detail, with reference to such drawings or the like.

FIG. 4 illustrates the state of the communication system 1 at a certain time point t0 (also referred to as an initial state or a state before the access request is received). At the time point to, the time charge server 50 is in the non-operation state, the fee relevant to time charge server 50 is not generated. In addition, the data amount charge server 60 is in the operation state, but the fee relevant to the data amount charge server 60 is not also generated.

In the first embodiment, the corresponding gateway 30 is set in advance in each of the devices 10, and the corresponding time charge server 50 is set in advance in each of the gateways 30. Therefore, the corresponding time charge server 50 is set in advance in each of the devices 10. The platform server 80 stores in advance information of such a correspondence relationship.

Each of the gateways 30 is capable of storing information of the corresponding time charge server 50 (an IP address of the time charge server 50, or the like), and is capable of accessing the corresponding time charge server 50. Specifically, in a state where the connection with respect to the time charge server 50 has not been established yet (the unconnected state), the gateway 30 transmits the connection request to the time charge server 50 corresponding to the gateway 30, at a predetermined time interval (for example, 1 minute interval). However, in a case where the time charge server 50 is in the non-operation state, the time charge server 50 is not capable of receiving the connection request, and thus, the connection between the gateway 30 and the time charge server 50, is not established.

In such a normal state (FIG. 4), the platform server 80 receives the access request from a certain cloud server 90 (step S11 (FIG. 5)). The access request includes information of the cloud server 90 of a request source and a device list 300 (refer to FIG. 6). As illustrated in FIG. 6, in the device list 300, a device ID of a device designated as a communication target (the communication target device), the type of access request (a "firmware update instruction for security vulnerability", a "firmware update instruction (for non-security)", a "log upload instruction", . . . ), and the like are described. The number of device IDs included in the access request, is counted, and thus, the number of communication target devices can be calculated. Thus, the access request includes the communication mode information (such as the number of communication target devices designated as a communication target in the access request).

The platform server 80 receiving the access request from the cloud server 90, starts processing of transmitting the tunnel connection request to each of the communication target gateways (the transmission processing), through the communication route for a connection request selected form the plurality of types of communication routes, according to the access request. In the first embodiment, selection processing of a transmission route (step S23 (FIG. 5) or the like), the transmission processing (steps S24 and S28), and the like, are immediately started in response to the reception of one access request.

Specifically, the platform server 80 receiving the access request from the cloud server 90, executes processing of selecting one type of unfixed amount charge server (the volume-rate type charge server) from the time charge server 50 and the data amount charge server 60, on the basis of the communication mode information of the access request (the number of communication target devices designated in the access request, or the like), or the like.

More specifically, first, the platform server 80 calculates a usage fee of the time charge server 50 (step S21), and calculates a usage fee of the data amount charge server 60 (step S22). Specifically, in step S21, a fee in a case where the tunnel connection request relevant to the communication target device designated in the access request, is transmitted through the first route through the time charge server 50, is calculated. In step S22, a fee in a case where the tunnel connection request relevant to the communication target device designated in the access request, is transmitted through the second route through the data amount charge server 60, is calculated. After that, in step S23, both of the fees are compared with each other, selection processing (communication route selection processing) and branch processing, based on a comparison result, are executed. Furthermore, the communication route selection processing is processing of selecting the communication route for a connection request relevant to the communication target device (specifically, the communication route for a connection request with respect to the gateway corresponding to the communication target device) from the plurality of types of communication routes, on the basis of the communication mode information of the access request. After that, the platform server 80 transmits the tunnel connection request to each of the communication target gateways corresponding to each of the communication target devices, through the communication route for a connection request selected from the plurality of types of communication routes.

Figure 7:
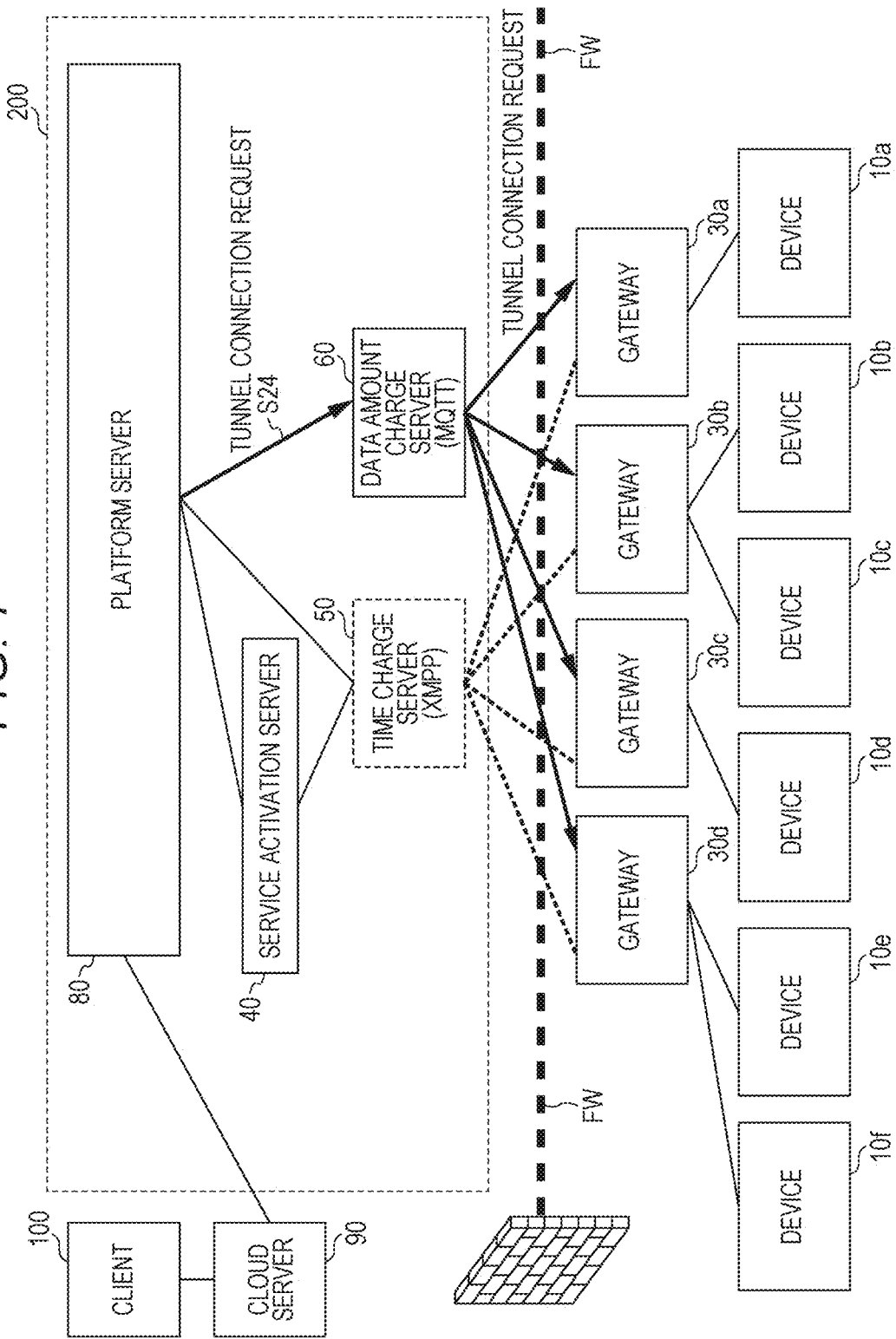
FIG. 7 is a diagram illustrating a state in which a tunnel connection request relevant to each communication target device is transmitted to each corresponding gateway through a data amount charge server.

For example, in a case where the fee of the data amount charge server 60 is less expensive than the fee of the time charge server 50, the data amount charge server 60 is selected (determined) as the connection request transfer server. In other words, the second route is selected (determined) from the plurality of types of communication routes, as the communication route for a connection request. Then, in step S24, the platform server 80 transmits the tunnel connection request to each of the gateways (the corresponding gateways) 30 corresponding to each of the communication target devices 10, through the data amount charge server 60 (refer to FIG. 7). FIG. 7 illustrates a state in which the tunnel connection request relevant to each of the communication target devices 10, is transmitted to each of the corresponding gateways 30, through the data amount charge server 60.

Figure 8:
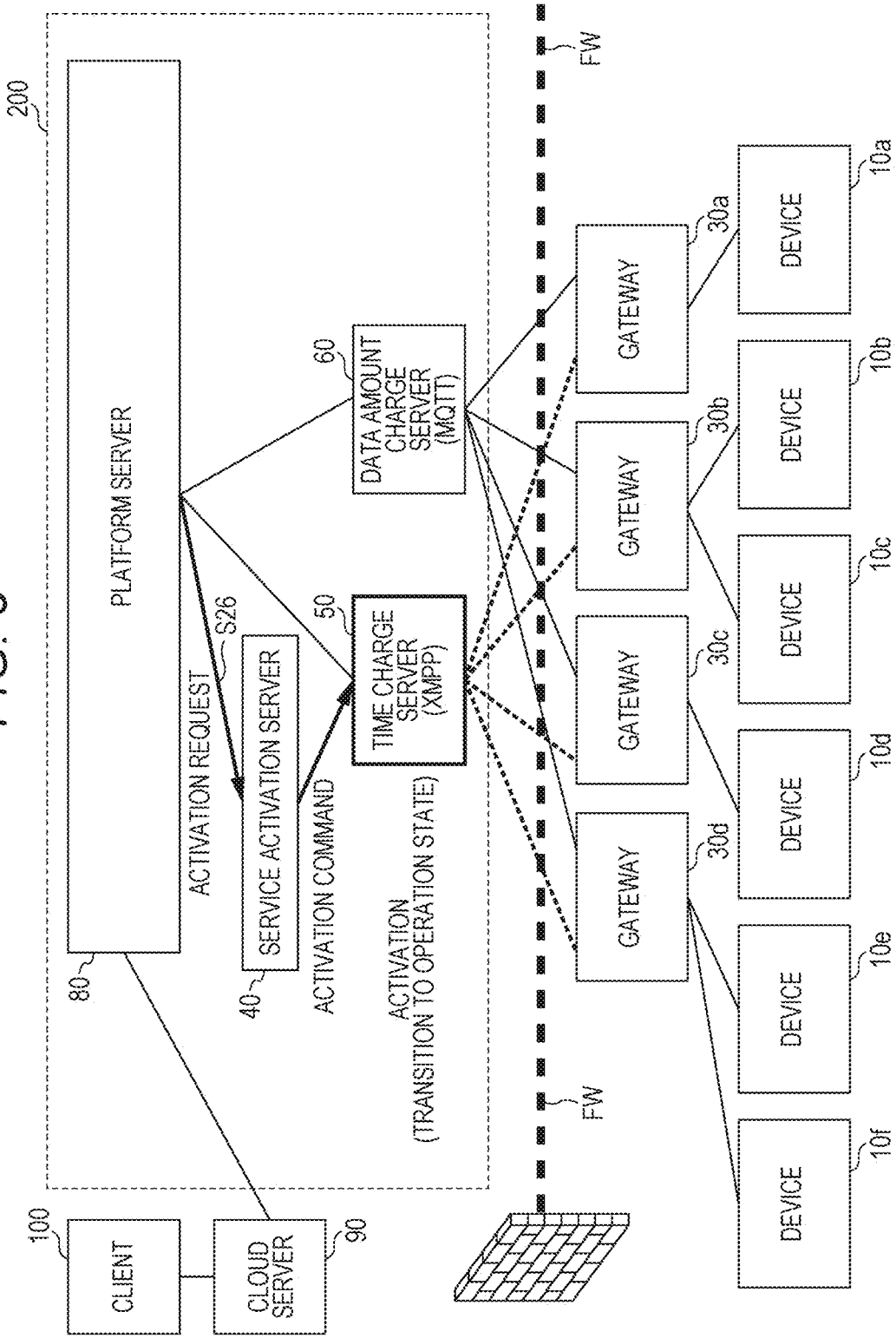
FIG. 8 is a diagram illustrating a state in which a time charge server in a non-operation state, is activated.

On the other hand, in a case where the fee of the time charge server 50 is less expensive than the fee of the data amount charge server 60, the time charge server 50 is selected (determined) as the connection request transfer server. In other words, the first route is selected (determined) from the plurality of types of communication routes, as the communication route for a connection request. Then, the process proceeds to step S26 (FIG. 5). In step S26, the platform server 80 delivers the activation request for activating the time charge server 50 corresponding to each of the corresponding gateways, to the service activation server 40 (also refer to FIG. 8). The service activation server 40 transmits the activation command to one or a plurality of time charge servers 50 (in FIG. 8, one time charge server 50), on the basis of the activation request, and activates the one or the plurality of time charge servers 50. The one or the plurality of time charge servers 50 are transitioned to the operation state, according to the activation command (refer to FIG. 8).

Figure 9:
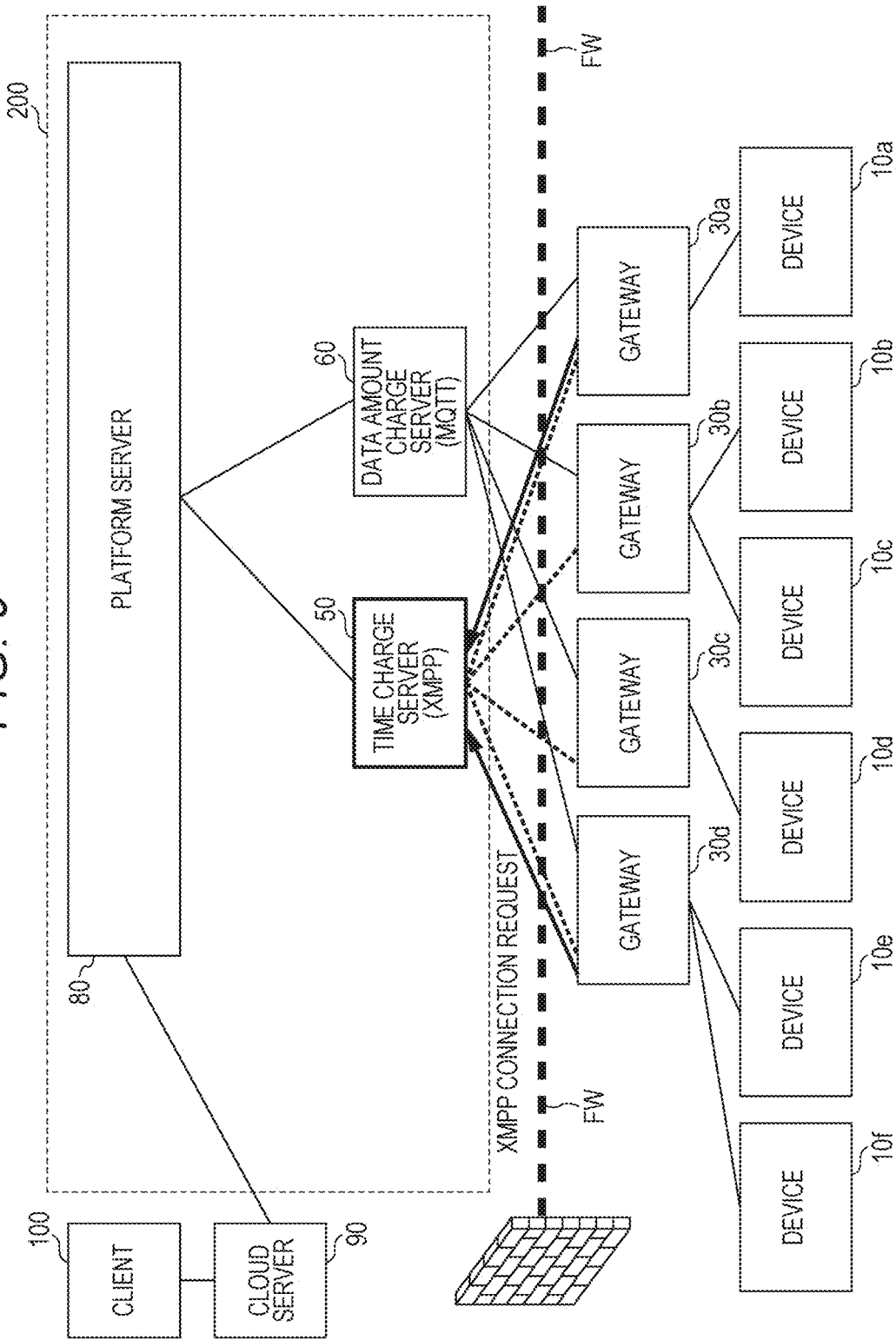
FIG. 9 is a diagram illustrating a state in which an XMPP connection request transmitted from the gateway at a pre-determined time interval, is received by the time charge server after being activated.
Figure 10:
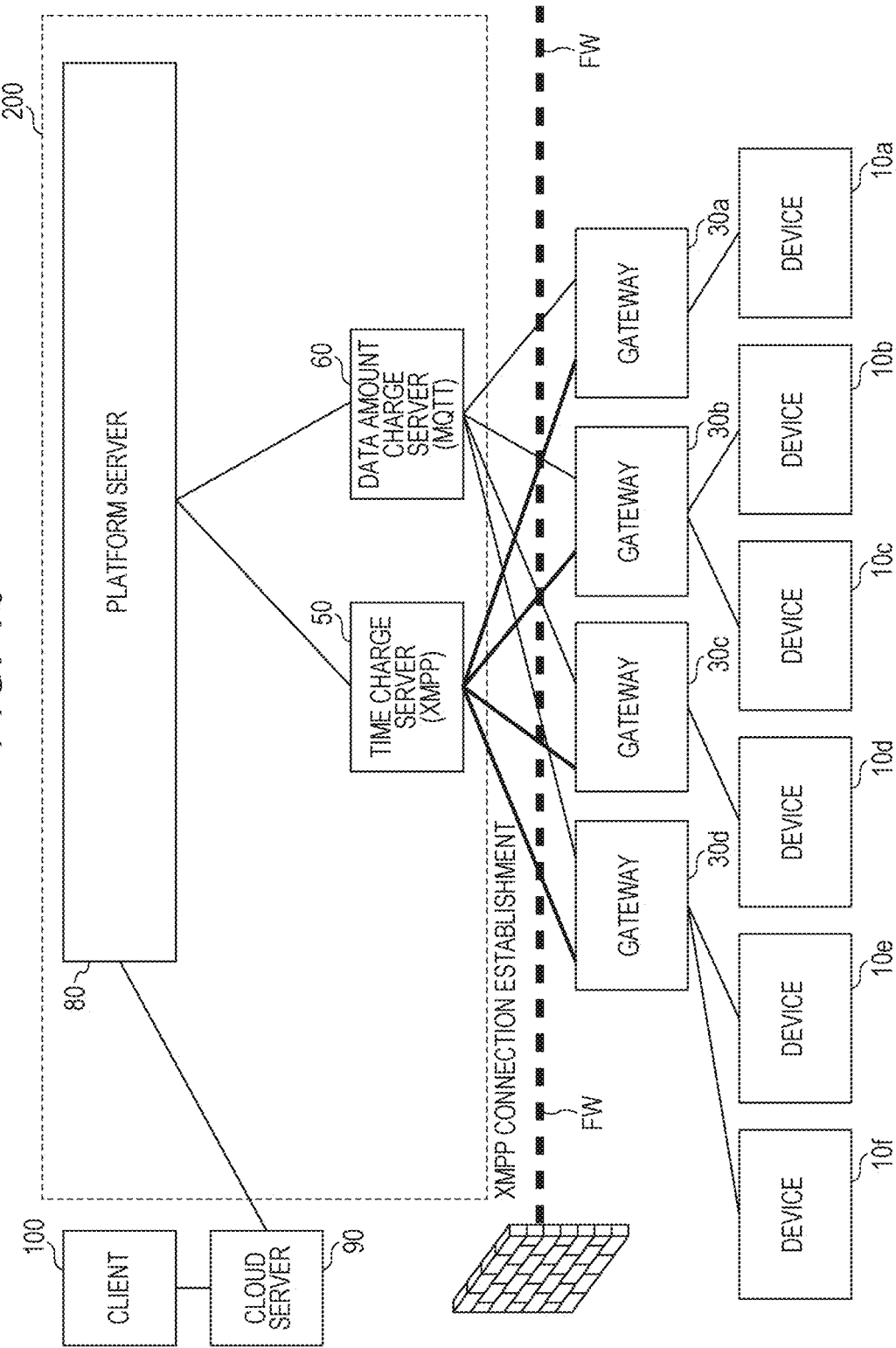
FIG. 10 is a diagram illustrating a state in which XMPP connection is established between each gateway and the time charge server.

As described above, in the state where the connection with respect to the time charge server 50 has not been established yet (the unconnected state), each of the gateways 30 transmits the connection request to the time charge server 50 corresponding to the gateway 30, at a predetermined time interval (for example, 1 minute interval) (refer to FIG. 9). In a case where the time charge server 50 is in the operation state, the time charge server 50 receives the connection request, and each XMPP connection is established between each of the gateways 30 and the time charge server 50 (refer to FIG. 10). In addition, each of the time charge servers 50 transmits the fact that the XMPP connection is established, to the platform server 80.

Figure 11:
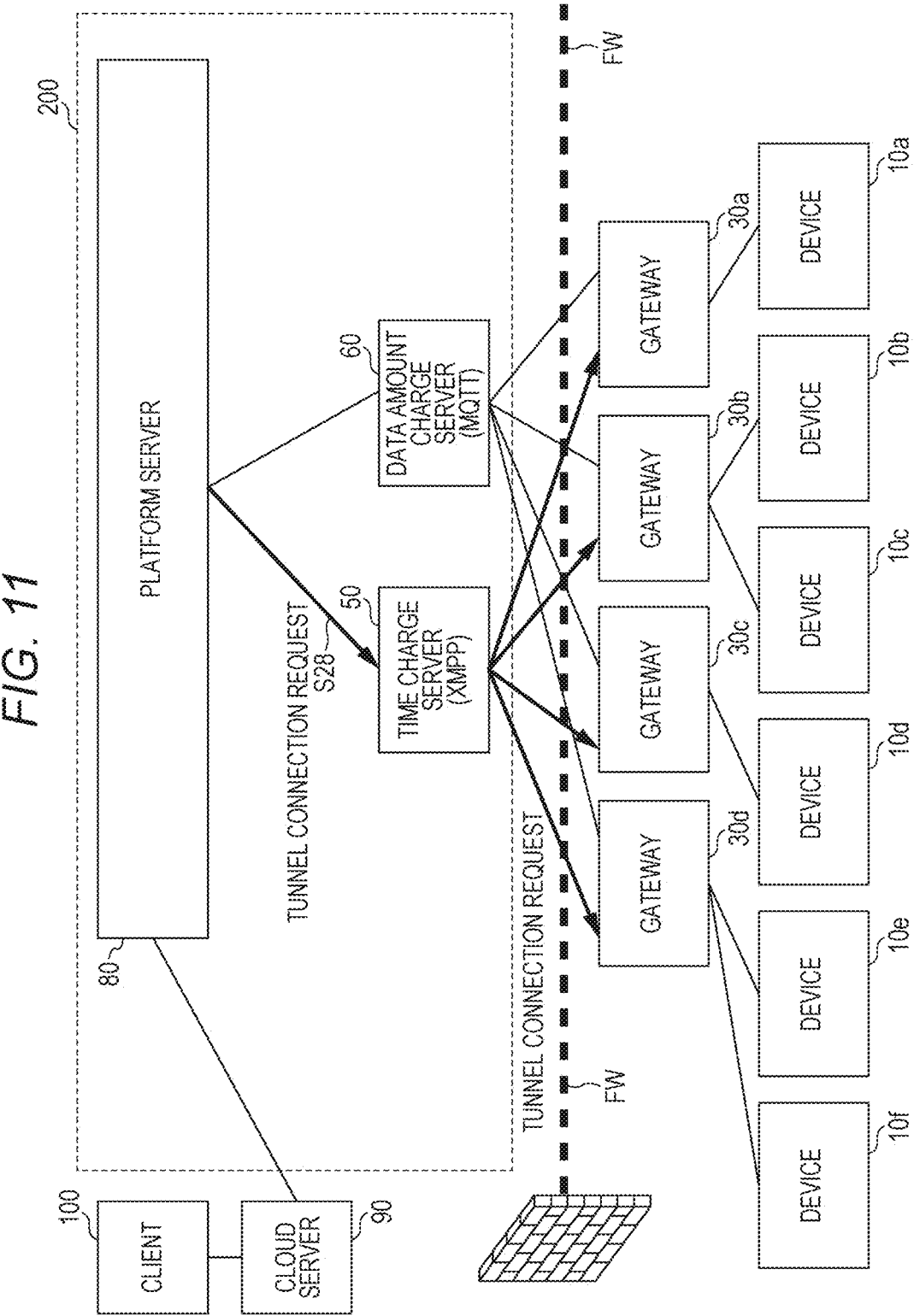
FIG. 11 is a diagram illustrating a state in which the tunnel connection request relevant to each of the communication target devices, is transmitted to each of the corresponding gateways through the time charge server (through the XMPP connection)

Then, the platform server 80 starts processing of transmitting the tunnel connection request to each of the gateways 30 through each of the time charge servers 50, by using the XMPP connection (step S28). In other words, the platform server 80 starts processing of transmitting the tunnel connection request to each of the communication target gateways, through the first route between each of the gateways 30 and the activated time charge server 50 (refer to FIG. 11). FIG. 11 illustrates a state in which the tunnel connection request relevant to each of the communication target devices 10, is transmitted to each of the corresponding gateways 30 through the time charge server 50.

After that, in a case where the tunnel connection request is received through the time charge server 50 or the data amount charge server 60, each of the gateways (also referred to as the communication target gateway) establishes the tunnel connection with respect to the cloud server 90, on the basis of the tunnel connection request.

Then, each of the communication target gateways 30 relays the communication between the cloud server 90 of the transmission source of the access request and each of the devices corresponding to each of the communication target gateways, by using the established tunnel connection.

According to the operation as described above, the platform server 80 transmits the tunnel connection request (the message) relevant to each of the communication target devices designated in the access request from the cloud server 90, to each of the communication target gateways 30, through the message session established between the server that is operated in the unfixed amount charge structure, and each of the communication target gateways corresponding to each of the communication target devices. In short, the tunnel connection request is transmitted to each of the communication target gateways 30, by using the server that is operated in the unfixed amount charge structure, as the connection request transfer server (the message transfer server). Therefore, it is possible to reduce the operational cost of the communication system 1 (in particular, the operational cost of the connection request transfer server), compared to a case where the tunnel connection request is transmitted to each of the communication target gateways 30 by using the fixed operation server (the server that is operated by being purchased, the server that is operated by being loaned in the fixed amount charge structure (the fixed charge), or the like) (in other words, a case where the fixed operational cost is constantly generated in the message transfer server for transferring the message over the firewall)

.

In addition, the platform server 80 determines the connection request transfer server from the plurality of types of servers 50 and 60 that are operated in the unfixed amount charge structure of types different from each other, and have the magnitude relationship of the charge amounts of the plurality of types of servers 50 and 60, capable of being changed according to the communication mode (the number of messages, or the like), on the basis of the communication mode information of the access request. In other words, the platform server 80 selects the communication route for a connection request (the communication route for message transmission) relevant to the communication target device designated in the access request from the cloud server 90, from the plurality of types of communication routes, on the basis of the communication mode information of the access request. Specifically, a route having the least expensive usage fee, is selected from the first route through the time charge server 50 in the plurality of types of servers 50 and 60, and the second route through the server of the data amount charge server 60 in the plurality of types of servers. In short, the less expensive server is selected from two types of servers, on the basis of the number of communication target devices designated in the access request. Therefore, it is possible to further suppress the operational cost of the communication system 1.

2. Second Embodiment

A second embodiment is a modification example of the first embodiment. Hereinafter, differences from the first embodiment will be mainly described.

In the first embodiment described above, the platform server 80 immediately executes the communication route selection processing (steps S21 to S23) (FIG. 4), in response to the reception of one access request, and immediately starts the processing of transmitting the tunnel connection request through the selected communication route for a connection request (steps S24 and S28), but is not limited thereto.

For example, the platform server 80 may stand by until a predetermined period T2 (for example, 12 hours) has elapsed from a reception time point of the one access request, and then, may execute the communication route selection processing relevant to the plurality of communication target devices included in a plurality of access requests also including another access request that is further received in the predetermined period, or the like. Specifically, the communication route for a connection request relevant to the plurality of communication target devices designated as a communication target in the plurality of access requests, may be selected on the basis of communication mode information of the plurality of access requests. Then, processing of transmitting the tunnel connection request to each of the communication target gateways corresponding to the plurality of communication target devices, through the selected communication route for a connection request, may be started. Accordingly, it is possible to more suitably determine the connection request transfer server for transferring the tunnel connection request relevant to a larger number of communication target devices. In particular, it is possible to suppress the usage fee, by collectively transmitting a larger number of tunnel connection requests. In other words, it is possible to further suppress the operational cost of the communication system 1.

In the second embodiment, such a modification example will be described.

Figure 13:
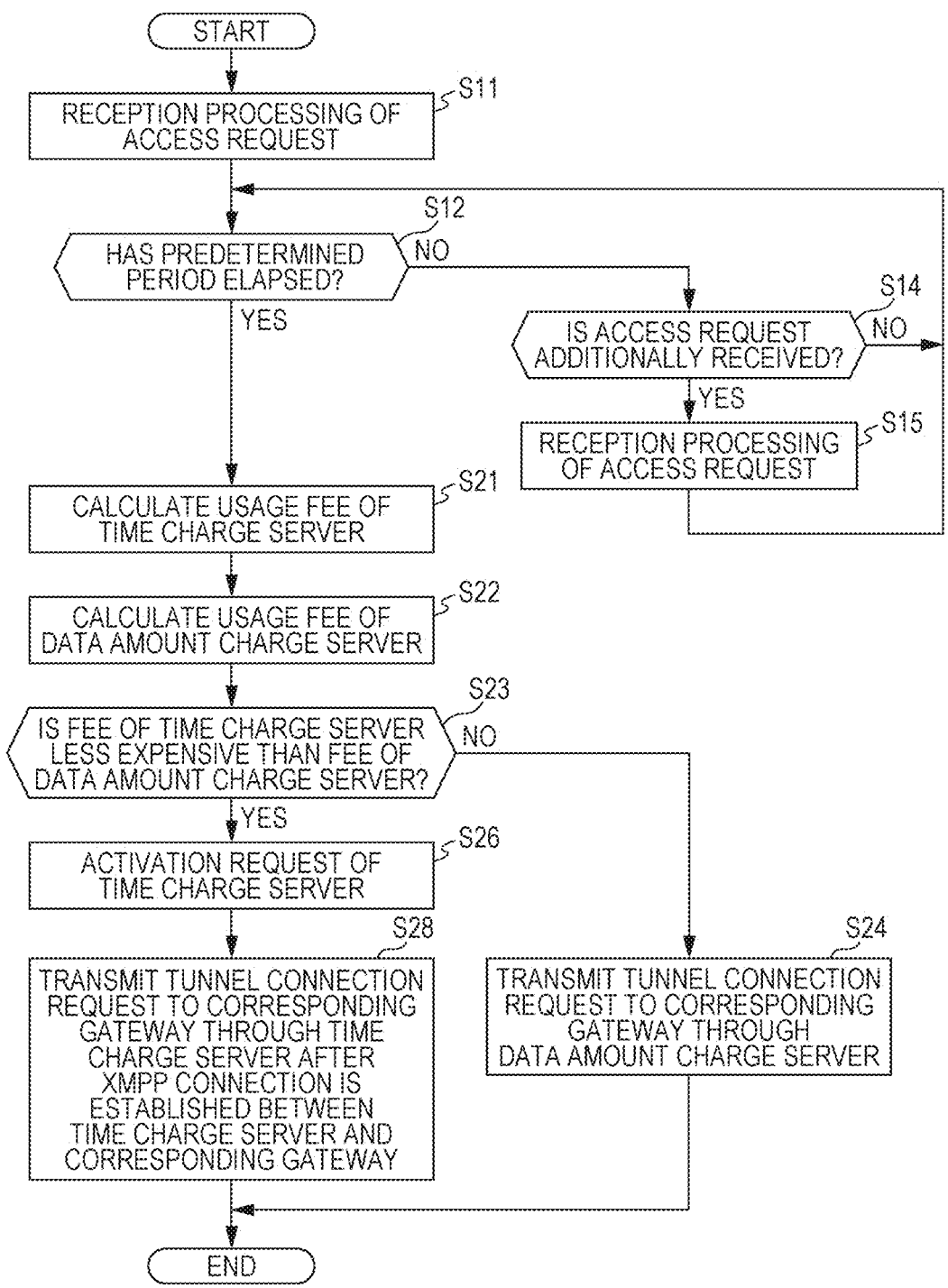
FIG. 13 is a flowchart illustrating an operation according to a second embodiment.

FIG. 13 is a flowchart illustrating the operation of the platform server 80 according to the second embodiment.

As known from a comparison with respect to FIG. 5 (the flowchart illustrating the operation according to the first embodiment), in FIG. 13, steps S12, S14, and S15 are added.

The platform server 80 receives one access request from the cloud server 90 in step S11 (a time t1), and then, stands by until a predetermined period T2 (for example, 12 hours) has elapsed, in a standby loop of steps S12 and S14. In addition, in a case where another access request is further received in a standby period T2, the process proceeds to step S15 from step S14. In step S15, processing of adding a device designated as a communication target in the additionally received access request, to the communication target device, is executed.

After that, in a case where the predetermined period T2 has elapsed from a reception time point t1 of the one access request, the process proceeds to step S21 and the subsequence. In steps S21 to S23, selection processing of the communication route for a connection request relevant to the communication target device including the added device, is executed.

After that, as with the first embodiment, the processing of step S24, or the processing of steps S26 and S28, is executed according to a selection result in step S23.

According to such an operation, it is possible to more suitably determine the connection request transfer server for transferring the tunnel connection request relevant to a larger number of communication target devices. Specifically, it is possible to increase the communication frequency by collectively executing processing relevant to the plurality of access requests. In a case where a comparatively large number of tunnel connection requests are collectively (intensively) transmitted, it is possible to further suppress the operational cost of the communication system 1, compared to a case where the same number of tunnel connection requests are sporadically transmitted. For example, in a case where a plurality of access requests in which a few communication target devices are designated, are received for a short time, and both of the fees described above are calculated each of the access requests, there is a case where the first route (a route through the time charge server) is less expensive according to the total number of communication target devices (the total number of devices that is increased by combining the plurality of access requests) by calculating both of the fees described above by combining the plurality of access requests, even in a situation where it is determined that the second route (a route through the data amount charge server) is less expensive. In this embodiment, in this described above, the less expensive first route is selected by combining the access requests received in a period of the predetermined time T2.

Modification Example of Second Embodiment

In the second embodiment described above, the same value is set with respect to all of the access requests, as the predetermined period T2, but is not limited thereto. The predetermined period T2 according to the type of access request, may be set for each of the access requests. For example, the predetermined period T2 may be changed (set) to a length according to a urgency degree of the type of access request.

Figure 14:
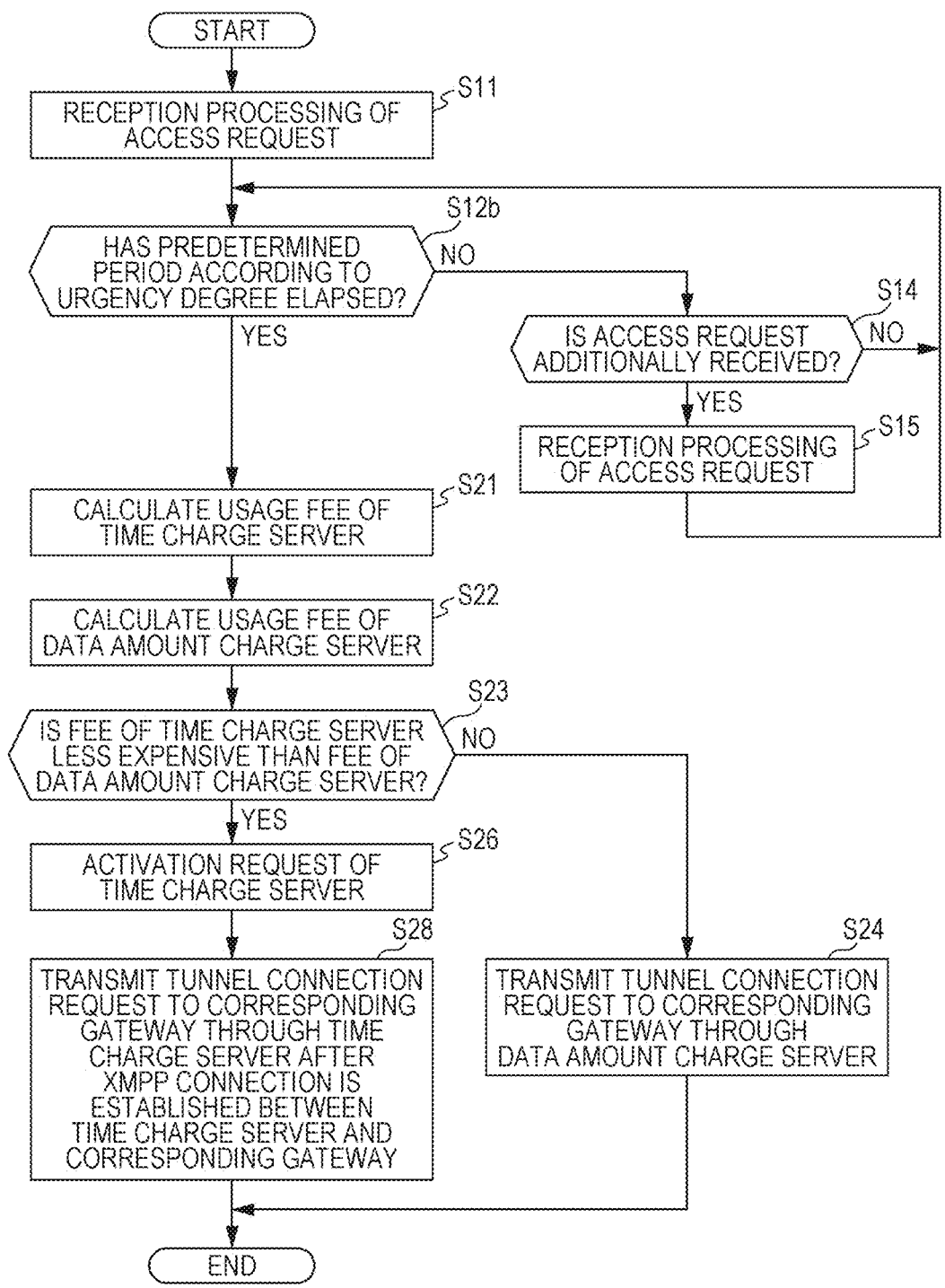
FIG. 14 is a flowchart illustrating an operation according to a modification example of the second embodiment.

FIG. 14 is a flowchart illustrating an operation relevant to such a modification example. As known from a comparison with respect to FIG. 13, in step S12b, a period having a length according to the urgency degree, is set as the predetermined period T2, and it is determined whether or not the predetermined period T2 has elapsed.

FIG. 15 is a diagram illustrating a data table 320 in which a relationship between the type of access request and the predetermined period (standby period) T2 is prescribed in advance. The data table 320 is stored in the platform server 80.

The standby period T2 for each access request is determined on the basis of the type of received access request and the data table 320.

For example, it is determined that the access request of an access type of the "firmware update instruction for security vulnerability", has a comparatively high urgency degree, and the standby period T2 is set to "10 minutes" (a comparatively short period). On the contrary, it is determined that the access request of an access type of the "log upload instruction" (an instruction to the effect of uploading log data in the device 10 to the cloud server 90), has a comparatively low urgency degree, and the standby period T2 is set to "24 hours" (a comparatively long period). Thus, the length of the standby period T2 is determined according to the urgency degree of each of the access requests. Specifically, the standby period T2 relevant to each of the access requests, is changed to a shorter time, as the urgency degree of the access request increases.

Then, it is determined whether or not the standby period T2 has elapsed, in step S12b. In a case where it is determined that the standby period T2 has elapsed, the process proceeds to step S21 and the subsequence, and the same operation as that of the second embodiment may be executed.

Furthermore, in a case where another access request is additionally received in the standby loop of steps S12b and S14, it is preferable to determine whether or not the predetermined period T2 has elapsed with respect to the additionally received access request, in step S12b. Then, the process may proceed to step S21 and the subsequence, at a time point when the standby period T2 corresponding to the access request has elapsed from the reception time point of any access request.

In addition, here, the shortest standby period T2 is set to "10 minutes", but is not limited thereto, and the shortest standby period T2 may be set to "0 minutes" (in other words, "execute immediately").

In addition, in the second embodiment and the modification example thereof, the platform server 80 receives the access request from a single cloud server 90, but is not limited thereto, and the platform server 80 may receive the access request from a plurality of cloud servers 90. Then, the communication route for a connection request relevant to the plurality of communication target devices designated in the plurality of access requests from the plurality of cloud servers 90, may be selected on the basis of the communication mode information of the plurality of access requests.

3. Third Embodiment

A third embodiment is a modification example of the first embodiment. Hereinafter, differences from the first embodiment will be mainly described.

In the third embodiment, at a time point when a predetermined number M1 (for example, 10) of access requests including one access request, is received, the platform server 80 selects the communication route for a connection request relevant to the plurality of communication target devices included in the predetermined number M1 of access requests, on the basis of communication mode information of the predetermined number M1 of access requests. Specifically, the communication route for a connection request relevant to the plurality of communication target devices designated as a communication target in the predetermined number M1 of access requests, is selected on the basis of the communication mode information of the predetermined number M1 of access requests. Then, processing of transmitting the tunnel connection request to each of the communication target gateways corresponding to the plurality of communication target devices, through the selected communication route for a connection request, is started. Accordingly, it is possible to more suitably determine the connection request transfer server for transferring the tunnel connection request relevant to a larger number of communication target devices. In particular, it is possible to suppress the usage fee by collectively transmitting a larger number of tunnel connection requests. In other words, it is possible to further suppress the operational cost of the communication system 1.

In the third embodiment, such a modification example will be described.

Figure 16:
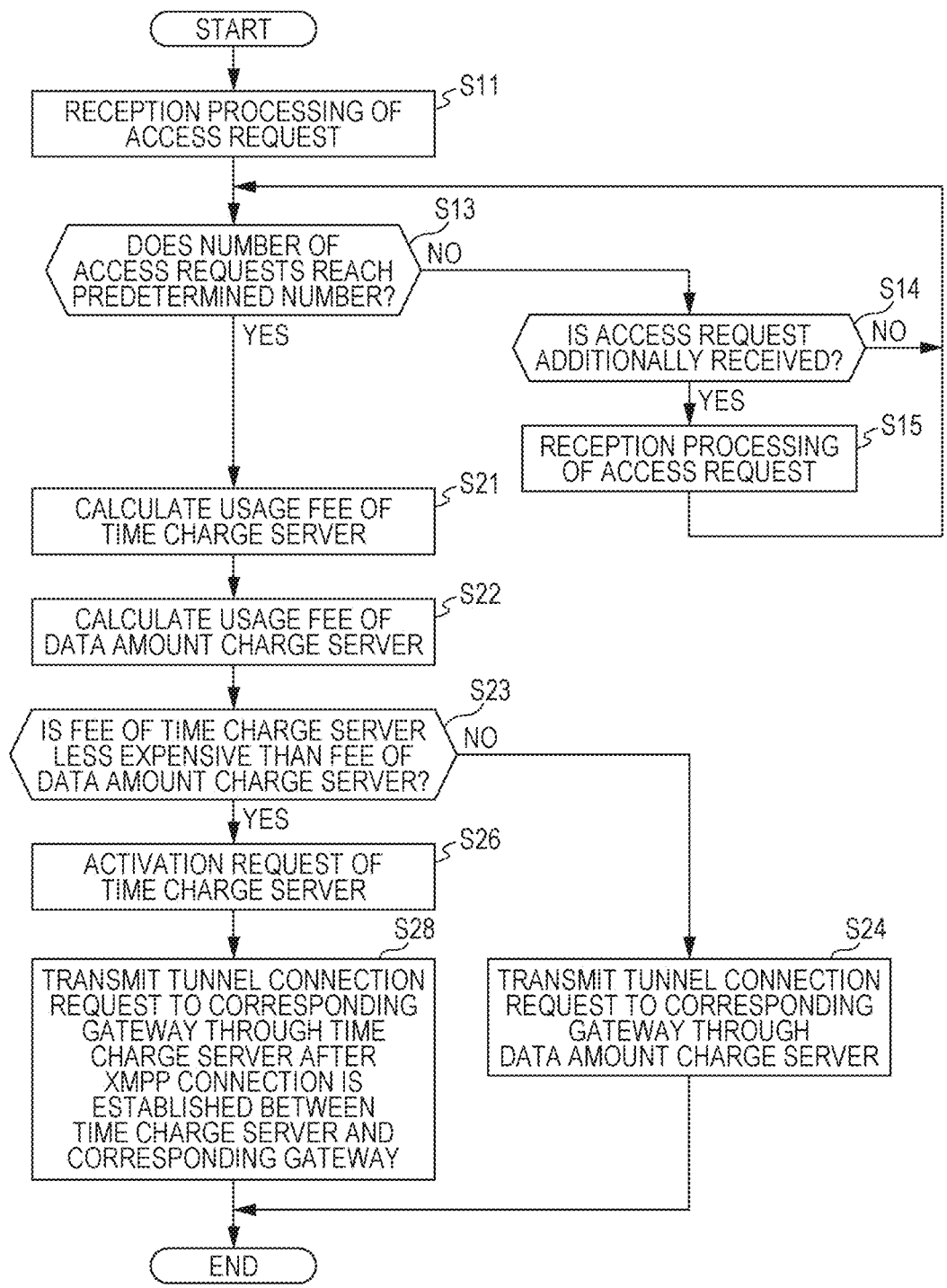
FIG. 16 is a flowchart illustrating an operation according to a third embodiment.

FIG. 16 is a flowchart illustrating the operation of the platform server 80 according to the third embodiment.

As known from a comparison with respect to FIG. 5 (the flowchart illustrating the operation according to the first embodiment), in FIG. 16, steps S13, S14, and S15 are added.

The platform server 80 receives the one access request from the cloud server 90, in step S11, and then, stands by until the number of receptions of the access request reaches the predetermined number M1 (for example, 10), in the standby loop of steps S13 and S14. In addition, in a case where another access request is further received in the standby period, the process proceeds to step S15 from step S14. In step S15, processing of adding a device designated as a communication target in the additionally received access request, to the communication target device, is executed.

After that, in a case where the number of receptions of the predetermined number M1 of access requests reaches a predetermined number M, the process proceeds to step S21 and the subsequence. In steps S21 to S23, selection processing of the communication route for a connection request relevant to the communication target device including the added device, is executed.

After that, as with the first embodiment, the processing of step S24, or the processing of steps S26 and S28, is executed according to the selection result in step S23.

According to such an operation, it is possible to obtain the same effect as that of the second embodiment by collectively executing the processing relevant to the plurality of access requests.

Modification Example of Third Embodiment

In the third embodiment described above, selection processing of the communication route for a connection request is collectively executed with respect to the predetermined number M1 of access requests, but is not limited thereto. The selection processing of the communication route for a connection request may be collectively executed with respect to a predetermined number M2 (for example, 1000) of communication target devices designated as a communication target in at least one access request.

Specifically, at a time point when at least one access request with respect to a predetermined number or more of communication target devices is received, the platform server 80 may execute the selection processing of the communication route for a connection request relevant to the plurality of communication target devices designated as a communication target in at least one access request. In other words, when the total number of communication target devices designated as a communication target in one or a plurality of received access requests (the total number of designated devices) is greater than or equal to the predetermined number M2, the selection processing of the communication route for a connection request relevant to the plurality of communication target devices, may be executed.

Other Modification Examples of Third Embodiment

Figure 17:
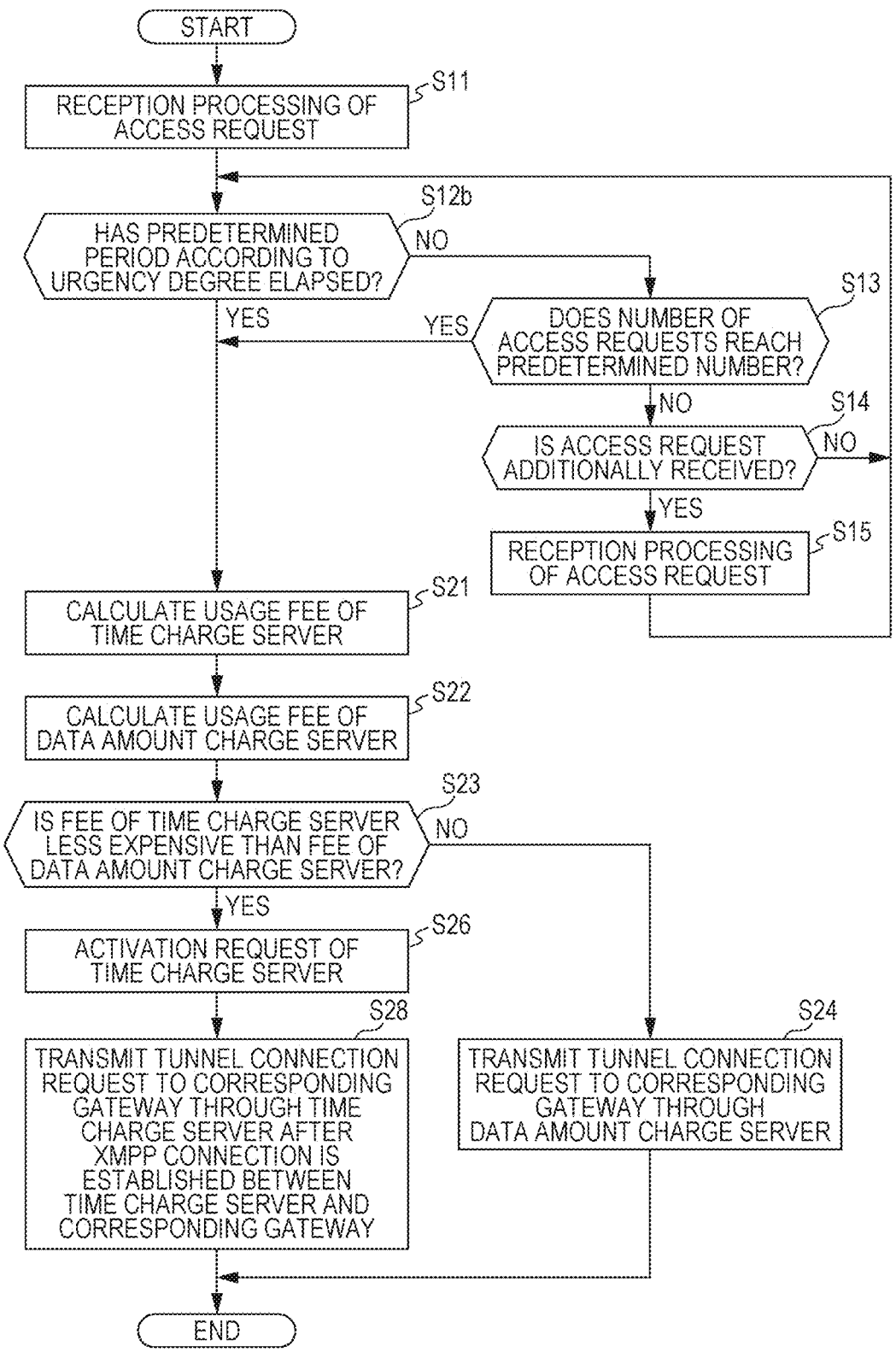
FIG. 17 is a flowchart illustrating an operation according to a modification example of the third embodiment.

In addition, the mode of the third embodiment, may be executed by being combined with the mode of the second embodiment. Specifically, as illustrated in FIG. 17, at the earlier time point in a time point when the standby period T2 has elapsed and a time point when the number of access requests reaches the predetermined number M1, the selection processing of the communication route for a connection request relevant to the plurality of communication target devices designated as a communication target in the access requests that have been received, may be executed. In FIG. 17, the standby loop of steps S12*b*, S13, and S14 is illustrated. As illustrated in FIG. 17, it may be determined that the predetermined period T2 has elapsed in step S12*b*, or the selection processing of the communication route for a connection request, or the like may be executed at the time point when the number of received access requests reaches the predetermined number M1 in step S13. Furthermore, in step S13, it may be determined whether or not the number of receptions of the access request reaches the predetermined number M1, and/or, it may be determined whether or not the total number of designated devices reaches the predetermined number M2.

4. Fourth Embodiment

A fourth embodiment is a modification example of the first embodiment to the third embodiment, and the like. Hereinafter, differences from the first embodiment will be mainly described.

In each of the embodiments described above, the platform server 80 executes the communication route selection processing according to the reception of at least one access request (step S21 to S23), and starts processing of transmitting the tunnel connection request through the selected communication route for a connection request (steps S24 and S28).

After that, in a case where a new access request (also referred to as a second access request) is further received transmission processing of all of the tunnel connection requests relevant to the at least one access request (also referred to as a first access request) is completed, the communication route selection processing may be executed again, in consideration of the communication target device corresponding to a tunnel connection request of which the transmission is incomplete at a reception time point of the new access request. Specifically, the communication route for a connection request relevant to an "incomplete device" in at least one communication target device in the first access request, and the communication target device in the second access request, may be selected from the plurality of types of communication routes, on the basis of communication mode information of the first access request and communication mode information of the second access request. Here, the "incomplete device" is a communication target device in which the transmission processing of the tunnel connection request according to the first access request is incomplete, in the communication target devices designated as a communication target in the first access request.

Figure 18:
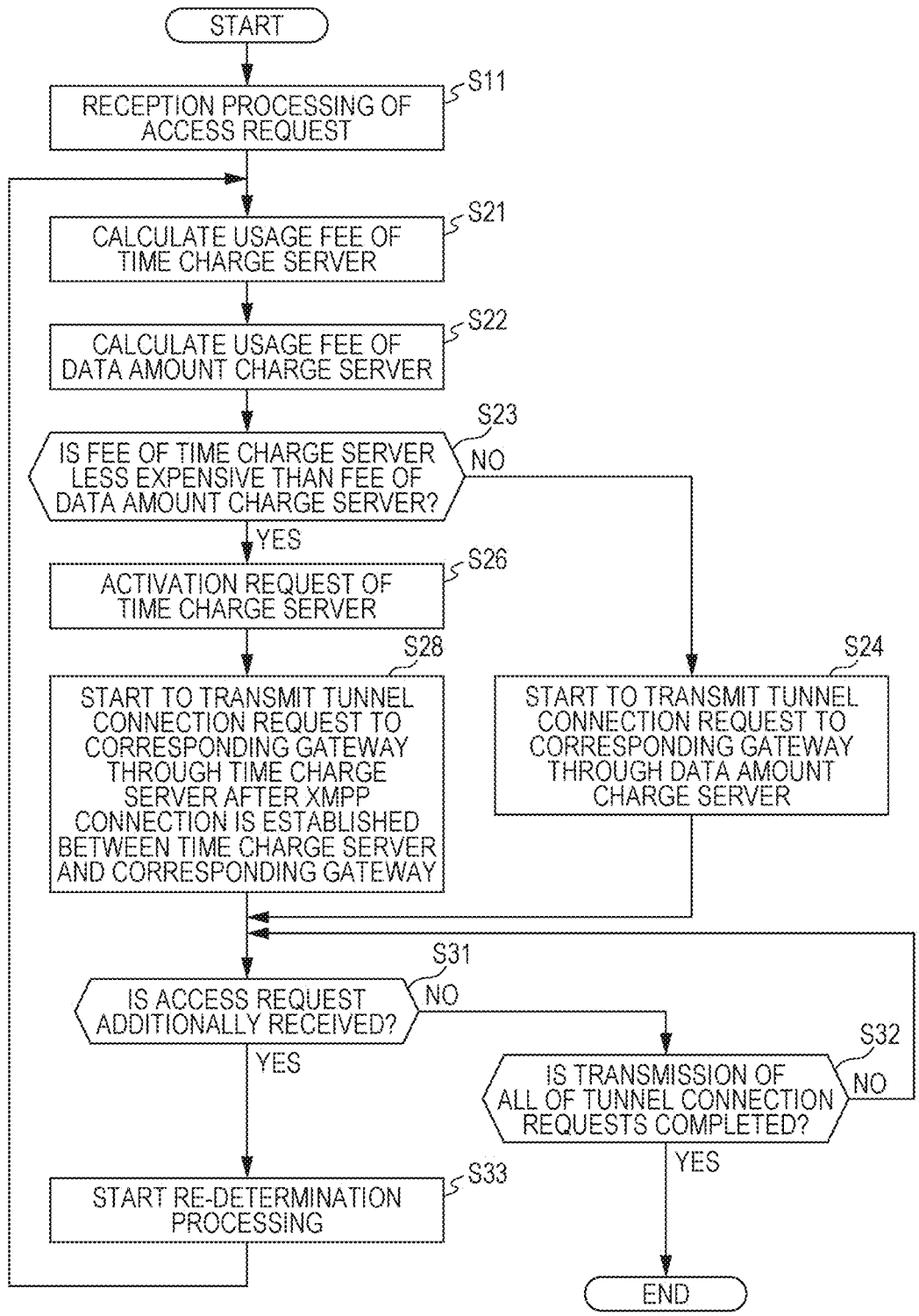
FIG. 18 is a flowchart illustrating an operation according to a fourth embodiment.

In the fourth embodiment, such a mode will be described with reference to FIG. 18. FIG. 18 is a flowchart illustrating the operation of the platform server 80 according to the fourth embodiment.

In a case where the communication route selection processing relevant to the first access request (at least one access request) is executed (steps S21 to S23), and the tunnel connection request is started (steps S24 and S28), standby processing of the new access request (steps S31 and S32) is executed.

In a standby state of the standby loop of steps S31 and S32, in a case where it is determined that the transmission of the tunnel connection request relevant to all of the communication target devices designated in the first access request, is completed, in step S32, the processing of FIG. 18 is ended.

On the other hand, in the standby state of the standby loop of steps S31 and S32, when the new access request is received by the platform server 80 until the transmission of the tunnel connection request relevant to all of the communication target devices designated in the first access request, is completed, the process proceeds to step S33 from step S31. In step S33, it is determined that re-determination processing of the communication route is executed, the process returns to step S21.

In the re-determination processing (S21 to S23) (also referred to as re-selection processing) after returning to step S21, the communication route for a connection request relevant to the "incomplete device" (also referred to as residual communication target devices) in all of the communication target devices designated in the first access request, and all of the communication target devices designated in the second access request, is selected from the plurality of types of communication routes, on the basis of the communication mode information of the first access request and the communication mode information of the second access request.

In step S24 or step S28 subsequent thereto, transmission processing of transmitting the tunnel connection request with respect to the communication target gateway corresponding to each of the incomplete device and the communication target device in the second access request, through the communication route for a connection request selected from the plurality of types of communication routes in the re-determination processing, is started.

In the re-determination processing described above, for example, when 850 communication target devices in 1000 communication target devices designated as a communication target in the first access request, are the incomplete device, it is determined that there are 853 communication target devices along with three communication target devices designated in the second access request. Then, the optimal communication route for transmitting the tunnel connection request relevant to the 853 communication target devices, is selected.

More specifically, in a case where the first route through the time charge server 50 is selected as the communication route for a connection request relevant to "1000" communication target devices, in the re-determination processing, the first route through the time charge server 50 is continuously selected as the communication route for a connection request relevant to "853" communication target devices. Accordingly, it is possible to further reduce the operational cost, by collectively processing a larger number of communication target devices.

5. Fifth Embodiment

In each of the embodiments described above, the mode of the communication system 1 is exemplified in which only a device capable of selectively using the plurality of types of servers as the communication server of the tunnel connection request (the connection request transfer server) (in other words, a device capable of selectively using the plurality of communication routes), is designated as a communication target device in the access request. However, it is not limited thereto, but a device capable of using only the fixed operation server (50*x* or the like) according to the comparative example, as the communication server of the tunnel connection request, may be designated as a communication target device in the access request.

In a fifth embodiment, there are two types of devices as the device 10. Specifically, there are a "first type device" (a device capable of selectively using the plurality of types of unfixed amount charge servers (50 and 60) as the connection request transfer server (the communication server of the tunnel connection request)), and a "second type device" (a device capable of using only the fixed operation server (50*x* or the like) as the connection request transfer server). The second type device corresponds to the device according to the comparative example, and is also referred to as an "old type device". On the other hand, the first type device is a new type of device to which the idea according to each of the embodiments described above can be applied, and is also referred to as a "new type device".

Figure 20:
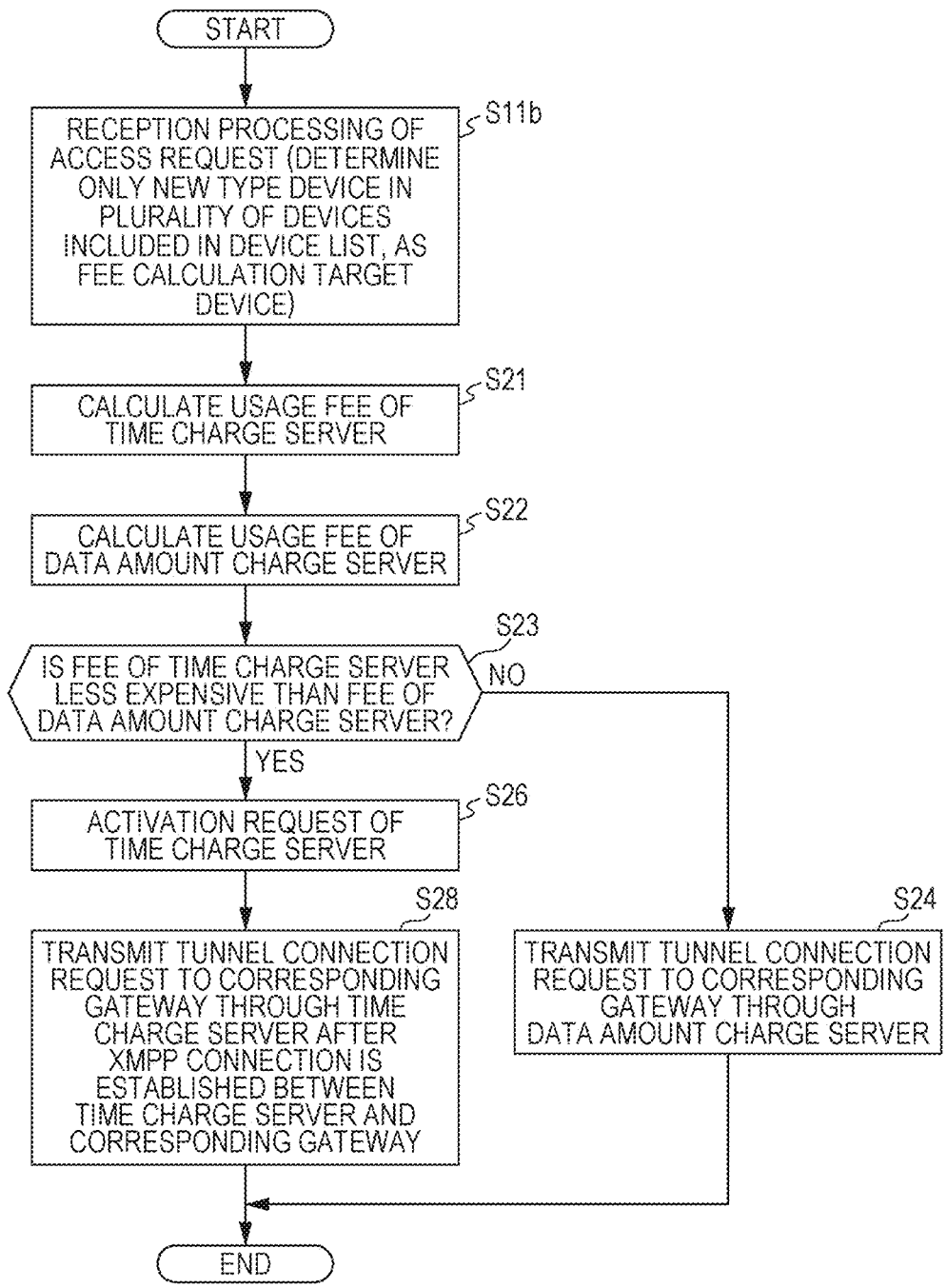
FIG. 20 is a flowchart illustrating an operation according to a fifth embodiment.

FIG. 20 is a flowchart illustrating the operation of the platform server 80 according to a fifth embodiment. In addition, FIG. 21 is a diagram illustrating a schematic configuration of the communication system 1 according to the fifth embodiment.

Figure 21:
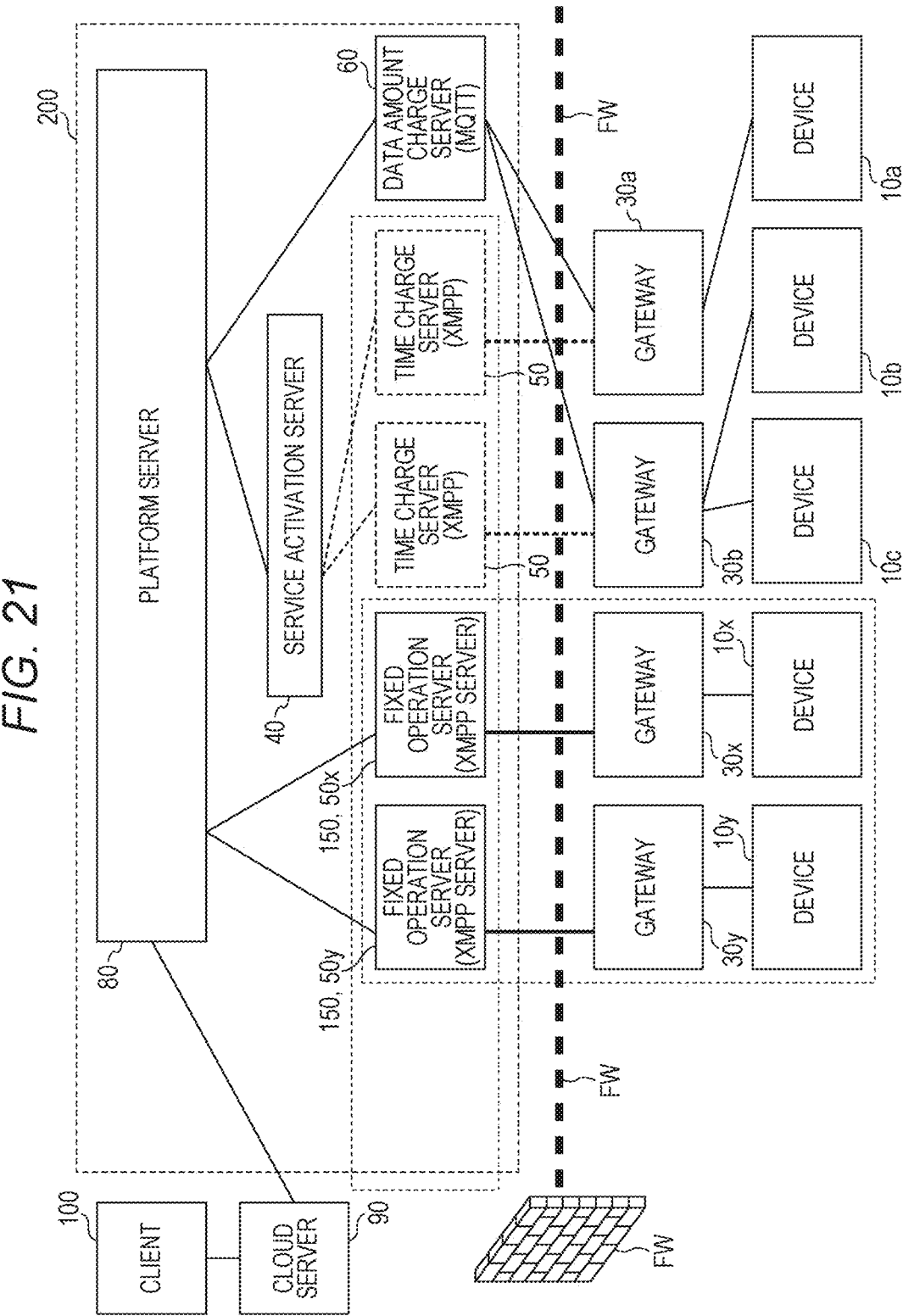
FIG. 21 is a diagram illustrating a schematic configuration of a communication system according to the fifth embodiment.

As illustrated in FIG. 21, in the communication system 1 according to the fifth embodiment, the data amount charge server 60 and the time charge server 50 are provided, as with the first embodiment or the like. Further, a fixed operation server 150 that is used as the connection request transfer server relevant to the old type device (the XMPP server 50*x*, 50*y*, or the like) is also provided.

Here, both of the time charge server 50 and the fixed operation server 150 are the XMPP server. However, the time charge server 50 is a time charge type server, and is in the non-operation state (the non-activation state) in normal times (at the time of not being used) (refer to FIG. 21). FIG. 21 illustrates that the time charge server 50 is in the non-operation state by expressing a rectangular representing the time charge server 50 with a broken line. Specifically, in a case where the first route is not selected as the communication route for a connection request, the time charge server 50 is not operated. In contrast, in a case where the first route is selected as the communication route for a connection request, the time charge server 50 is activated. In a case where the time charge server 50 is in the operation state after the time charge server 50 is activated (after the activation is completed), the time charge server 50 allows communication from the gateway (also referred to as a new type corresponding gateway) (30*a*, 30*b*, or the like) corresponding to the new type device (10*a*, 10*b*, 10*c*, or the like). On the other hand, the fixed operation server 150 is a constantly in the operation state. The fixed operation server 150 constantly allows communication (including the XMPP connection request) from the gateway (also referred to as an old type corresponding gateway) (30*x*, 30*y*, or the like) corresponding to the old type device (10*x*, 10*y*, or the like).

Each of the gateways 30 (30*x*, 30*y*, or the like) related to (associated with) the old type device (10*x*, 10*y*, or the like), constantly forms the XMPP connection with respect to the corresponding fixed operation server 150 (the XMPP server 50*x*, 50*y*, or the like). Specifically, first, each of the gateways 30 (30*x*, 30*y*, or the like) transmits the XMPP connection request to form the XMPP connection with respect to the corresponding fixed operation server 150 (also referred to as the "establishment request of the message session") to the fixed operation server 150, at the time of being activated. The fixed operation server 150 is in a constant operation state, and thus, the XMPP connection (the message session) is established between the fixed operation server 150 and the gateway 30 (FIG. 21). The platform server 80 is capable of transmitting the tunnel connection request according to the XMPP protocol to the gateway 30 (30*x*, 30*y*, or the like) related to the old type device, through the fixed operation server 150.

On the other hand, normally (in the initial state or the like), each of the gateways 30 (30*a*, 30*b*, or the like) related to (associated with) the new type device (10*a*, 10*b*, 10*c*, or the like) does not form the XMPP connection with respect to the corresponding time charge server 50. Specifically, even in a case where each of the gateways 30 (30*a*, 30*b*, or the like) transmits the XMPP connection request to form the XMPP connection with respect to the corresponding time charge server 50, to the time charge server 50, at a predetermined time interval, the time charge server 50 is not in the operation state, and thus, the XMPP connection is not established between the time charge server 50 and the gateway 30 (FIG. 21).

After that, as described below, in a case where the time charge server 50 is selected (determined) as the connection request transfer server relevant to the new type device, the time charge server 50 is activated by the platform server 80 and the service activation server 40. In a case where the time charge server 50 is activated, and is transitioned to the operation state (refer to FIG. 23), the constant connection (the XMPP connection) is established between the new type device 10 and the time charge server 50 corresponding to the new type device 10, and the constant connection (the message session) is ensured as a part of the communication route of the tunnel connection request (the communication route through the firewall). The platform server 80 transmits the tunnel connection request according to the XMPP protocol to the gateway 30 related to the new type device, through the activated time charge server 50 (in other words, by using the XMPP connection) (refer to FIG. 24).

Furthermore, as described above, the data amount charge server 60 is in the constant operation state, and the platform server 80 is capable of transmitting the tunnel connection request according to the MQTT protocol to the gateway 30 related to the new type device, through the data amount charge server 60.

Next, the operation of the fifth embodiment will be described with reference to FIG. 20.

In step S11 (S11*b*) of the fifth embodiment, the access request (including the device list 300) is received, as with the first embodiment or the like, described above. However, in the fifth embodiment, as illustrated in FIG. 25, information of each type of device (an old type/a new type), is also prescribed in the device list 300. Whether each of the devices is the new type device or the old type device is easily discriminated, by using such information. Furthermore, it is not limited thereto, the information of each type of device (the old type/the new type), may be stored in advance in the platform server 80.

In step S11*b*, the platform server 80 extracts the new type device from the plurality of communication target devices designated as a communication target in the device list 300 of the access request (refer to FIG. 25). In other words, in a case where the old type device is included in the plurality of communication target devices designated as a communication target in the device list 300 of the access request (refer to FIG. 25), the old type device is excluded from the target devices in the processing of steps S21, S22, and S23. Specifically, the number of communication target devices, or the like, is calculated by only using the new type device in the new type device and the old type device, as a target (by excluding the old type device).

For example, in a case where 100 old type devices and 700 new type devices (800 devices in total) are designated as a communication target device in the device list 300 of the access request, the number of new type devices of "700" (the number corresponding to a number obtained by subtracting the number of old type devices of "100" from the total number of devices of "800"), is calculated as the number of devices used in steps S21, S22, and S23 (also referred to as a fee calculation target device).

Then, in steps S21, S22, and S23, the communication route for a connection request according to the number of new type devices (for example, "700"), is selected.

After that, as with the first embodiment, the processing of step S24, or the processing of steps S26 and S28, is executed according to the selection result in step S23.

Figure 22:
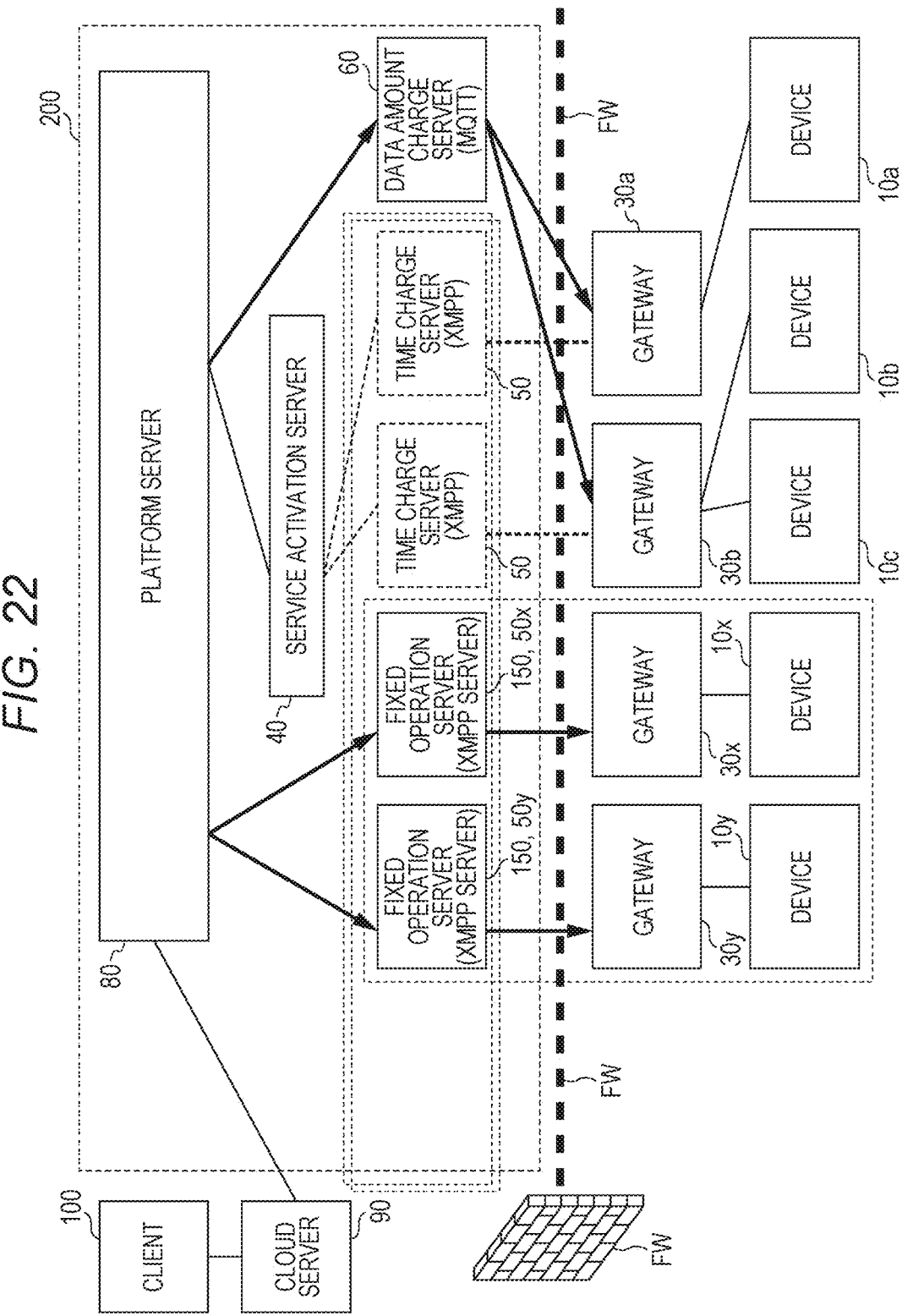

For example, in a case where the data amount charge server 60 is selected (determined) as the connection request transfer server relevant to the new type device, as illustrated in FIG. 22, the platform server 80 transmits the tunnel connection request according to the MQTT protocol to the gateway 30 (30*a*, 30*b*, or the like) related to the new type device, through the data amount charge server 60 (step S24). Furthermore, as described above, the data amount charge server 60 is in the constant operation state, (unlike the time charge server 50).

Figure 23:
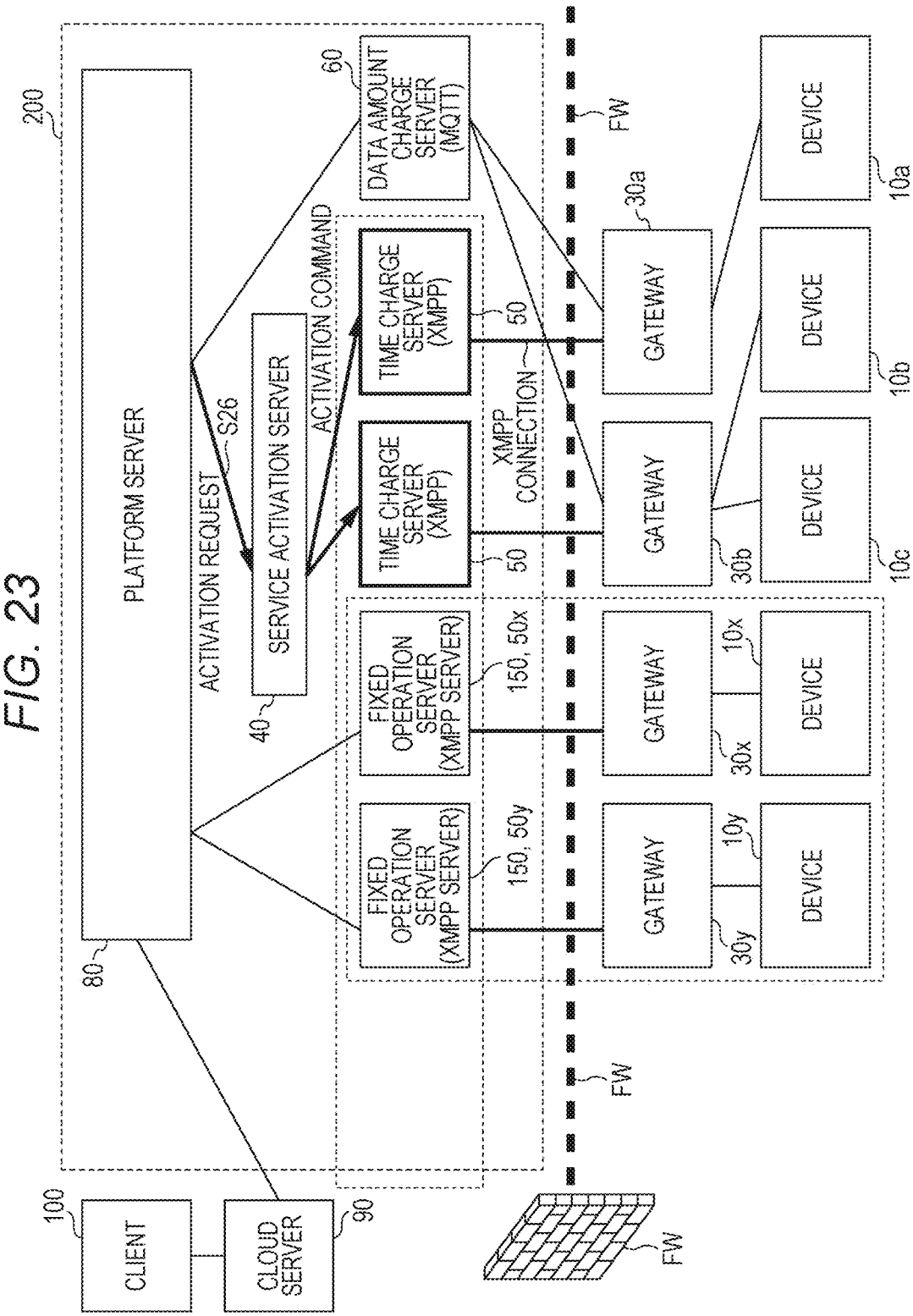
FIG. 23 is a diagram illustrating an operation when a first route (a route through the time charge server) is selected.
Figure 24:
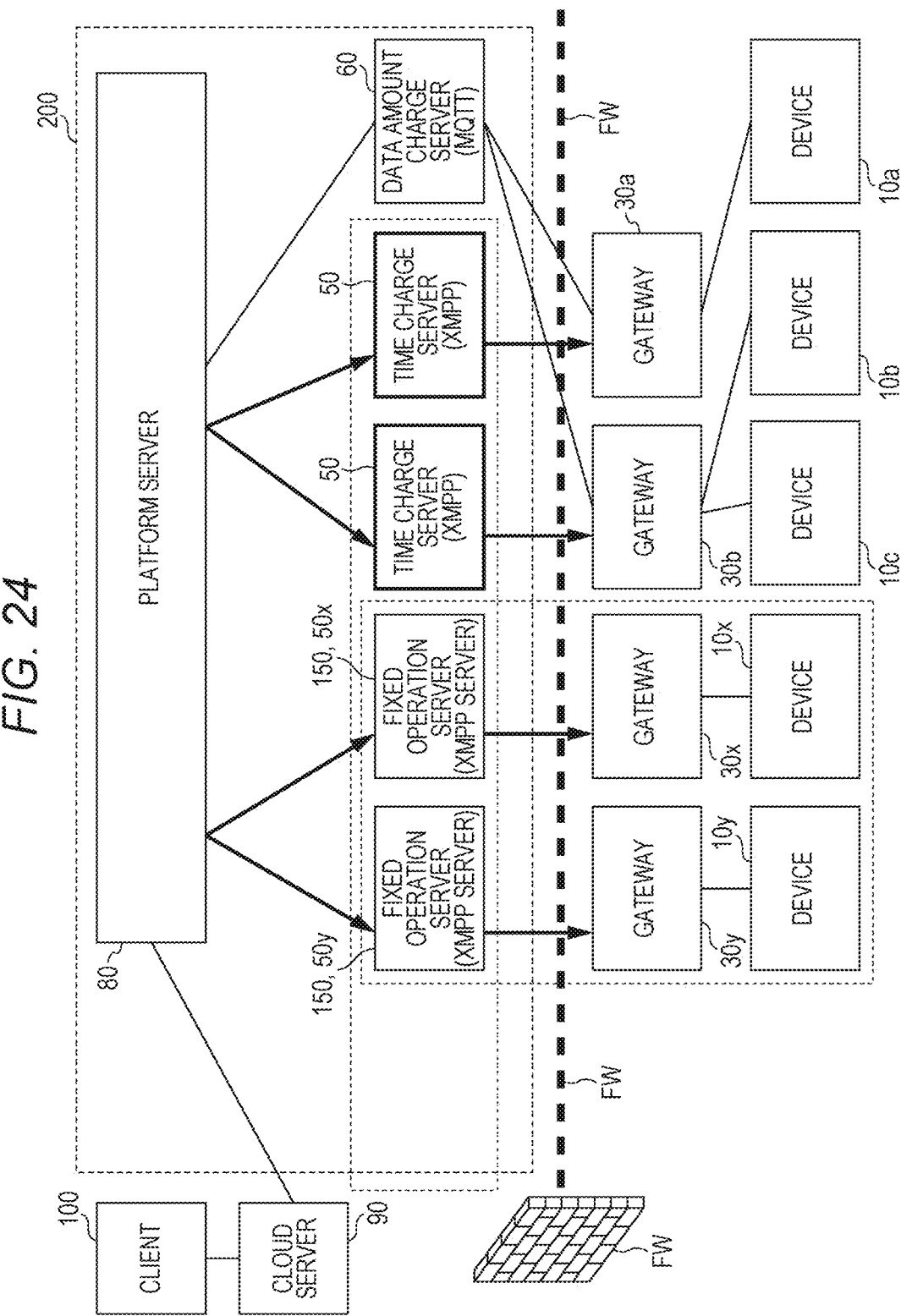

On the other hand, in a case where the time charge server 50 is selected (determined) as the connection request transfer server relevant to the new type device, first, as illustrated in FIG. 23, the platform server 80 (that has not been activated yet) activates the time charge server 50 (step S26). Specifically, the platform server 80 transmits the activation request of the time charge server 50 to the service activation server 40, and the service activation server 40 receiving the activation request activates the time charge server 50. After that, the activated time charge server 50 receives the XMPP connection request from the gateway 30, and thus, the message session (the XMPP connection) is established between the time charge server 50 and the gateway 30. Specifically, the gateway 30 transmits the XMPP connection request the to the time charge server 50, at a predetermined time interval, and the XMPP connection request is received by the time charge server 50 after being activated, and thus, the message session (the XMPP connection) is established. In a case where the message session is established according to the activation of the time charge server 50, the platform server 80 transmits the tunnel connection request according to the XMPP protocol to the gateway 30 (30a, 30b, or the like) related to the new type device, by using the message session (step S28) (also refer to FIG. 24).

Furthermore, even though it is not illustrated in the flowchart of FIG. 20, in each of the old type devices, the tunnel connection request is transmitted to each of the gateways from the platform server 80, through the message session (the XMPP connection) established between each of the gateways (30x, 30y, or the like) corresponding to each of the old type devices (10x, 10y, or the like), and the fixed operation server 150 corresponding to each of the gateways. Specifically, in both of a case where the data amount charge server 60 is selected (determined) as the connection request transfer server relevant to new type device (refer to FIG. 22), and a case where the time charge server 50 is selected (determined) as the connection request transfer server relevant to the new type device (refer to FIG. 24), the fixed operation server 150 is used as the connection request transfer server, in the old type device.

According to such an operation, in the communication system 1 where the new type device and the old type device exist together, it is possible to more suitably determine the connection request transfer server for transferring the tunnel connection request relevant to each type of device.

Furthermore, the idea according to the fifth embodiment may be applied to each of the second embodiment to the fourth embodiment, and the like. In this case, in step S11 (FIG. 13 to FIG. 18, and the like) and step S31 (FIG. 18 and the like), the same operation as that in step S11b (FIG. 20) (extraction processing of the new type device (in other words, exclusion processing of the old type device)) may be performed. Then, the length of the standby period T2 (refer to the second embodiment and the like) and/or whether or not the number of devices reaches the predetermined number (refer to the third embodiment and the like), and the like, may be determined on the basis of the device after being excluded (only the new type device).

The same applies to a sixth embodiment described below, and the idea according to the sixth embodiment may be applied to each of the second embodiment to the fourth embodiment, and the like.

6. Sixth Embodiment

The sixth embodiment is a modification example of the fifth embodiment. Hereinafter, differences from the fifth embodiment will be mainly described.

Figure 26:
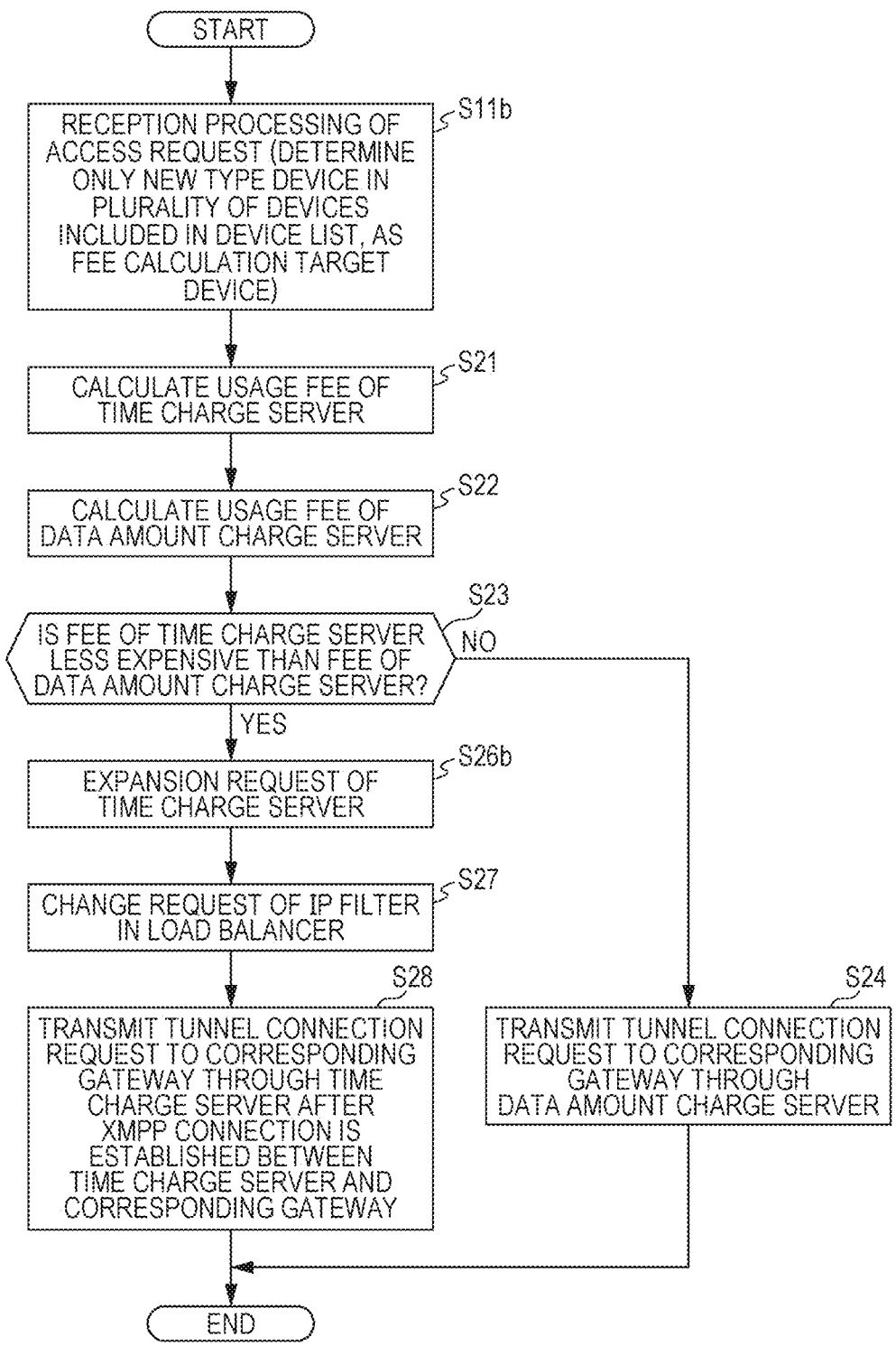
FIG. 26 is a flowchart illustrating an operation according to a sixth embodiment.
Figure 27:
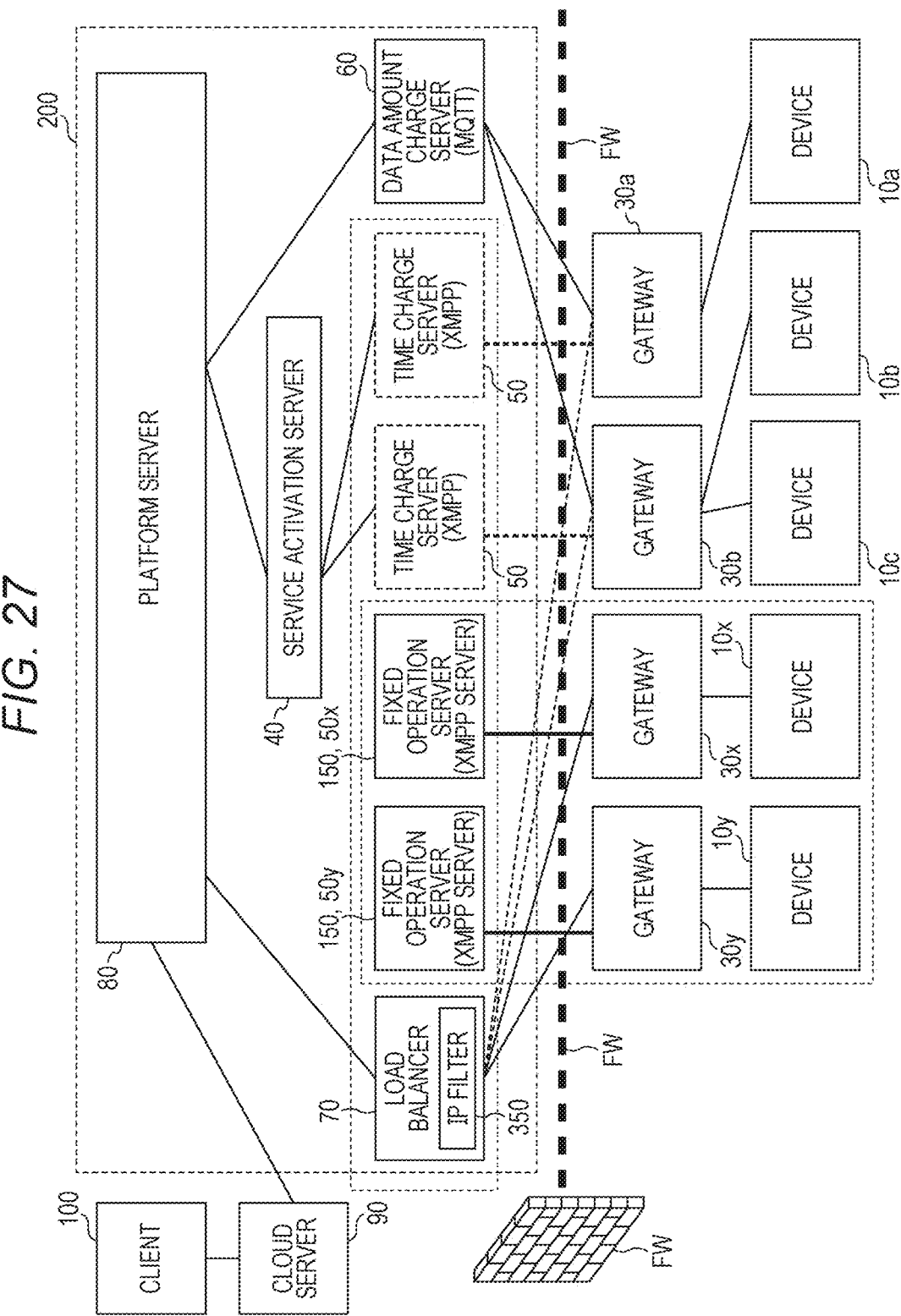
FIG. 27 is a diagram illustrating a schematic configuration of a communication system according to the sixth embodiment.

FIG. 26 is a flowchart illustrating the operation of the platform server 80 according to the sixth embodiment. In addition, FIG. 27 is a diagram illustrating a schematic configuration of the communication system 1 according to the sixth embodiment.

In the communication system 1 according to the sixth embodiment, the new type device (10a, 10b, 10c, or the like) and the old type device (10x, 10y, or the like) exist together. However, in the sixth embodiment, as illustrated in FIG. 27, the management server group 200 also includes the load dispersion server 70 relevant to the XMPP server. The load dispersion server (also referred to as a load balancer server or simply referred to as a load balancer) 70 is an installation that executes load dispersion processing in the plurality of connection request transfer servers (specifically, a plurality of XMPP servers). Furthermore, a target installation (the connection request transfer server) of the load dispersion processing of the load balancer (the load dispersion server) 70 is an installation that is capable of transferring the tunnel connection request by establishing the message session according to a predetermined protocol (here, XMPP) with respect to each of the gateways.

For example, in a situation where a plurality of fixed operation servers 150 are operated, the load balancer 70 executes processing of assigning the XMPP server (the connection request transfer server) to be connected to each of the old type corresponding gateways (30x, 30y, or the like), from the plurality of fixed operation servers 150. In addition, in a situation where the plurality of time charge servers 50 are operated, the load balancer 70 also executes processing of assigning the XMPP server to be connected to each of the new type corresponding gateways (30a, 30b, or the like), from the plurality of time charge servers 50. Further, in a situation where the plurality of XMPP servers including one or more fixed operation servers 150 and one or more time charge servers 50, are operated, the load balancer 70 also executes processing of assigning the XMPP server to be connected to each of the new type corresponding gateways (or each of the old type corresponding gateways), from plurality of XMPP server.

The platform server 80 performs transmission processing with respect to the XMPP server (the fixed operation server 150 and/or the time charge server 50) (the transmission processing of the tunnel connection request, or the like), through the load balancer 70. In addition, each of the gateways 30 also performs the transmission processing with respect to the XMPP server (the transmission processing of the XMPP connection request, or the like), through the load balancer 70. In particular, communication to the XMPP server from the gateway 30, is restricted by an IP filter (described below) of the load balancer 70.

In the load balancer 70, an IP filter (a packet filter) 350 (refer to FIG. 27) in which the permission or rejection with respect to the communication from each of the plurality of gateways is prescribed, is provided. In the IP filter 350, the gateway corresponding to the old type device (the old type corresponding gateway) is registered as a "communication allowed installation", and the gateway corresponding to the new type device (the new type corresponding gateway) is registered as "communication disallowed installation", in an initial state. Specifically, an IP address of the old type corresponding gateway is registered as an IP address of the "communication allowed installation", and an IP address of the new type corresponding gateway is registered as an IP address of the "communication disallowed installation". In the initial state (refer to FIG. 27), the communication from the old type corresponding gateway is allowed, and the communication from the new type corresponding gateway is not allowed, according to a filtering function of the IP filter 350.

In this embodiment, each of the gateways 30 transmits the establishment request of the XMPP connection (the XMPP connection request) with respect to the XMPP server (the fixed operation server 150 or the time charge server 50) to the load balancer 70, (at a predetermined time interval). However, in the initial state, the communication from the old type corresponding gateway is allowed, and the communication from the new type corresponding gateway is not allowed, according to the filtering function of the IP filter 350 described above. In particular, in a case where the first route is not selected as the communication route for a connection request, the communication to the load balancer 70 from the new type corresponding gateway 30 (30*a*, 30*b*, or the like) is not allowed. In addition, as described below, in a case where the first route is selected as the communication route for a connection request, the IP filter 350 is rewritten, and the communication to the load balancer 70 from the new type corresponding gateway 30 (30*a*, 30*b*, or the like), is allowed. Furthermore, the communication from the gateway corresponding to the old type device (the old type corresponding gateway), is constantly allowed.

The communication from the old type corresponding gateway is (constantly) allowed, and thus, the XMPP connection request from the old type corresponding gateway 30 (30*x*, 30*y*, or the like) is (constantly) received by the load balancer 70. Then, the load balancer 70 determines the XMPP server of an assignment destination according to the XMPP connection request (the fixed operation server 150 or the like) (while dispersing a load), and distributes the XMPP connection request to the XMPP server of the assignment destination. Accordingly, the XMPP connection is established between the old type corresponding gateway 30 and the XMPP server of the assignment destination. Thus, the old type corresponding gateway 30 is capable of establishing the message session with respect to any XMPP server under the management of the load balancer 70. Furthermore, the load balancer 70 stores a correspondence relationship between the old type corresponding gateway 30 and the XMPP server assigned to the old type corresponding gateway 30.

After that, in a case where the platform server 80 transmits the tunnel connection request relevant to the old type device, to the load balancer 70, the tunnel connection request is transferred to the gateway corresponding to the old type device (the old type corresponding gateway) 30, through a certain message session. At this time, the load balancer 70 distributes the tunnel connection request to the XMPP server of the assignment destination with respect to the old type corresponding gateway (the gateway corresponding to the old type device), on the basis of the stored correspondence relationship (a correspondence relationship between the old type corresponding gateway 30 and the XMPP server of the assignment destination). Accordingly, the tunnel connection request is transmitted to the old type corresponding gateway, through the message session formed between the old type corresponding gateway and the XMPP server of the assignment destination.

On the other hand, in a case where the XMPP connection request from the new type corresponding gateway (30*a*, 30*b*, or the like), is transmitted to the load balancer 70, in the initial state, the XMPP connection request is blocked by the IP filter 350 of the load balancer 70. Therefore, the new type corresponding gateway 30 is not capable of establishing the message session with respect to any XMPP server (including the time charge server 50) under the management of the load balancer 70. As a result thereof, in the initial state, the tunnel connection request relevant to the new type device, can be transmitted only through the message session between the data amount charge server 60 and the gateway corresponding to the new type device (the new type corresponding gateway) 30. That is, in the plurality of types of communication routes, (the first route is not capable of being selected) only the second route is capable of being selected. Furthermore, as described below, in a case where the contents of the IP filter 350 are changed, the new type corresponding gateway 30 is also capable of establishing the message session with respect to any XMPP server under the management of the load balancer 70.

Next, the operation of the sixth embodiment will be described with reference to FIG. 26. In FIG. 26, the operation of steps S26*b* and S27, is different from that of FIG. 20 (the fifth embodiment).

In steps S21 to S23, in a case where the time charge server 50 is selected as the connection request transfer server relevant to the new type device, the process proceeds to step S26 (S26*b*) from step S23. Here, the use of two XMPP servers as the connection request transfer server relevant to the new type device (in other words, the number of XMPP servers to be expanded), is determined in steps S21 to S23. For example, in a case of transmitting messages relevant to 600 new type devices, and of setting that all of the messages can be processed within 3 seconds, as another condition, it is determined that two XMPP servers having capacity of 100 messages/second per one server, are provided.

In step S26*b*, the platform server 80 expands the connection request transfer server used for the communication with respect to the gateway corresponding to the new type device designated as a communication target in the access request (also referred to as the corresponding gateway), through the service activation server 40. Specifically, the platform server 80 transmits the expansion request of the time charge server 50 to the service activation server 40 (also refer to FIG. 29). Specifically, the fact that the time charge server 50 is needed to be activated, and the number of time charge servers 50 to be activated (the number of servers to be expanded, determined at the time of calculating the fee), are transferred to the service activation server 40. The service activation server 40 activates the time charge server 50, on the basis of the expansion request (also refer to FIG. 29). The activated time charge server 50 is a target installation of assignment processing of the load balancer 70 (the load dispersion processing).

Further, in step S27, the platform server 80 executes processing of additionally registering the IP address of the corresponding gateway as a communication allowed target address, in the IP filter 350 of the load balancer 70. Additional registration processing is executed through the service activation server 40.

Figure 29:
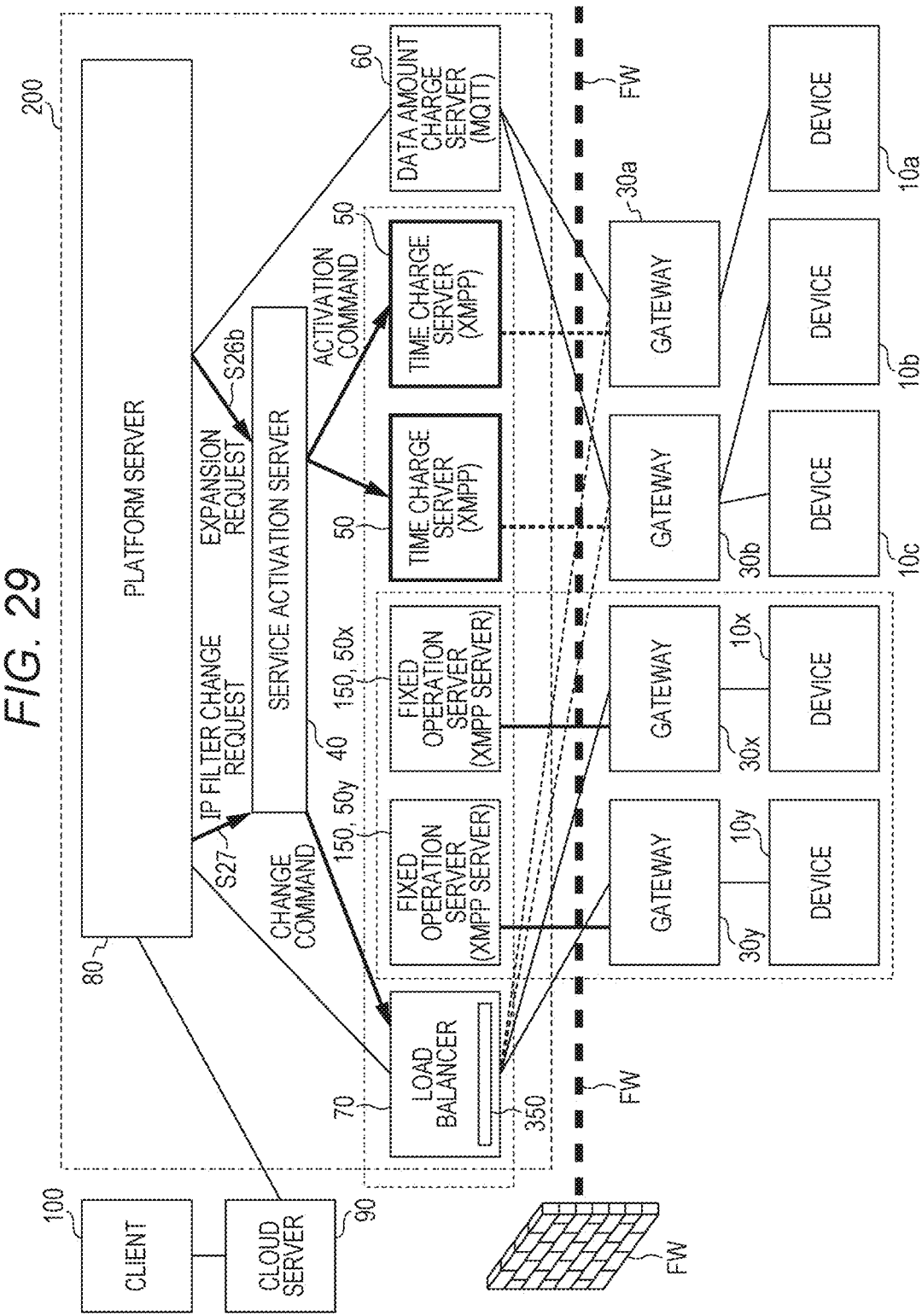
FIG. 29 is a diagram illustrating an operation when the first route is selected.

Specifically, the platform server 80 transmits a change request (including an IP address of an addition target, or the like) of the IP filter 350 in the load balancer 70, to the service activation server 40 (also refer to FIG. 29). The service activation server 40 delivers a change command to the load balancer 70, according to the change request, and changes the contents of the IP filter 350 in the load balancer 70. Specifically, the IP address of the gateway corresponding to the new type device that is the communication target device, is additionally registered as an address IP for allowing the request to pass through the filter 350 (the IP address of the "communication allowed installation"). In other words, the gateway corresponding to the new type device in the device list 300, is changed to the communication allowed installation from the communication disallowed installation.

Figure 30:
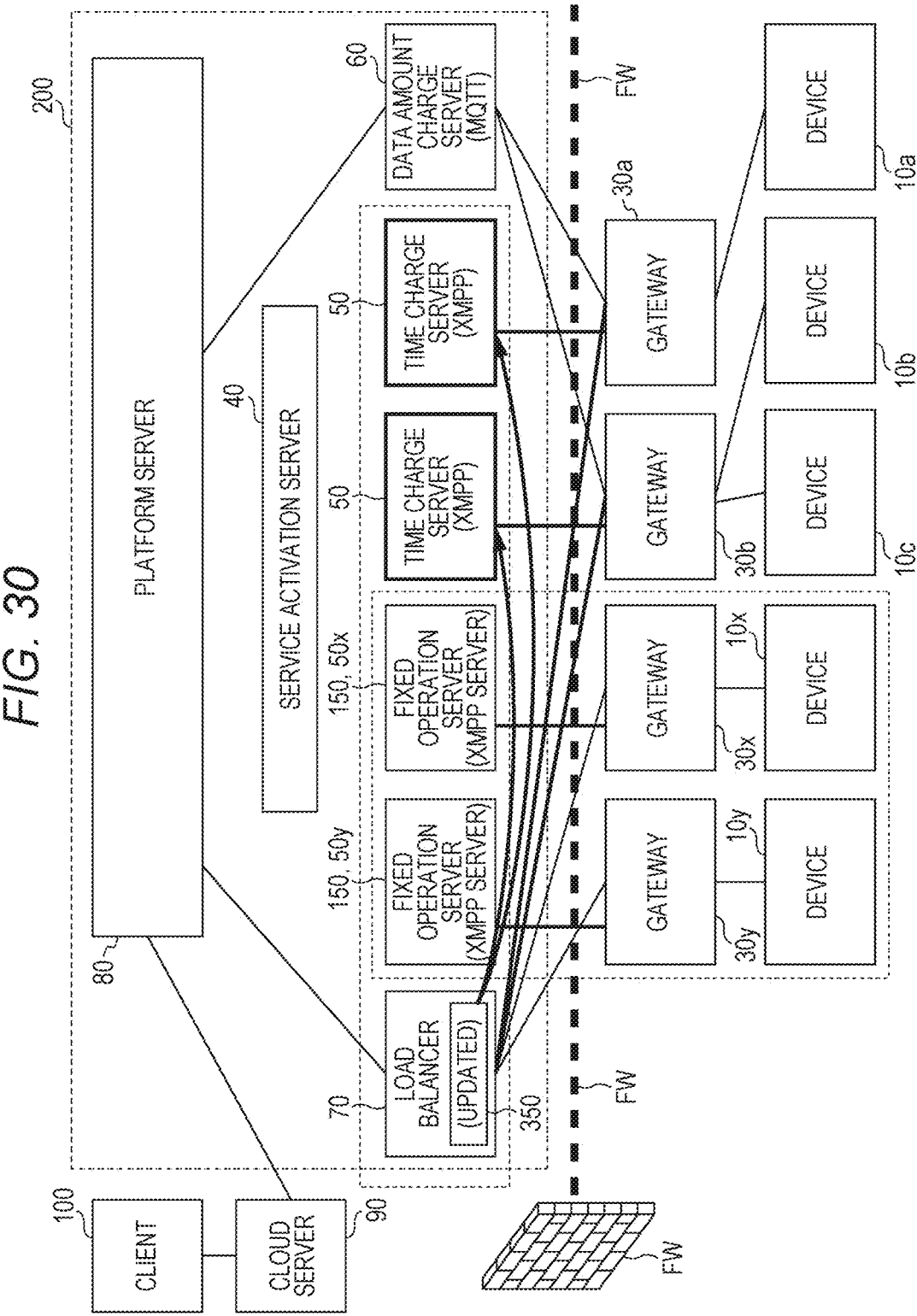
FIG. 30 is a diagram illustrating the operation when the first route is selected.

According to such a registration change (IP filter update), the XMPP connection request to be transmitted from the gateway 30 corresponding to the new type device (10*a*, 10*b*, 10*c*, or the like) (the new type corresponding gateway 30*a*, 30*b*, or the like), in the plurality of gateways 30, is capable of passing through the IP filter 350, and thus, the load balancer 70 is capable of receiving the XMPP connection request (refer to FIG. 30). In a case where the XMPP connection request is received, the load balancer 70 determines the XMPP server of the assignment destination according to the XMPP connection request (the XMPP server to be assigned to the new type corresponding gateway) (the time charge server 50 or the like). Then, load balancer 70 distributes the XMPP connection request to the XMPP server of the assignment destination. Accordingly, the XMPP connection is established between the new type corresponding gateway 30 and the XMPP server of the assignment destination (the corresponding server) (refer to FIG. 30).

Thus, the new type corresponding gateway 30 establishes the message session (the XMPP connection) with respect to any XMPP server (in FIG. 30, two time charge servers 50), under the management of the load balancer 70. Furthermore, the load balancer 70 stores a correspondence relationship between the new type corresponding gateway 30 and the XMPP server assigned to the new type corresponding gateway 30. Furthermore, in FIG. 30, the same correspondence relationship as that of the fifth embodiment is illustrated, but actually, various correspondence relationships different from that of the fifth embodiment can be constructed.

Figure 31:
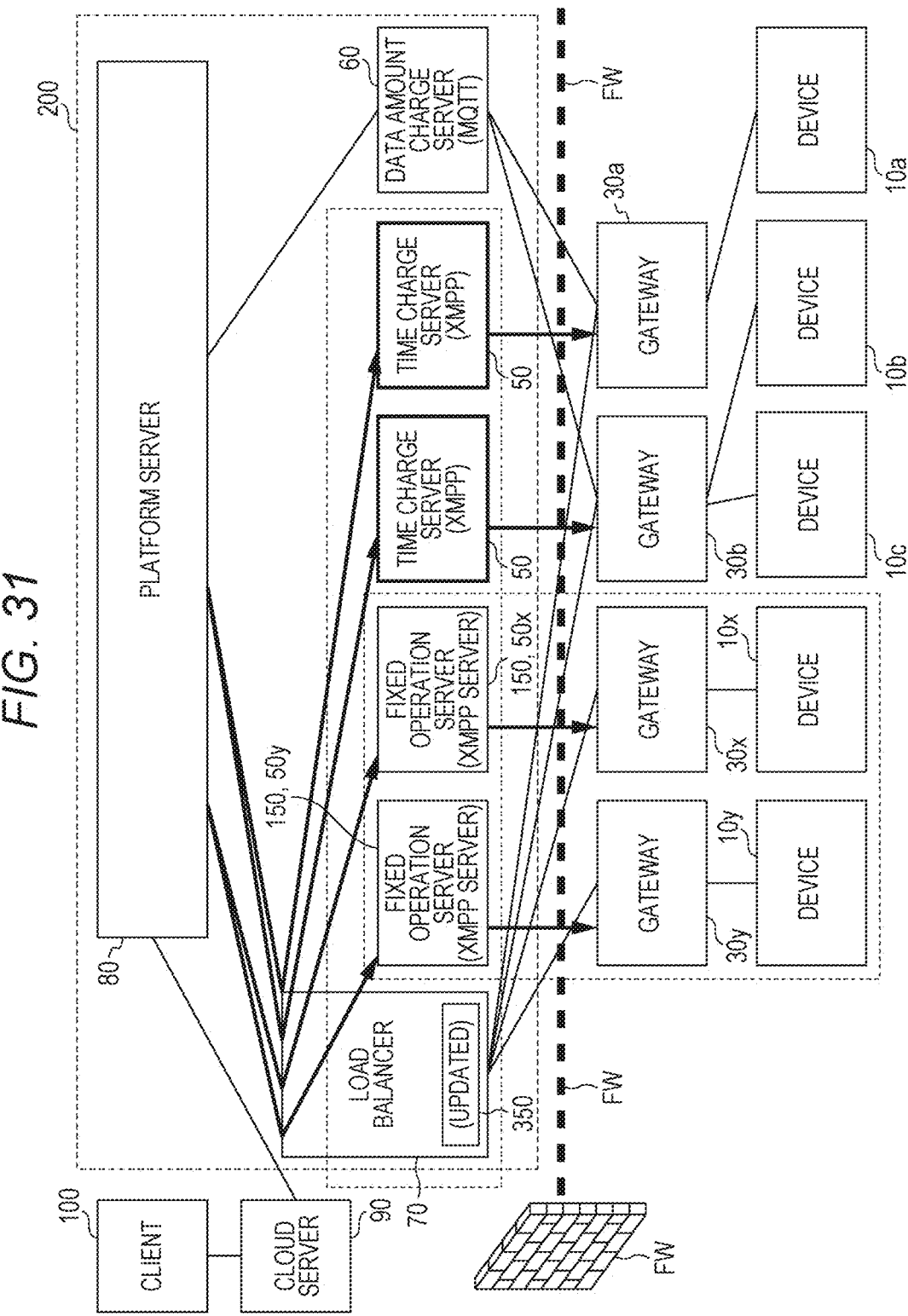
FIG. 31 is a diagram illustrating the operation when the first route is selected.

After that, in step S28, the platform server 80 starts processing of transmitting the tunnel connection request relevant to the new type device, to the load balancer 70 (specifically, processing of transmitting the tunnel connection request to the gateway corresponding to the new type device). The tunnel connection request is transmitted (transferred) to the gateway corresponding to the new type device (the new type corresponding gateway) 30, through the message session established between the new type corresponding gateway 30 and any XMPP server (in FIG. 30 and FIG. 31, two time charge servers 50), under the management of the load balancer 70. At this time, the load balancer 70 distributes each of the tunnel connection requests to the XMPP server of the assignment destination with respect to each of the new type corresponding gateways, on the basis of stored correspondence relationship (the correspondence relationship between the new type corresponding gateway 30 and the XMPP server of the assignment destination). Accordingly, each of the tunnel connection requests is transmitted to each of the new type corresponding gateways, through the message session (the XMPP connection) formed between each of the new type corresponding gateways and the XMPP server of the assignment destination. In other words, the message session is used as a part of the communication route through the firewall, and the tunnel connection request is transmitted.

Figure 28:
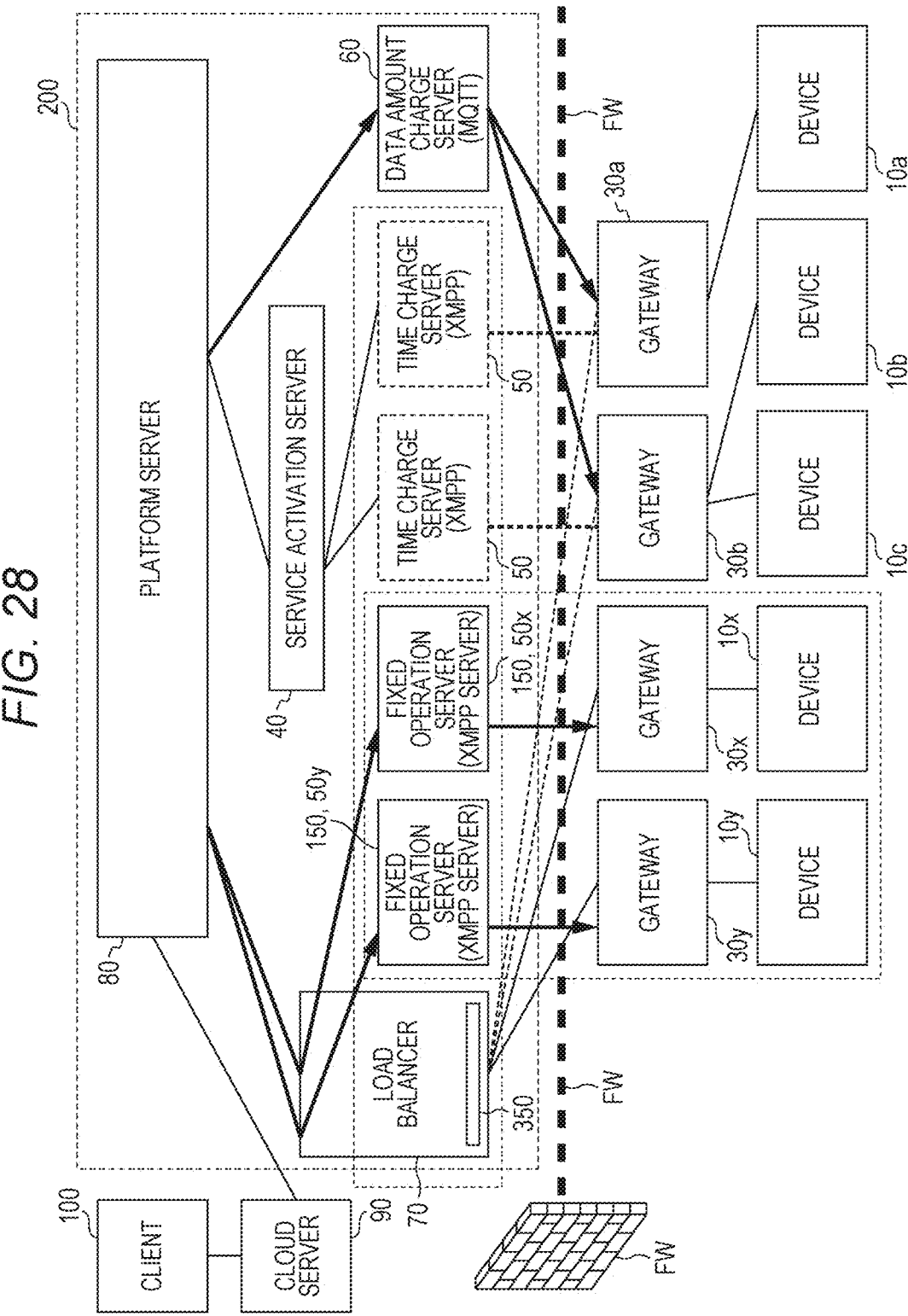

Furthermore, in steps S21 to S23, in a case where the data amount charge server 60 is selected the connection request transfer server relevant to the new type device, as with the fifth embodiment or the like, the process proceeds to step S24. In step S24, processing of transmitting each of the tunnel connection requests to each of the gateways 30, through the data amount charge server 60 (by using the MQTT connection), is started (refer to FIG. 28). Each of the gateways (the communication target gateways), establishes the tunnel connection with respect to the cloud server 90, on the basis of the tunnel connection request.

In addition, even though it is not illustrated in the flowchart of FIG. 26, the following processing is performed with respect to each of the old type devices. Specifically, the tunnel connection request is transmitted to each of the gateways from the platform server 80, through the message session (the XMPP connection) established between each of the gateways corresponding to each of the old type devices, and the XMPP server corresponding to each of the gateways (the fixed operation server 150 or the like). More specifically, in a case where the platform server 80 transmits a transmission request of the message (the tunnel connection request) with respect to the gateway corresponding to one device (the corresponding gateway) 30, to the load balancer 70, the load balancer 70 specifies the XMPP server 50 corresponding to the corresponding gateway 30, and assigns the specified XMPP server 50 to the transmission request. Then, the message (the tunnel connection request) is transmitted to the corresponding gateway 30, through the message session (the XMPP connection) established in advance between the assigned XMPP server 50 and the corresponding gateway. Thus, in the old type device, the fixed operation server 150 is used as the connection request transfer server. Such an operation is performed in the same way in both of a case where the data amount charge server 60 is selected (determined) as the connection request transfer server relevant to the new type device (refer to FIG. 28), and a case where the time charge server 50 is selected (determined) as the connection request transfer server relevant to the new type device (refer to FIG. 31).

7. Seventh Embodiment

In each of the embodiments described above, in all of the plurality of communication target devices designated in one or a plurality of access requests, the same type of communication route is selected as the communication route through the firewall (the communication route for a connection request), but is not limited thereto.

For example, in a part of the plurality of communication target devices, the first route is selected as the communication route through the firewall, and in the other part of the plurality of communication target devices, the second route is selected as the communication route through the firewall. In short, the first route and the second route may be used together. In a seventh embodiment, such a mode will be described.

The seventh embodiment is a modification example of the fifth embodiment. However, it is not limited thereto, but the idea of the seventh embodiment may be applied to the first embodiment to the fourth embodiment, and the like.

In the seventh embodiment, the access request including the device list 300 as illustrated in FIG. 33, is acquired. In the device list 300, an XMPP server address corresponding to each of the devices 10, is also prescribed. However, it is not limited thereto, as with the first embodiment and the like, described above, information of such a correspondence relationship (a correspondence relationship between the device and the XMPP server address) may be stored in advance in the storage of the platform server 80, and the information may be acquired from the storage.

Figure 32:
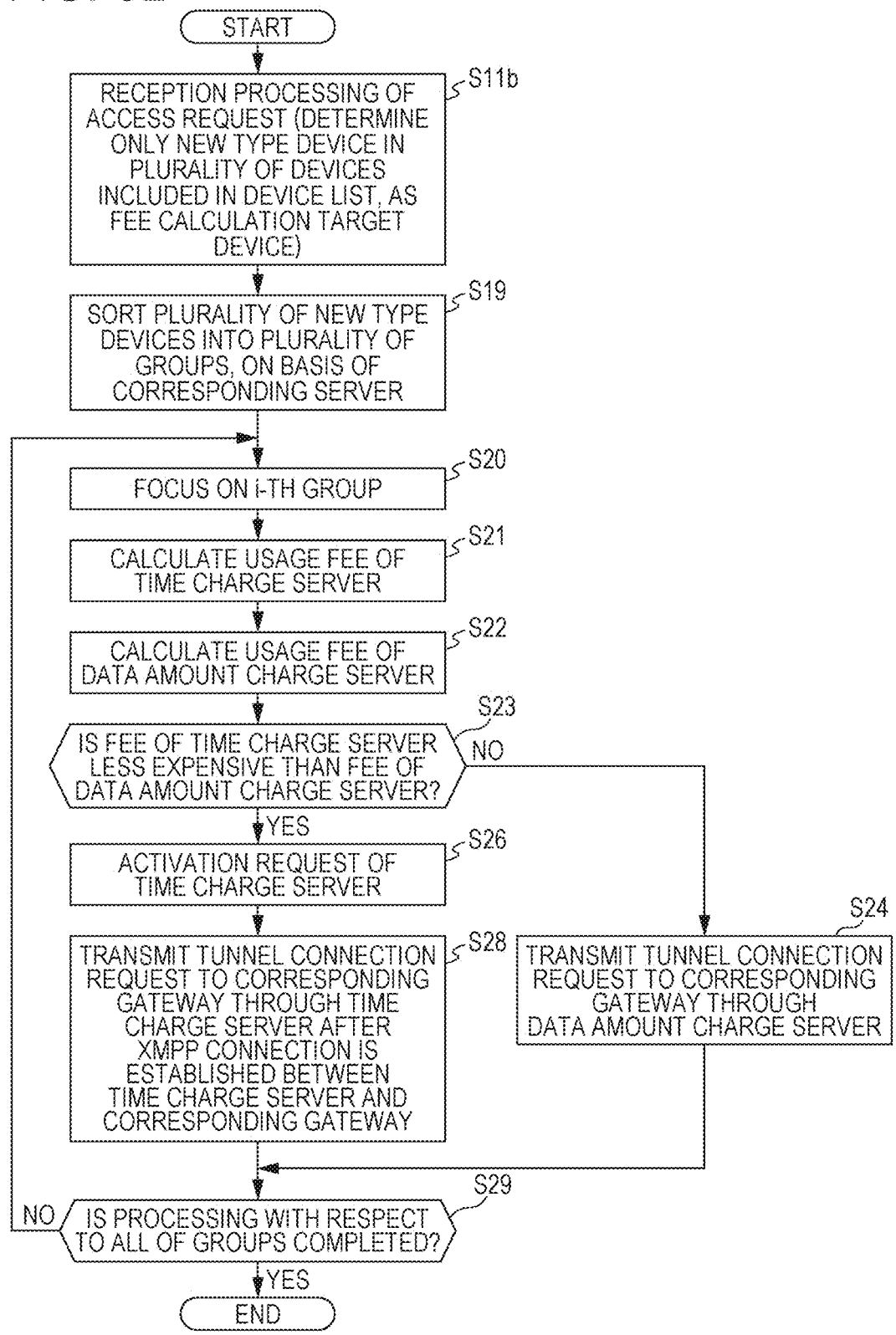
FIG. 32 is a flowchart illustrating an operation according to a seventh embodiment.

FIG. 32 is a flowchart illustrating the operation according to the seventh embodiment.

First, in step S11b, the device list 300 as illustrated in FIG. 33, is acquired. The plurality of devices (communication target devices) included in the device list 300, are broadly sorted into the new type device and the old type device. Here, in 1003 communication target devices in total, 1002 devices (Device ID: "DEVICE_0001" to "DEVICE_1000", "DEVICE_1001", and "DEVICE_1002") are the new type device, and one device (Device ID: "DEVICE_1003") is the old type device.

Furthermore, as described above, the old type device is a device capable of using only the fixed operation server (50x or the like) according to the comparative example, as the connection request transfer server (the communication server of the tunnel connection request). In FIG. 33, the address ("Address_X") of the fixed operation server 150 corresponding to one old type device (Device ID: "DEVICE_1003") is described. In each of the old type devices, as with the fifth embodiment, the tunnel connection request is transmitted through the fixed operation server 150 corresponding to each of the old type devices.

In step S11*b*, further, the plurality of devices designated as a communication target in the acquired device list 300, the old type device is excluded, and only the new type device is determined as the subsequent processing target. Furthermore, as described above, the new type device is a device capable of selectively using two types of servers described above (the time charge server 50 and the data amount charge server 60), as the as the connection request transfer server (in other words, a device capable of selectively using the plurality of communication routes described above).

In step S19 after step S11*b*, a plurality of new type devices extracted from the device list 300, are sorted into a plurality of (here, three) groups, with reference to the corresponding time charge server 50 (also referred to as the "corresponding server"). It is also expressed that the "corresponding server" is each of the communication target devices and the first type of server associated in advance with each of the communication target devices.

A first group is a group corresponding to the time charge server 50 having an address of "Address_A". In other words, the first group includes a device group in which it is prescribed in advance that the time charge server 50 having the address of "Address_A" is used as the connection request transfer server (the message transfer server). The first group includes 1000 devices (Device ID: "DEVICE_0001" to "DEVICE_1000"). In addition, a second group is a group corresponding to the time charge server 50 having an address of "Address_B", and includes one device having a device ID of "DEVICE_1001". In addition, a third group is a group corresponding to the time charge server 50 having an address of "Address_C", and includes one device having a device ID of "DEVICE_1002".

Thus, the plurality of communication target devices (new type devices) are sorted into the plurality of groups with reference to the corresponding server, on the basis of a correspondence relationship between each of the communication target devices and each of the corresponding servers.

Such sort processing is executed, and then, the selection processing of the communication route for a connection request is executed for each of the groups. In other words, the selection processing of selecting the connection request transfer server (the communication server of the tunnel connection request) from two types of servers (the time charge server 50 and the data amount charge server 60), is executed in group unit.

Specifically, first, in step S20, an i-th group (here, i=1, 2, . . . ) (an initial value of "1") is set to a target of interest. Then, in a focused group (a group of interest), the processing of steps S21 to S28 is executed. The processing of steps S21 to S28 is repeated until it is determined that the processing relevant to all of the groups is ended, in step S29. In a case where it is determined that the processing relevant to all of the groups is ended, in step S29, the processing of FIG. 32 is ended.

According to such processing, as also illustrated in FIG. 33, in the new type device of the first group (1000 new type devices ("DEVICE_0001" to "DEVICE_1000")), the time charge server 50 (in other words, the first route) is selected. On the other hand, in the new type device of the second group ("DEVICE_1001"), the data amount charge server 60 (in other words, the second route) is selected. In addition, in the new type device of the third group ("DEVICE_1002"), the data amount charge server 60 (in other words, the second route) is selected.

Accordingly, in all of the plurality of communication target devices, it is possible to further reduce the operational cost, compared to a case where the same type of communication route (for example, the first route) is selected as the communication route for a connection request.

Specifically, a case where the first route is selected as the communication route for a connection request, in all of the plurality of communication target devices (in other words, all of three groups), is assumed as a "comparison target". In the comparison target, the time charge server 50 of "Address_B" is required to be operated for at least 1 second, in the second group, and the time charge server 50 of "Address_C" is required to be operated for at least 1 second, in the third group. The fee required for operating the time charge server 50, is more expensive than the fee for transmitting two messages to the data amount charge server 60. Conversely, as described above, in the second group and the third group, transmitting each message for one device (two messages in total) by using the data amount charge server 60, is less expensive than the fee required for operating two time charge servers 50 for 1 second. Therefore, it is possible to further reduce the operational cost.

For example, in a case where the fee is calculated in the same condition as described above, a charge fee for operating the time charge server 50 relevant to the second group and the third group for 1 second (the comparison target), is "0.00007388" USD (=2×1 (second)×0.00003694 (second/USD)). On the other hand, a charge fee of the data amount charge server 60 relevant to the second group and the third group (the seventh embodiment), is "0.000002" USD (=2 (message)×0.000001 (USD/message), and is less expensive than the amount relevant to the comparison target described above ("0.00007388" USD). Furthermore, a charge fee of the time charge server 50 relevant to the first group, is "0.0003694" USD (=1000/100×0.00003694), and is common between the comparison target and the seventh embodiment.

Thus, according to the seventh embodiment, it is possible to further reduce the operational cost. In particular, in the comparison target, the degree of reduction in the operational cost increases, as the number of time charge servers 50 to be activated for transmitting the messages, less than the predetermined number TH1 (refer to FIG. 12), (the time charge server 50 such as "Address_B" or "Address_C") (in the comparison target described above, two), increases. In other words, the degree of reduction in the operational cost increases, as the number of groups to which the devices less than the predetermined number TH1 (refer to FIG. 12) are assigned, increases.

8. Modification Example and Others

As described above, the embodiments of the present invention have been described, but the present invention is not limited to the contents described above.

For example, in each of the embodiments described above, a mode has been exemplified in which the gateway 30 is constructed by using the MFP, but is not limited thereto, and the gateway 30 may be constructed by using the other installations (a single-function printer, a personal computer, or the like).

In addition, in each of the embodiments described above, the MFP has been exemplified as the device 10, but is not limited thereto, and the device 10 may be the other installations (a single-function printer, a personal computer, or the like).

In addition, in the embodiments described above, two types of servers of the time charge server 50 and the data amount charge server 60 have been exemplified as the plurality of types of servers, but are not limited thereto, and the plurality of types of servers may be other types of servers. In addition, the plurality of types of servers may be three or more types of servers.

Although embodiments of the present invention have been described and illustrated in detail, the disclosed embodiments are made for purposes of illustration and example only and not limitation. The scope of the present invention should be interpreted by terms of the appended claims.

What is claimed is:

1. A communication system comprising:
   a plurality of devices that are provided inside a firewall;
   at least one gateway that is provided inside the firewall, and relays communication between the plurality of devices and at least one cloud server provided outside the firewall; and
   a platform server that is provided outside the firewall, receives at least one access request with respect to at least one communication target device in the plurality of devices, from the at least one cloud server, and transmits a message to a gateway corresponding to the at least one communication target device designated in the at least one access request, through a communication route for message transmission selected from a plurality of types of communication routes,
   wherein each of the plurality of types of communication routes is a route passing through the firewall, through any one of a plurality of types of servers that are operated in unfixed amount charge structures different from each other, are provided outside the firewall, and have a magnitude relationship of charge amounts, capable of being changed according to a communication mode,
   the platform server selects the communication route for message transmission relevant to the at least one communication target device from the plurality of types of communication routes, on the basis of communication mode information of the at least one access request,
   the plurality of types of communication routes include a first route passing through the firewall, through a first type of server in the plurality of types of servers, and a second route passing through the firewall, through a second type of server in the plurality of types of servers,
   the first type of server is a time charge server in which a charge is performed according to a utilization time, and
   the second type of server is a data amount charge server in which a charge is performed according to a communication data amount.

2. The communication system according to claim 1,
   wherein in a case in which the first route is selected, the platform server delivers an activation request of the first type of server to a predetermined activation server, activates the first type of server, and starts processing of transmitting the message to the at least one communication target device, through the first type of server after being activated.

3. The communication system according to claim 1,
   wherein in response to reception of one access request, the platform server executes selection processing of the communication route for message transmission relevant to the at least one communication target device designated as a communication target in the one access request, and starts processing of transmitting the message, through the selected communication route for message transmission.

4. The communication system according to claim 1,
   wherein after a predetermined period has elapsed from a reception time point of one access request, the platform server selects the communication route for message transmission relevant to a plurality of communication target devices designated as a communication target in a plurality of access requests also including another access request that is further received in the predetermined period, on the basis of communication mode information of the plurality of access requests, and starts processing of transmitting the message to each communication target gateway corresponding to the plurality of communication target devices, through the selected communication route for message transmission.

5. The communication system according to claim 4,
   wherein the predetermined period is changed to a length according to a type of the one access request.

6. The communication system according to claim 4,
   wherein the predetermined period is changed to a shorter time, as an urgency degree of the type of the one access request increases.

7. The communication system according to claim 1,
   wherein at a time point when a predetermined number of access requests are received, the platform server selects the communication route for message transmission relevant to a plurality of communication target devices designated as a communication target in the predetermined number of access requests, on the basis of communication mode information of the predetermined number of access requests, and starts processing of transmitting the message to each communication target gateway corresponding to the plurality of communication target devices, through the selected communication route for message transmission.

8. The communication system according to claim 1,
   wherein at a time point when at least one access request with respect to a predetermined number or more of communication target devices, is received, the platform server selects the communication route for message transmission relevant to a plurality of communication target devices designated as a communication target in the at least one access request, on the basis of the communication mode information of the at least one access request, and starts processing of transmitting the message to each communication target gateway corresponding to the plurality of communication target devices, through the selected communication route for message transmission.

9. The communication system according to claim 1,
   wherein when transmission processing of the message is started according to a first access request that is one access request, and then, a second access request that is an access request different from the first access request, is further received, the platform server selects the communication route for message transmission relevant to an incomplete device that is a communication target device in which the transmission processing of the message according to the first access request is incomplete, in a plurality of communication target devices designated in the first access request, and a communication target device in the second access request, from the plurality of types of communication routes, on the basis of communication mode information of the first access request and communication mode information of the second access request, and the platform server starts the transmission processing of transmitting the message to a communication target gateway corresponding to each of the incomplete device and the communication target device in the second access request, through the selected communication route for message transmission.

10. The communication system according to claim 1, wherein the plurality of devices include a first type device capable of selectively using the plurality of types of servers as a message transfer server that is a server for transmitting the message through the firewall, and a second type device capable of using only a fixed operation server that is a server in which an operational cost is fixedly generated, as the message transfer server, and the platform server selects the communication route for message transmission, on the basis of residual devices in which the second type device is excluded from communication target devices designated in the at least one access request.

11. The communication system according to claim 10, wherein the fixed operation server is constantly operated, and constantly allows communication from a gateway corresponding to the second type device, in a case in which the first route is not selected as the communication route for message transmission, the first type of server is not operated, in a case in which the first type of server is in an operation state, the first type of server allows communication from a gateway corresponding to the first type device, and in a case in which the first route is selected as the communication route for message transmission, the first type of server corresponding to the first type device is activated, a message session is established between the gateway corresponding to the first type device and the first type of server, and the message session is ensured as a communication route of the message.

12. The communication system according to claim 10, further comprising:

a load dispersion server that executes load dispersion processing in a plurality of message transfer servers capable of transferring the message by establishing a message session according to a predetermined protocol with respect to each gateway, wherein the first type of server is capable of establishing the message session according to the predetermined protocol with respect to a gateway corresponding to the first type device, the load dispersion server includes an IP filter that prescribes permission of communication from each of a plurality of gateways, the IP filter constantly allows communication from a gateway corresponding to the second type device, in a case in which the first route is not selected as the communication route for message transmission, the IP filter does not allow communication from the gateway corresponding to the first type device, in a case in which the first route is selected as the communication route for message transmission, the platform server expands the message transfer server used for communication with respect to a corresponding gateway that is the gateway corresponding to the first type device designated as a communication target in the at least one access request, and additionally registers an IP address of the corresponding gateway in the IP filter of the load dispersion server, as a communication allowed target address, in a case in which an establishment request of the message session according to the predetermined protocol from the corresponding gateway, is received through the IP filter, the load dispersion server determines a corresponding server that is a server to be assigned to the corresponding gateway, from the plurality of message transfer servers, the message session according to the predetermined protocol is established between the corresponding server and the corresponding gateway, and the platform server transmits the message to the corresponding gateway through the message session, by transmitting the message to the load dispersion server.

13. The communication system according to claim 1, wherein the platform server selects the same type of communication route as the communication route for message transmission, with respect to all of the at least one communication target device.

14. The communication system according to claim 1, wherein on the basis of a correspondence relationship between each communication target device and a corresponding server that is the first type of server associated in advance with each of the communication target devices, the platform server sorts a plurality of communication target devices designated as a communication target in the at least one access request, into a plurality of groups, with reference to the corresponding server, and the platform server executes selection processing of selecting the communication route for message transmission from the plurality of types of communication routes, on the basis of the communication mode information of the at least one access request, for each of the groups.

15. The communication system according to claim 1, wherein the platform server transmits a tunnel connection request for establishing tunnel connection with respect to a transmission source cloud server that is a cloud server of a transmission source of each access request, as the message, the communication route for message transmission is a communication route for a tunnel connection request, the tunnel connection request is transmitted to at least one communication target gateway, through a message session established between a message transfer server that is operated in a unfixed amount charge structure and the at least one communication target gateway corresponding to the at least one communication target device, a communication target gateway receiving the tunnel connection request, establishes the tunnel connection between the communication target gateway and the transmission source cloud server, on the basis of the tunnel connection request, and relays communication between the transmission source cloud server and a device corresponding to the communication target gateway, and the platform server determines the message transfer server from the plurality of types of servers, on the basis of the communication mode information of the at least one access request.

16. A non-transitory recording medium storing a computer readable program causing a computer that is capable of receiving at least one access request with respect to a plurality of devices provided inside a firewall, and is provided outside the firewall, to perform:
- a) receiving the at least one access request from at least one cloud server provided outside the firewall; and
- b) starting processing of transmitting a message to a gateway corresponding to at least one communication target device designated in the at least one access request, through a communication route for message transmission selected from a plurality of types of communication routes, according to the at least one access request, wherein each of the plurality of types of communication routes is a route passing through the firewall, through any one of a plurality of types of servers that are operated in unfixed amount charge structures different from each other, are provided outside the firewall, and have a magnitude relationship of charge amounts, capable of being changed according to a communication mode, and the b) includes
- b-1) selecting the communication route for message transmission relevant to the at least one communication target device from the plurality of types of communication routes, on the basis of communication mode information of the at least one access request, according to the at least one access request,
- b-2) starting processing of transmitting the message to at least one communication target gateway corresponding to the at least one communication target device, through the communication route for message transmission selected from the plurality of types of communication routes, the plurality of types of communication routes include a first route passing through the firewall, through a first type of server in the plurality of types of servers, and a second route passing through the firewall, through a second type of server in the plurality of types of servers, the first type of server is a time charge server in which a charge is performed according to a utilization time, and the second type of server is a data amount charge server in which a charge is performed according to a communication data amount.

17. The non-transitory recording medium storing a computer readable program according to claim 16,
wherein the b-2) includes
- b-2-1) delivering an activation request of the first type of server to a predetermined activation server, and activating the first type of server, in a case in which the first route is selected in the b-1), and
- b-2-2) starting processing of transmitting the message to the at least one communication target device, through the activated first type of server, after the b-2-1).

18. The non-transitory recording medium storing a computer readable program according to claim 16,
wherein in the b-1), in response to the reception of one access request, selection processing of the communication route for message transmission relevant to the at least one communication target device designated as a communication target in the one access request, is executed, and in the b-2), processing of transmitting the message, through the communication route for message transmission selected in the b-1), is started.

19. The non-transitory recording medium storing a computer readable program according to claim 16, wherein in the b-1), after a predetermined period has elapsed from a reception time point of one access request, the communication route for message transmission relevant to a plurality of communication target devices designated as a communication target in a plurality of access requests also including another access request that is further received in the predetermined period, is selected on the basis of communication mode information of the plurality of access requests, and in the b-2), processing of transmitting the message to each communication target gateway corresponding to the plurality of communication target devices, through the communication route for message transmission selected in the b-1), is started.

20. The non-transitory recording medium storing a computer readable program according to claim 19,
wherein the predetermined period is changed to a length according to a type of the one access request.

21. The non-transitory recording medium storing a computer readable program according to claim 19,
wherein the predetermined period is changed to a shorter time, as an urgency degree of the type of the one access request increases.

22. The non-transitory recording medium storing a computer readable program according to claim 16,
wherein in the b-1), at a time point when a predetermined number of access requests are received, the communication route for message transmission relevant to a plurality of communication target devices designated as a communication target in the predetermined number of access requests, is selected on the basis of communication mode information of the predetermined number of access requests, and in the b-2), processing of transmitting the message to each communication target gateway corresponding to the plurality of communication target devices, through the communication route for message transmission selected in the b-1), is started.

23. The non-transitory recording medium storing a computer readable program according to claim 16,
wherein in the b-1), at a time point when at least one access request with respect to a predetermined number or more of communication target devices, is received, the communication route for message transmission relevant to a plurality of communication target devices designated as a communication target in the at least one access request, is selected on the basis of the communication mode information of the at least one access request, and in the b-2), processing of transmitting the message to each communication target gateway corresponding to the plurality of communication target devices, through the communication route for message transmission selected in the b-1), is started.

24. The non-transitory recording medium storing a computer readable program according to claim 16, the computer readable program causing the computer to further perform:
- c) starting transmission processing of the message according to a first access request that is one access request, and then, further receiving a second access request that is an access request different from the first access request;
- d) selecting the communication route for message transmission relevant to an incomplete device that is a communication target device in which the transmission processing of the message according to the first access request is incomplete, in a plurality of communication target devices designated in the first access request, and a communication target device in the second access request, from the plurality of types of communication routes, on the basis of communication mode information of the first access request and communication mode information of the second access request, when the second access request is received; and e) starting the transmission processing of transmitting the message to a communication target gateway corresponding to each of the incomplete device and the communication target device in the second access request, through the communication route for message transmission selected in the d) from the plurality of types of communication routes.

25. The non-transitory recording medium storing a computer readable program according to claim 16, wherein the plurality of devices include a first type device capable of selectively using the plurality of types of servers as a message transfer server that is a server for transmitting the message through the firewall, and a second type device capable of using only a fixed operation server that is a server in which an operational cost is fixedly generated, as the message transfer server, and in the b-1), the communication route for message transmission is selected on the basis of residual devices in which the second type device is excluded from communication target devices designated in the at least one access request.

26. The non-transitory recording medium storing a computer readable program according to claim 25, wherein the fixed operation server is constantly operated, and constantly allows communication from a gateway corresponding to the second type device, in a case in which the first route is not selected as the communication route for message transmission, the first type of server is not operated, in a case in which the first type of server is in an operation state, the first type of server allows communication from a gateway corresponding to the first type device, and the b-2) includes
b-2-1) activating the first type of server corresponding to the first type device, in a case in which the first route is selected as the communication route for message transmission in the b-1), and
b-2-2) transmitting the message to the at least one communication target gateway by using a message session established between the gateway corresponding to the first type device and the first type of server, as a part of the communication route for message transmission, in a case in which the message session is established according to the activation of the first type of server.

27. The non-transitory recording medium storing a computer readable program according to claim 25, wherein the first type of server is capable of establishing a message session according to a predetermined protocol with respect to a gateway corresponding to the first type device, each gateway transmits an establishment request of the message session according to the predetermined protocol to a load dispersion server, the load dispersion server executing load dispersion processing in a plurality of message transfer servers capable of transmitting the message by establishing the message session according to the predetermined protocol with respect to each of the gateways, includes an IP filter that prescribes permission of communication from each of a plurality of gateways, the IP filter constantly allows communication from a gateway corresponding to the second type device, in a case in which the first route is not selected as the communication route for message transmission, the IP filter does not allow communication from the gateway corresponding to the first type device, and the b-2) includes
b-2-1) expanding the message transfer server used for communication with respect to a corresponding gateway that is the gateway corresponding to the first type device designated as a communication target in the at least one access request, in a case in which the first route is selected as the communication route for message transmission in the b-1),
b-2-2) additionally registering an IP address of the corresponding gateway in the IP filter of the load dispersion server, as a communication allowed target address, in a case in which the first route is selected as the communication route for message transmission in the b-1), and
b-2-3) transmitting the message to the corresponding gateway through the message session, by transmitting the message to the load dispersion server, after the message session is established between the assigned first type of server that is the first type of server expanded in the b-2-1), and is subjected to assignment processing of the load dispersion server, and the corresponding gateway, according to the reception of the establishment request of the message session according to the predetermined protocol from the corresponding gateway through the IP filter.

28. The non-transitory recording medium storing a computer readable program according to claim 16, wherein in the b-1), the same type of communication route is selected as the communication route for message transmission, with respect to all of the at least one communication target device.

29. The non-transitory recording medium storing a computer readable program according to claim 16, wherein the b-1) includes,
b-1-1) sorting a plurality of communication target devices designated as a communication target in the at least one access request, into a plurality of groups, with reference to a corresponding server, on the basis of a correspondence relationship between each of the communication target device and the corresponding server that is the first type of server associated in advance with the each of the communication target devices, and
b-1-2) executing selection processing of selecting the communication route for message transmission from the plurality of types of communication routes, on the basis of the communication mode information of the at least one access request, for each group.

30. The non-transitory recording medium storing a computer readable program according to claim 16, wherein in the b-2), a tunnel connection request for establishing tunnel connection with respect to a transmission source cloud server that is a cloud server of a transmission source of each access request, is transmitted as the message, the communication route for message transmission is a communication route for a tunnel connection request, the tunnel connection request is transmitted to the at least one communication target gateway, through a message session established between a message transfer server that is operated in a unfixed amount charge structure and the at least one communication target gateway corresponding to the at least one communication target device, and in the b-1), the message transfer server is determined from the plurality of types of servers, on the basis of the communication mode information of the at least one access request.

31. A platform server that is capable of receiving at least one access request with respect to a plurality of devices provided inside a firewall, and is provided outside the firewall, the server comprising
a hardware processor that:
receives the at least one access request, from at least one cloud server provided outside the firewall; and
starts processing of transmitting a message to a gateway corresponding to at least one communication target device designated in the at least one access request, through a communication route for message transmission selected from a plurality of types of communication routes, according to the at least one access request,
wherein each of the plurality of types of communication routes is a route passing through the firewall, through any one of a plurality of types of servers that are operated in unfixed amount charge structures different from each other, are provided outside the firewall, and have a magnitude relationship of charge amounts, capable of being changed according to a communication mode, the hardware processor selects the communication route for message transmission relevant to the at least one communication target device from the plurality of types of communication routes, on the basis of communication mode information of the at least one access request, according to the at least one access request, the hardware processor starts processing of transmitting the message to at least one communication target gateway corresponding to the at least one communication target device, through the communication route for message transmission selected from the plurality of types of communication routes, the plurality of types of communication routes include a first route passing through the firewall, through a first type of server in the plurality of types of servers, and a second route passing through the firewall, through a second type of server in the plurality of types of servers, the first type of server is a time charge server in which a charge is performed according to a utilization time, and the second type of server is a data amount charge server in which a charge is performed according to a communication data amount.

* * * * *